US008119285B2

(12) United States Patent
Hatta et al.

(10) Patent No.: US 8,119,285 B2
(45) Date of Patent: Feb. 21, 2012

(54) CATHODE MATERIAL FOR SECONDARY BATTERY, METHOD FOR PRODUCING CATHODE MATERIAL FOR SECONDARY BATTERY AND SECONDARY BATTERY

(75) Inventors: Naoki Hatta, Ichihara (JP); Toshikazu Inaba, Ichihara (JP); Izumi Uchiyama, Ichihara (JP)

(73) Assignee: Mitsui Engineering & Shipbuilding Co., Ltd., Tokyo (JP)

( * ) Notice: Subject to any disclaimer, the term of this patent is extended or adjusted under 35 U.S.C. 154(b) by 1050 days.

(21) Appl. No.: 10/577,279

(22) PCT Filed: Oct. 26, 2004

(86) PCT No.: PCT/JP2004/015836
§ 371 (c)(1),
(2), (4) Date: Feb. 5, 2008

(87) PCT Pub. No.: WO2005/041327
PCT Pub. Date: May 6, 2005

(65) Prior Publication Data
US 2008/0131777 A1     Jun. 5, 2008

(30) Foreign Application Priority Data

Oct. 27, 2003  (JP) .................................. 2003-365790

(51) Int. Cl.
*H01M 4/36* (2006.01)
(52) U.S. Cl. .................... 429/221; 429/231.95; 429/219; 429/220; 429/231.5; 429/222; 252/513; 252/507; 252/506; 252/515; 252/182.1; 427/58
(58) Field of Classification Search .................. 429/221, 429/231.95, 219, 220, 231.5, 222; 252/513, 252/507, 506, 515, 182.1; 427/58
See application file for complete search history.

(56) References Cited

U.S. PATENT DOCUMENTS

| 6,777,132 B2 * | 8/2004 | Barker et al. .............. 429/231.1 |
| 6,855,273 B2 * | 2/2005 | Ravet et al. ................... 427/122 |
| 2003/0190527 A1 | 10/2003 | Pugh et al. |

FOREIGN PATENT DOCUMENTS

CN        1401559 A     10/2002
(Continued)

OTHER PUBLICATIONS

Zhang et al. "Development of LiFePO$_4$ as Cathode Material of Li-ion Battery", Battery Bimonthly, vol. 33, No. 4, Aug. 2003.

(Continued)

*Primary Examiner* — Laura Weiner
(74) *Attorney, Agent, or Firm* — Law Offices of Peter H. Priest, PLLC

(57) ABSTRACT

A positive electrode material is disclosed which contains an iron lithium phosphate as a positive electrode active material and has a large charge/discharge capacity, high-rate adaptability, and good charge/discharge cycle characteristics at the same time. Also disclosed are a simple method for producing such a positive electrode material and a high-performance secondary battery employing such a positive electrode material. Specifically, disclosed is a positive electrode material for secondary battery characterized by mainly containing a positive electrode active material represented by the general formula: Li$_n$FePO$_4$ (wherein n is a number of 0-1) and further containing at least one different metal element selected from the group consisting of vanadium (V), chromium (Cr), copper (Cu), zinc (Zn), indium (In) and tin (Sn). This positive electrode material can be produced using a halide of such a metal element as the raw material.

13 Claims, 26 Drawing Sheets

FOREIGN PATENT DOCUMENTS

| | | |
|---|---|---|
| EP | 1094532 A | 4/2001 |
| EP | 1195838 A | 4/2002 |
| EP | 1603177 A1 | 12/2005 |
| JP | 2002-198050 | 7/2002 |
| WO | WO 03/038930 A | 5/2003 |

OTHER PUBLICATIONS

Sung-Yoon Chung et al., "Electronically conductive phospho-oliviness as lithium storage electrodes", Nature Publishing Group, pp. 123-128, Oct. 31, 2002.

* cited by examiner

CATHODE MATERIAL FOR SECONDARY BATTERY, METHOD FOR PRODUCING CATHODE MATERIAL FOR SECONDARY BATTERY AND SECONDARY BATTERY

TECHNICAL FIELD

The present invention relates to a cathode material for a secondary battery, a method for producing a cathode material for a secondary battery and a secondary battery using the cathode material.

BACKGROUND ART

Lithium iron phosphate $LiFePO_4$ used as a cathode material in a secondary battery such as a metal lithium battery, lithium ion battery or lithium polymer battery is subjected to electrode oxidation/reduction accompanied by doping/undoping of lithium during the process of charging and discharging. Lithium iron phosphate $LiFePO_4$ is expected as a highly potential cathode material in the next generation because it has a considerably large theoretical capacity (170 mAh/g) and can create a relatively high electromotive force (about 3.4 to 3.5 V at $Li/Li^+$ anode) and because it is considered to be produced at low cost since it can be produced from iron and phosphorus, which are abundant resources. An $LiFePO_4$ cathode system having an olivine-type crystal structure, unlike a number of other currently-available cathode systems such as a lithium cobaltate $[LiCoO_2]$ cathode system, is in a two-phase equilibrium state in which only a reduced form (discharged state) $LiFe(II)PO_4$ as a first phase into which Li has been fully inserted and an oxidized form (charged state) $Fe(III)PO_4$ as a second phase from which Li has been completely extracted exist [that is, no intermediate phase, such as $Li_{0.5}(Fe^{2+}_{0.5}Fe^{3+}_{0.5})PO_4$, is not formed] all through the electrode oxidation/reduction process. As a result, the cathode system has an interesting property that the charge/discharge voltage is always kept constant and thus its charge/discharge state is easy to control. However, both the reduced form (discharged state) $LiFe(II)PO_4$ and Li-extracted oxidized reduced form (charged state) $Fe(III)PO_4$ have extremely low conductivities, and $Li^+$ ions cannot move quickly in the cathode material (the two features are assumed to be associated with each other as described later in the section "Effects"). Thus, even when a secondary battery is fabricated using Li or the like in the anode, only a small effective capacity, bad rate characteristics and bad cycle characteristics can be obtained.

As a method for enhancing the surface conductivity of a cathode material, there has been disclosed a process for depositing carbon on the surfaces of particles of a complex oxide (including an oxo acid salt such as sulfate, phosphate or silicate) represented by the chemical formula $A_aM_mZ_zO_oN_nF_f$ (wherein A represents an alkali metal atom, M represents Fe, Mn, V, Ti, Mo, Nb, W or other transition metal atom, and Z represents S, Se, P, As, Si, Ge, B, Sn or other non-metal atom). When the composite material is used in the electrode system of a battery, the electric field around interfaces of the complex oxide particles, a current collector (conductivity-imparting) material and an electrolyte can be uniform and stable and the efficiency can be improved in the course of electrode oxidation/reduction (see Patent Document 1). To deposit carbon on the surfaces of the complex oxide particles, an organic substance (polymer, monomer, or low-molecular weight compound) from which carbon is formed by pyrolysis or carbon monoxide is added to the complex oxide and pyrolyzed (a composite material of the complex oxide and surface covering carbon can be obtained by thermal reaction of the organic substance and the ingredients of the complex oxide under reducing conditions). According to Patent Document 1, an improvement in the surface conductivity of the complex oxide particles can be realized by the method, and high electrode performance such as high discharge capacity can be achieved when Li polymer battery is produced using a composite material prepared by depositing carbon on the surfaces of particles of a cathode material such as $LiFePO_4$.

There has been also disclosed a method for producing a cathode active material comprising the steps of mixing and milling ingredients of a compound represented by the general formula $Li_xFePO_4$ (wherein $0<x\leqq1$), and calcining the mixture in an atmosphere with an oxygen content of 1012 ppm (by volume) or lower, wherein a non-crystalline carbon material such as acetylene black is added at any point in the calcination step (see Patent Document 2).

The above techniques are both based on the low conductivity of a phosphate cathode material such as $LiFePO_4$ and the slow movement of Li ions in the cathode material. Basically, the techniques try to avoid the difficulties by depositing a conductive substance such as carbon on the surface of the cathode material or adding a conductive substance to the cathode material and reducing the particle size of the cathode material as much as possible to limit the ion diffusion distance.

Attempts have been made to improve the cathode performance by enhancing the conductivity of an $LiPO_4$ cathode material by replacing some of Li or Fe of the cathode material with different metal elements, or compositing or doping some of Li or Fe of the cathode material with different metal elements (see Non-patent Documents 1 and 2, for example).

Non-patent Document 1 discloses that when Al, Ca, Ni or Mg is introduced into the $LiFePO_4$ cathode material, its capacity can be improved. It is, for example, reported that a metal lithium battery using the $LiFePO_4$ cathode material free of the above elements exhibited a discharge capacity of 117 mAh/g in the first cycle and the rapid discharge capacity decreases with the progress of the cycles whereas a battery using a $LiMg_{0.05}Fe_{0.95}PO_4$ cathode material obtained by replacing some of Fe of the $LiFePO_4$ cathode material with Mg exhibited a discharge capacity of about 120 to 125 mAh/g and less deterioration with the progress of the cycles (although no objective evidence which indicates that Fe is replaced with Mg in the cathode material is not shown).

Non-patent Document 2 discloses that cathode materials into which the elements Mg, Al, Ti, Zr, Nb and W are doped, respectively, are produced by adding compounds containing $Mg^{2+}$, $Al^+$, $Ti^{4+}$, $Zr^{4+}$, $Nb^{5+}$ and $W^{6+}$ (Mg is in the form of an oxalate, Nb is in the form of a metal phenoxide, and the others are in the form of metal alkoxides) respectively to the ingredients of an $LiFePO_4$ cathode material and calcining the mixture. It is assumed in the document that the materials have some of their Li replaced with each of the elements and exist in the form of $Li_{1-x}M_xFePO_4$. It is also reported that the metal ion-doped cathode materials had conductivities in the order of $10^{-1}$ to $10^{-2}$ S/cm, which is about $10^8$ times greater than that of the non-doped cathode material, at room temperature, and metal lithium batteries using the metal ion doped cathode materials with such high conductivities had excellent rate characteristics and a long cycle life. According to Non-patent Document 2, one of the metal lithium batteries exhibited a discharge capacity slightly greater than 140 mAh/g at a low charge/discharge rate of C/10 (although the discharge capacity is described as about 150 mAh/g in the document, it is close to 140 mAh/g as long as seen in an accompanying drawing), and was able to be stably charged and discharged cyclically at very high rates of 21.5 C and 40 C, exhibiting reduced discharge capacities of slightly lower than 70 mAh/g and about 30 mAh/g, respectively (C/n is the rate of charging or discharging a battery under constant current, wherein n is the number of hours in which the battery is completely charged or discharged. There is no description in the document about the dopant element from which the charge/discharge data were derived and its content in the cathode material).

It is assumed in Non-patent Document 2 that since a small amount (1 mol % or less, in terms of element ratio, based on iron) of the multivalent ions enter the sites of $Li^+$ ions in the crystal structure of the reduced form $LiFe(II)PO_4$ of the cathode material and its Li-extracted oxidized form $Fe(III)PO_4$, a small amount of $Fe^{3+}$ and $Fe^{2+}$ are generated in the reduced phase and the oxidized phase, respectively, to create an oxidized state in which $Fe^{2+}$ and $Fe^{3+}$ coexist, and, consequently, P-type semiconductivity and N-type semiconductivity appear in the reduced phase and the oxidized phase, respectively, and provides the improvement in the conductivity. It is also reported that when the $LiFePO_4$ cathode material was calcined together with any of the compounds containing the above divalent to hexavalent ions, the conductivity of the cathode material was also improved (since the transition metal elements Ti, Zr, Nb and W can be in the form of stable positive ions with different valences, the valences of the positive ions in the obtained cathode materials may be different from those of the compounds added for doping).

Patent Document 1: JP-A 2001-15111
Patent Document 2: JP-A 2002-110163
Non-patent Document 1: "Report of Research for the Future Program (2000): Preparation and Application of Newly Designed Solid Electrolytes (Japan Society for the Promotion of Science: Research Project No. JSPS-RFTF96P00102) [http://chem.sci.hyogo-u.ac.jp/ndse/index.html] (updated on Jun. 21, 2000)
Non-patent Document 2: Nature Materials Vol. 1, pp. 123 to 128 (October, 2002)

DISCLOSURE OF THE INVENTION

Problem to be Solved by the Invention

The methods disclosed in Non-patent Documents 1 and 2, however, cannot provide satisfactory results at the moment. The charge/discharge capacity achieved by the former method is approximately 120 to 125 mAh/g. In addition, although the adaptability of the latter to high-rate charging/discharging is remarkable, only a charge/discharge capacity much smaller than the theoretical capacity of the cathode material 170 mAh/g can be obtained (slightly higher than 140 mAh/g) even at a low rate of C/10 in spite of the fact that the conductivity of the $LiFePO_4$ cathode material is improved. Further, the rise/fall of voltage in the final stage of charge or discharge under constant current in the battery capacity-voltage characteristic curve is not very steep in spite of the high-rate characteristics. According to the data shown in Non-patent Document 2, the voltage has a gentle rise/fall from points about 80% of the depths of charge and discharge at a rate of C/10. In a battery having a small internal resistance and high-rate characteristics, however, the rise/fall of voltage should be as steep as 90 degrees. The facts suggest the possibility that the type of the composited or doped element and the compositing or doping method is not fully appropriate.

An object of the present invention is to provide a cathode material for a secondary battery containing lithium iron phosphate as a cathode active material and having a large charge/discharge capacity, high-rate adaptability and good charge/discharge cycle characteristics, a method for producing the cathode material for a secondary battery, and a high-performance secondary battery using the cathode material for a secondary battery.

Means for Solving the Problem

As a result of zealous studies to achieve the object, the present inventors have found that a cathode material obtained by compositing a cathode active material $LiFePO_4$ with a specific metal element has drastically improved charge/discharge characteristics.

In addition, when conductive carbon is deposited on the surface of the cathode material composited with a specific metal element, an effective capacity close to the theoretical capacity 170 mAh/g of the cathode system and good charge/discharge cycle characteristics can be achieved.

The present inventors have also found that when the cathode material is composited with a specific metal element or a metal element analogous to it (which may be referred to as "foreign metal element"), the performance of the resulting cathode material differs depending on the ingredients and that a cathode material with excellent electrochemical performance can be obtained by properly selecting the ingredients.

A first aspect of the present invention is a cathode material for a secondary battery containing a cathode active material represented by a general formula $Li_nFePO_4$ (wherein n represents a number from 0 to 1; the same shall apply hereinafter) as a primary component, one or more metal elements selected from the group consisting of metal elements belonging to Group 4, 5, 6, 11, 12, 13 and 14 of the Periodic Table, and a halogen element in an amount of 0.1 mol % or more based on P.

A second aspect of the present invention is the cathode material for a secondary battery according to the first aspect, wherein the metal elements are one or more metal elements selected from the group consisting of vanadium (V), chromium (Cr), copper (Cu), zinc (Zn), indium (In), tin (Sn), molybdenum (Mo), and titanium (Ti).

The cathode material containing $Li_nFePO_4$ as a primary component of a cathode active material and the metal element or elements has a large charge/discharge capacity, high-rate adaptability and good charge/discharge cycle characteristics which have not been previously achieved as shown in Examples described later. When the content of the halogen element is 0.1 mol % or more based on P, excellent charge/discharge performance can be achieved as shown in Examples described later.

A third aspect of the present invention is the cathode material for a secondary battery according to the first or second aspect, wherein the total content of the metal elements is in the range of 0.1 to 5 mol %, in terms of element ratio, based on iron in the cathode active material. When the content of the metal elements is in the above range, excellent charge/discharge performance can be achieved.

A fourth aspect of the present invention is a cathode material for a secondary battery synthesized so as to contain a cathode active material represented by a general formula $Li_nFePO_4$ (wherein n represents a number from 0 to 1) as a primary component and one or more metal elements selected from the group consisting of metal elements belonging to Group 4, 5, 6, 11, 12, 13 and 14 of the Periodic Table by mixing a halide or halides of the metal element or elements and ingredients of the cathode active material represented by the general formula $Li_nFePO_4$ (wherein n represents a number from 0 to 1) and calcining the mixture.

The cathode material for a secondary battery produced using a halide or halides of the metal element or elements has better charge/discharge characteristics than a cathode material produced from other ingredients.

A fifth aspect of the present invention is the cathode material for a secondary battery according to any one of the first to fourth aspects, further comprising conductive carbon deposited on the surface thereof. When conductive carbon is deposited on the surface of the cathode material containing the foreign metal element or elements, the conductivity of the cathode material is further enhanced, and an effective capacity close to the theoretical capacity of an $Li_nFePO_4$ cathode system and good charge/discharge cycle characteristics can be achieved as shown in Examples described later.

A sixth aspect of the present invention is a method for producing a cathode material for a secondary battery comprising the steps of mixing ingredients of a cathode active material $Li_nFePO_4$, and a halide or halides of one or more metal elements selected from the group consisting of metal elements belonging to Groups 4, 5, 6, 11, 12, 13 and 14 of the Periodic Table to obtain a calcination precursor, and calcining the calcination precursor to composite the cathode active material with the metal element or elements. In compositing the cathode active material with a foreign metal element or elements belonging to any of the Group 4, 5, 6, 11, 12, 13 and 14, when a halide or halides of the foreign metal element or elements (or hydrates thereof) is used, a cathode material with excellent electrochemical performance which cannot be produced from other ingredients can be obtained.

A seventh aspect of the present invention is the method for producing a cathode material for a secondary battery according to the sixth aspect, wherein the calcination step has a first stage in a temperature range of room temperature to 300-450° C. and a second stage in a temperature range of room temperature to the calcination completion temperature, and wherein the second stage of the calcination step is carried out after addition of a substance from which conductive carbon is formed by pyrolysis to the product of the first stage of the calcination step. According to this feature, by adding a substance from which conductive carbon is formed by pyrolysis after the first stage of the calcination step, a cathode material on which conductive carbon is uniformly deposited can be obtained. When the effect of the deposition of carbon is combined with the effect of compositing the foreign metal element or elements, a cathode material which exhibits excellent charge/discharge behaviors can be easily obtained.

An eighth aspect of the present invention is the method for producing a cathode material for a secondary battery according to the seventh aspect, wherein the second stage of the calcination step is carried out at a temperature in the range of 750 to 800° C. in an atmosphere of an inert gas. This contributes to the improvement of the charge/discharge characteristics as shown in Examples described later.

A ninth aspect of the present invention is the method for producing a cathode material for a secondary battery according to the seventh or eighth aspect, wherein the substance from which conductive carbon is formed by pyrolysis is a bitumen or a saccharide. Bitumens and saccharides are turned into conductive carbon by pyrolysis and impart conductivity to the cathode material. In particular, a bitumen such as refined coal pitch, which is very inexpensive, is melted and spread evenly over the surfaces of the ingredient particles during calcination, and is pyrolyzed and turned into carbon deposits with high conductivity by calcination at a relatively low temperature. When a saccharide is used, a multiplicity of hydroxyl groups contained in the saccharide act on the surfaces of the particles of the ingredients and generated cathode material strongly and prevent the growth of crystals. Thus, the use of a saccharide can provide excellent crystal-growth inhibiting effect and conductivity-imparting effect.

A tenth aspect of the present invention is a secondary battery containing the cathode material according to any one of the first to fifth aspects as a constituent element. According to this feature, the effect same as that of any one of the first to fifth aspects can be obtained in a secondary battery.

An eleventh aspect of the present invention is a secondary battery containing the cathode material according to any one of the sixth to ninth aspects as a constituent element. According to this feature, the effect of any one of the fifth to seventh aspects can be exhibited and a secondary battery with highly excellent charge/discharge performance can be obtained.

Effects of the Invention

The cathode material containing $Li_nFePO_4$ as a primary component of the cathode active material and a specific foreign metal element or elements is a cathode material having good charge/discharge characteristics which have not been previously achieved. The cathode material can be easily prepared by compositing a cathode active material with a foreign metal element or elements. Further, a cathode material obtained by depositing conductive carbon on the above cathode material exhibits better charge/discharge characteristics.

INDUSTRIAL APPLICABILITY

The cathode material of the present invention and the cathode material produced by the method of the present invention are applicable to a cathode material for a secondary battery for use in electric vehicles and hybrid electric vehicles as well as various portable devices such as cellular phones.

BEST MODE FOR CARRYING OUT THE INVENTION

Figure 1:
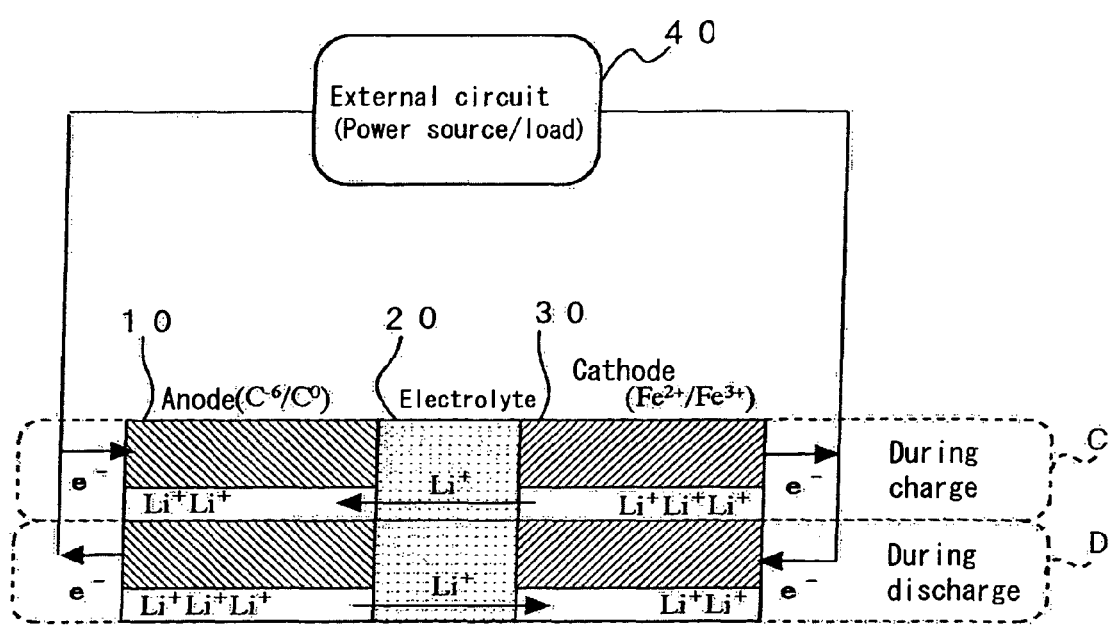
FIG. 1 is a schematic view for explaining the charge and discharge behaviors of a secondary battery.

Description will be hereinafter made of an embodiment of the present invention in detail in the following order: (A) Cathode material for secondary battery, (B) Method for producing cathode material for secondary battery and (C) Secondary battery.

(A) Cathode Material for Secondary Battery

A cathode material for a secondary battery according to the present invention contains a cathode active material represented by a general formula $Li_nFePO_4$ (wherein n represents a number from 0 to 1) as a primary component, one or more metal elements selected from the group consisting of metal elements belonging to Group 4, 5, 6, 11, 12, 13 and 14 of the Periodic Table, and a halogen element in an amount of 0.1 mol % or more based on P. More particularly, the metal elements are selected from the group consisting of vanadium (V), chromium (Cr), copper (Cu), zinc (Zn), indium (In), tin (Sn), molybdenum (Mo), and titanium (Ti) and composited with the cathode active material $Li_nFePO_4$ as a specific foreign metal element in the cathode material (The cathode material may be hereinafter referred to as "composite cathode material.").

It has not been revealed in what state the foreign metal element is in the composite cathode material. It is considered that the foreign metal element has been substituted for some of Li or Fe and exists in the form of crystalline solid solution like $(Li_{1-y}M_y)FePO_4$ or $Li(Fe_{1-z}M_z)PO_4$ (wherein M represents the foreign metal element, and y and z are numbers which satisfy the stoichiometric conditions), or exists as another compound conjugate which can supply electrons or positive holes. In the present invention, the terms "composite" and "compositing" are used in a wide sense including the solid solution form and conjugate form.

Since $Li_nFePO_4$ as a primary active material of the composite cathode material of the present invention has a crystal framework structure [with point group PNMA (olivine type) or PBNM, both of which can be used as a cathode active material but the former is more general] which does not undergo any substantial change when subjected to electrochemical oxidation-reduction, the substance can be used as a cathode material for an alkali metal secondary battery which can be charged and discharged repeatedly. As a cathode material, the substance, in its own state, is in a state corresponding to a discharged state, and, when oxidation of central metal element Fe accompanied by undoping of the alkali metal Li occurs by electrochemical oxidation at its interface with an electrolyte, the cathode material is brought to a charged state. When the cathode material in the charged state is subjected to electrochemical reduction, reduction of central metal element Fe accompanied by redoping of the alkali metal Li occurs and the cathode material returns to the initial state, that is, to the discharged state.

The composite cathode material contains a halogen element in an amount of 0.1 mol % or more based on P. It has been confirmed, as described later, that the composite cathode material exhibits better charge/discharge characteristics than cathode materials containing a halogen element in an amount below the detection limit at the moment or in an amount of 0.01 mol % or less based on P.

The content of the foreign metal element in the composite cathode material is preferably 0.1 to 5 mol %, more preferably 0.5 to 3 mol %, in terms of element ratio, based on iron in the cathode active material.

In a preferred embodiment of the present invention, the cathode material has conductive carbon deposited on the surface thereof. The deposition of conductive carbon on the surface of the cathode material is made by adding a substance from which conductive carbon is formed by pyrolysis (which will be hereinafter referred to as "conductive carbon precursor") during a calcination process as described later.

(B) Method for Producing Cathode Material for Secondary Battery

<Outline of the Production Method>

The cathode material for a secondary battery of the present invention is obtained by calcining a calcination precursor prepared by mixing the ingredients of the cathode active material $Li_nFePO_4$ and a halide of a metal as described above for a prescribed period of time in a prescribed atmosphere at a prescribed temperature. That is, the cathode material for a secondary battery can be produced by mixing the ingredients of lithium iron phosphate and a prescribed amount of a halide of a foreign metal element and calcining the mixture for a prescribed period of time in a prescribed atmosphere at a prescribed temperature until the reaction is completed.

A carbon deposited composite cathode material obtained by depositing conductive carbon on the surface of the cathode material composited with the foreign metal element exhibits better charge/discharge characteristics than the cathode material without carbon deposits. The carbon deposited composite cathode material can be produced by the steps of preparing a calcination precursor, in the same manner as described before, by adding the metal halide to the ingredients of the cathode active material and, for example, stirring and grinding the mixture, carrying out a first stage of calcination (preliminary calcination) of the calcination precursor at 300 to 450° C. for several hours (five hours, for example), adding a prescribed amount of a conductive carbon precursor (a bitumen such as coal pitch or a saccharide such as dextrin) to the product of the preliminary calcination and grinding and stirring the mixture, and carrying out a second stage of calcination (final calcination) in a prescribed atmosphere for a period of time ranging from a few hours to one day.

A carbon deposited composite cathode material with relatively good charge/discharge characteristics can be obtained by calcining a calcination precursor prepared by adding the conductive carbon precursor to the ingredients of the cathode active material together with the metal halide (not adding it to the product of the preliminary calcination) and grinding and stirring the mixture. At this time, it is preferred to carry out the calcination as a two-stage process including a preliminary calcination and a final calcination and grind the product of the preliminary calcination as described before.

Of the above two methods, which are different in the timing of adding the conductive carbon precursor, the former (in which the conductive carbon precursor is added after the preliminary calcination) is preferred since a carbon deposited composite cathode material with better charge/discharge characteristics can be obtained. Thus, description will be hereinafter made mainly about the former method. However, in the latter method (in which the conductive carbon precursor is added before the preliminary calcination), the preparation of the calcination precursor and the selection of calcination conditions can be made in the same manner as in the former method.

<Ingredients of Cathode Active Material $Li_nFePO_4$>

Description will be made of an $Li_nFePO_4$ cathode active material with a general olivine-type structure. Suitable examples of a substance for introducing lithium among the ingredients of $Li_nFePO_4$ with an olivine-type structure include hydroxides such as LiOH, carbonates and hydrogencarbonates such as $Li_2CO_3$, halides including chloride such as LiCl, nitrates such as $LiNO_3$, and other Li-containing degradable volatile compounds from which only Li remains in the resulting cathode material such as organic acid salts of Li. Phosphates and hydrogenphosphates such as $Li_3PO_4$, $Li_2HPO_4$, and $LiH_2PO_4$ can be also used.

Suitable examples of a substance for introducing iron include hydroxides, carbonates and hydrogencarbonates, halides such as chloride, nitrates of iron, and other iron containing degradable volatile compounds from which only Fe remains in the resulting cathode material (e.g., organic acid salts, such as oxalates and acetates, of iron, and organic complexes, such as acetylacetone complexes and metallocene complexes, of iron). Phosphates and hydrogenphosphates of iron can be also used.

Suitable examples of a substance for introducing phosphoric acid include phosphoric anhydride $P_2O_5$, phosphoric acid $H_3PO_4$, and degradable volatile phosphates and hydrogenphosphates from which only phosphate ions remain in the resulting cathode material [e.g., ammonium salts such as $(NH_4)_2HPO_4$, $NH_4H_2PO_4$, and $(NH_4)_3PO_4$].

When the ingredients contain undesirable elements or substances remaining in the resulting cathode material, the elements or substances should be decomposed or vaporized during calcination. It is needless to say that non-volatile oxo acid salts other than phosphate ions should not be used. Hydrates of the above compounds [e.g., $LiOH.H_2O$, $Fe_3(PO_4)_2.8H_2O$] can be also used although not shown here.

<In the Case where Metal Iron is Used as the Ingredient for Introducing Iron>

As the ingredient for introducing iron, metal iron as a primary material which is inexpensive and easily available, not a compound as above, can be used. The metal iron used is in the form of particles with a diameter of 200 μm or smaller, preferably 100 μm or smaller. In this case, metal iron, a compound which releases phosphate ions in a solution, a lithium source compound, and water can be used as the ingredients of the cathode material. When the mole ratio of phosphor, iron and lithium in the ingredients is adjusted to 1:1:1, the generation of impurities during the calcination process and entry of impurities into the cathode material can be minimized.

Examples of the "compound which releases phosphate ions in a solution" usable with metal iron include phosphoric acid $H_3PO_4$, phosphorous pentoxide $PO_5$, ammonium dihydrogenphosphate $NH_4H_2PO_4$, and diammonium hydrogenphosphate $(NH_4)_2HPO_4$. Among these, phosphoric acid, phosphorous pentoxide, ammonium dihydrogenphosphate are preferred since the iron can be kept under relatively strong acidic conditions during the process of dissolving. Although commercially available reagents may be used for these compounds, when phosphoric acid is used, it is preferred to measure its purity precisely by titration and calculate a factor in advance for stoichiometric precision.

As the "lithium source compound" usable in combination with metal iron, it is preferred to select a compound from which only Li remains in the resulting cathode material after calcination (an Li-containing degradable volatile compound as described before). Suitable examples of the compound include hydroxides such as lithium hydroxide LiOH, carbonates such as lithium carbonate $Li_2CO_3$, organic acid salts of Li, and hydrates thereof ($LiOH.H_2O$, etc.).

<Metal Halide>

As an ingredient for introducing a foreign metal element, a halide of a metal element belonging to Group 4, 5, 6, 11, 12, 13 or 14 of the Periodic Table (which may be herein referred to as "metal halide") is preferably used. Suitable metal halides include chloride, bromide, and iodide (including hydrates thereof).

In particular, compositing of a halide of molybdenum (Mo), titanium (Ti), vanadium (V), chromium (Cr), copper (Cu), zinc (Zn), indium (In) or tin (Sn) has a good effect on improvement of the cathode performance. Chlorides are advantageous among the metal halides since they are relatively inexpensive and easily available.

Examples of metal halides to be added to the ingredients of the cathode material are shown below (hydrates of the compounds can be also used although not shown here).

Suitable examples of halides of molybdenum (Mo) include $MoCl_5$, $MoCl_3$, $MoBr_3$, $MoI_2$, and $MoF_6$. Suitable examples of halides of titanium (Ti) include $TiCl_4$, $TiCl_3$, $TiBr_4$, $TiI_4$, $TiF_4$ and $TiF_3$. Suitable examples of halides of vanadium (V) include $VCl_3$, $VCl_4$, $VCl_2$, $VBr_3$, $VI_3$, and $VF_4$. Suitable examples of halides of chromium (Cr) include $CrCl_3$, $CrCl_2$, $CrBr_3$, and $CrF_3$. Suitable examples of halides of copper (Cu) include $CuCl_2$, CuCl, $CuBr_2$, CuBr, CuI and $CuF_2$. Suitable examples of halides of zinc (Zn) include $ZnCl_2$, $ZnBr_2$, $ZnI_2$ and $ZnF_2$. Suitable examples of halides of indium (In) include $InCl_3$, $InCl_2$, $InCl$, $InBr_3$, $InBr$, $InI_3$, $InI$ and $InF_3$. Suitable examples of halides of tin (Sn) include $SnCl_2$, $SnCl_4$, $SnBr_2$, $SnBr_4$, $SnI_2$, $SnI_4$, $SnF_2$ and $SnF_4$.

The amount of the metal halide added is such that the content of the foreign metal element can be about 0.1 to 5 mol %, preferably about 0.5 to 3 mol %, based on the central metal element Fe in the ingredients of the cathode material. In some cases, when a reducing agent such as carbon or hydrogen, an oxidizing agent such as oxygen, and/or a third component such as chloride or phosgene are added prior to the calcination to the calcination precursor of the cathode material to which the metal halide has been added depending on the type of the metal halide, the cathode material composited with the foreign metal element can be prepared in better conditions. A metal or an oxide of the metal can be used as the ingredient of the composite material when the preparation of the calcination precursor or preliminary calcination is carried out under conditions under which a halide of the metal can be generated when mixed with another substance.

<Conductive Carbon Precursor>

Examples of the conductive carbon precursor include bitumens (what is called asphalt; including pitches obtained from coals or petroleum sludge), saccharides, stylene-divinylbenzen copolymers, ABS resins, phenol resins, and crosslinked polymers containing aromatic groups. Among these, bitumens (especially, what is called refined coal pitch) and saccharides are preferred. Bitumens and saccharides are turned into conductive carbon by pyrolysis and impart conductivity to the cathode material. In particular, refined coal pitch is very inexpensive. Also, refined coal pitch is fused and spread evenly over the surfaces of the ingredient particles during calcination, and is subjected to pyrolysis and turns into carbon deposits with high conductivity by calcination at a relatively low temperature (650 to 800° C.). When a saccharide is used, a multiplicity of hydroxyl groups contained in the saccharide act on the surfaces of the particles of the ingredients and generated cathode material strongly and prevent the growth of crystals. Thus, the use of a saccharide can provide excellent crystal-growth inhibiting effect and conductivity-imparting effect.

In particular, refined coal pitch having a softening point in a range of 80 to 350° C. and a pyrolytic weight-loss initiation temperature in a range of 350 to 450° C. and capable of forming conductive carbon by pyrolysis and calcination at a temperature not lower than 500° C. and not higher than 800° C. is suitably used. In order to further improve the performance of the cathode, the use of refined coal pitch having a softening point in a range of 200 to 300° C. is more preferred. It is needless to say that impurities contained in the refined coal pitch should not adversely affect the cathode performance, and the use of refined coal pitch having an ash content of not higher than 5000 ppm is particularly preferred.

Especially preferred as the saccharide is one which is decomposed in a temperature range of not lower than 250° C. and lower than 500° C. and gets partially melted at least once in the course of heating from 150° C. up to the above-described temperature range and from which conductive carbon is formed by pyrolysis and calcination at a temperature not lower than 500° C. and not higher than 800° C. This is because a saccharide having the above specific properties is melted and adequately coats the surfaces of the cathode material particles during reaction under heating and is turned into conductive carbon deposits properly on the surfaces of the generated cathode material particles by pyrolysis, and because it can prevent the growth of crystals during this process as described before. Further, the saccharide preferably form by pyrolysis at least 15% by weight, preferably at least 20% by weight, of conductive carbon based on the dry weight of the saccharide before the calcination. This is to make it easy to control the amount of resulting conductive carbon. Examples of the saccharide having the above properties include oligosaccharides such as dextrin, and high-molecular saccharides such as soluble starches and slightly crosslinked starches prone to melting when heated (for example, starches containing 50% or more of amylose).

<Preparation of Calcination Precursor>

As described before, the calcination precursor can be prepared by a method including the steps of adding a halide of a foreign metal element to the ingredients of lithium iron phosphate, and grinding and stirring the mixture in a planetary ball mill, an oscillatory or rotary powder mixer or the like for a period of time ranging from one hour to one day in dry conditions (which is hereinafter referred to as "dry blending"), or by a method including the steps of adding a halide of a foreign metal element, together with an organic solvent such as alcohol, ketone or tetrahydrofuran, or a solvent or dispersion medium such as water, to the ingredients of the cathode material, grinding and stirring the mixture for a period of time ranging from one hour to one day in wet conditions, and drying the reaction product (which is hereinafter referred to as "wet blending").

Among the metal halides mentioned before, molybdenum pentachloride ($MoCl_5$), titanium tetrachloride ($TiCl_4$), vanadium trichloride ($VCl_3$) are extremely unstable and easily decompose generating chlorine or hydrogen chloride in air at room temperature. Also, these substances easily react with water or alcohols to produce hydroxides or metal alkoxides. When such an unstable metal halide is added to the mixed ingredients of the cathode material and the mixture is subjected to wet blending, a calcination precursor of a cathode material composited with a foreign metal element is produced through a reaction which generates a hydroxide or metal alkoxide. A lithium iron phosphate cathode material composited with a metal such as Mo, Ti or V obtained by calcining the calcination precursor has higher rate performances and a larger capacity than a cathode material which is not composited with such a metal, which indicates that the compositing of such a metal has an effect on improvement of the cathode performance. However, the use of a metal composite lithium iron phosphate cathode material produced by calcining a calcination precursor obtained by directly adding such a metal halide to dry mixed ingredients of the cathode material and dry-blending the mixture is preferred since it has better rate characteristics and a large capacity close to the theoretical capacity as compared with the above metal composite cathode material produced by wet-blending.

When a metal halide which is not decomposed or dechlorinated in air or water among the metal halides mentioned before, such as chromium trichloride (including hydrates thereof), copper dichloride, zinc chloride, indium chloride tetrahydrate, tin dichloride or tin tetrachloride, is used, a cathode precursor which can be converted into a cathode material with high performance can be obtained by both wet blending and dry blending. A suitable calcination precursor can be also obtained when such a stable metal halide is added to the ingredients of the cathode material when the ingredients of the cathode material are mixed and is ground and stirred together with the ingredients of the cathode material so that adding and mixing the metal halide can be performed together with grinding and stirring the ingredients of the cathode material. At this time, no problem arises even if an alcohol or water is added to the mixture and the grinding and stirring is performed in wet conditions. In general, a uniform, fine and stable calcination precursor can be obtained by grinding and stirring in wet conditions.

When metal iron is used as an ingredient of the cathode active material, the calcination precursor is prepared by mixing a compound which releases phosphate ions in a solution, water and metal iron to dissolve the iron, adding an Li-containing degradable volatile compound such as lithium carbonate, lithium hydroxide or a hydrate thereof to the mixture, adding a metal halide as described above to the reaction product, and grinding and stirring the resulting mixture in dry or wet conditions in the same manner as described above. In this case, in order to dissolve the metal iron as an ingredient of the cathode active material, the compound which releases phosphate ions in a solution such as phosphoric acid, metal iron and water are first mixed and reacted by grinding or heating (refluxing or the like). The grinding is conducted to apply a shear force to the metal iron in the solution to renew the surfaces thereof to dissolve the metal iron. The yield of the cathode material can be thereby improved. The grinding is preferably conducted in an automatic grinding machine, ball mill, beads mill or the like for about 30 minutes to 10 hours, depending on the efficiency of the grinding device. Irradiation of ultrasonic wave is also effective to complete the dissolution reaction of the metal iron. Also, when the reactants are heated, the reduction resolution of the metal iron is accelerated and the yield of the cathode material can be improved. The heating is preferably carried out by refluxing in an inert gas, for example, to prevent oxidation of the iron. Refluxing is considered to be suitable for large-scale production since there is no need for a mechanical pulverizing process, which is relatively difficult to perform in a large scale. In dissolving the metal iron, a volatile acid such as oxalic acid or hydrochloric acid may be added to increase the acid concentration, or a volatile oxidizing agent such as oxygen (air), hydrogen peroxide, halogen (bromine, chlorine, etc.), or an oxyhalide such as hypochlorous acid or bleaching powder may be added. Addition of nitric acid, which is a volatile acid which is oxidative and acidic, is also effective. The reaction is carried out effectively when the reactants are heated to about 50 to 80° C. The above volatile acid and oxidizing agent are preferably used in an amount equal to or less than required for the oxidation of iron from its metallic form to iron (II) ions. As a result, the dissolution of the metal iron into the solution of phosphoric acid or the like can be thereby accelerated, and the volatile acid, oxidizing agent and so on are removed by the calcination process and do not remain in the cathode material.

Then, lithium hydroxide or the like as a lithium source is added to the solution into which iron has been dissolved by grinding or heating as described above. After the addition of the lithium source, pulverizing or grinding is preferably conducted as needed. When grinding and stirring is conducted after the addition of the metal halide, a calcination precursor is prepared.

<Outline of Calcination>

The calcination precursor obtained by mixing the ingredients of the cathode material and the metal halide as described above is subjected to calcination. The calcination is carried out under calcination conditions of suitable temperature range, from 300 to 900° C. as generally employed, and suitable treatment time. The calcination is preferably carried out under oxygen-free conditions in order to prevent generation of oxidant impurities and promote reduction of remaining oxidant impurities.

In the production method of the present invention, although the calcination can be carried out in a single stage including the heating and its subsequent temperature maintenance, the calcination process is preferably divided into two stages, that is, a first calcination stage in a lower temperature range (generally, in a temperature range of room temperature to 300-450° C.; which may be hereinafter referred to as "preliminary calcination") and a second calcination stage in a higher temperature range (generally, in a range of room temperature to the calcination completion temperature (about 500 to 800° C.); which may be hereinafter referred to as "final calcination").

In the preliminary calcination, the ingredients of the cathode material are heated and reacted into an intermediate phase before transforming into the final cathode material. At this time, pyrolytic gas is generated in many cases. As the temperature at which the preliminary calcination should be finished, a temperature at which the gas generation has been almost completed but the reaction into the cathode material as the final product has not fully proceeded (in other words, a temperature at which there is still a room for the constituent elements in the cathode material to undergo rediffusion and homogenization in the final calcination in a higher temperature range as the second stage) is selected.

In the final calcination following the preliminary calcination, the temperature is raised to and maintained in a range in which the rediffusion and homogenization of the constituent elements occurs, the reaction into the cathode material is completed, and, moreover, crystal growth by sintering or the like can be prevented as much as possible.

When the carbon deposited composite cathode material as described before is produced, the performance of the resulting cathode material can be further improved when the second stage of the calcination is carried out after a conductive carbon precursor has been added to the product of the first stage of the calcination. When a conductive carbon precursor, especially a coal pitch or a saccharide which is melted by heating, is used, it is preferred to conduct the final calcination after adding it to the ingredients after the preliminary calcination (in an intermediate phase where the generation of gas from the ingredients has been almost completed) although it may be added to the ingredients before the preliminary calcination (even in this case, the cathode performance can be fairly improved). This means providing the step of adding the conductive carbon precursor to the ingredients between the preliminary calcination and the final calcination in the calcination process. This makes it possible to prevent the conductive carbon precursor such as a coal pitch or saccharide which undergoes melting and pyrolysis by heating from being foamed by the gas given off from the ingredients, so that molten conductive carbon precursor can be spread more evenly on the surfaces of the cathode material, allowing pyrolytic carbon to be deposited more uniformly.

This is attributed to the following reason.

Since most of the gas produced from the decomposition of the ingredients is released during the preliminary calcination and substantially no gas is generated during the final calcination, the addition of the conductive carbon precursor after the preliminary calcination allows uniform deposition of conductive carbon. As a result, the resulting cathode material is provided with higher surface conductivity, and the particles of the cathode material are firmly and stably bonded together. A carbon deposited composite cathode material with relatively good charge/discharge characteristics can be obtained when the conductive carbon precursor is added to the ingredients before the preliminary calcination as described before. However, the performance of the cathode material produced by this method is not as good as that of the cathode material produced by adding a conductive carbon precursor after the preliminary calcination. This is considered to be because gas vigorously given off from the ingredients during the preliminary calcination foams the conductive carbon precursor in a molten and incompletely pyrolyzed state to inhibit uniform deposition of carbon and adversely affects the compositing of the foreign metal element.

The calcination may be carried out while a predetermined amount of hydrogen or water (water, water vapor or the like) is continuously fed, together with an inert gas, into a furnace. Then, a carbon deposited composite cathode material with better charge/discharge characteristics than those of a carbon deposited composite cathode material produced without feeding hydrogen or water can be sometimes obtained. In this case, hydrogen or water may be added throughout the entire period of the calcination process, or particularly while the temperature is in a range of not higher than 500° C. to the calcination completion temperature, preferably in a range of not higher than 400° C. to the calcination completion temperature, more preferably in a range of not higher than 300° C. to the calcination completion temperature. To "add" gaseous hydrogen or water vapor includes conducting calcination in the presence of hydrogen gas (in an atmosphere of hydrogen or the like).

<Calcination Conditions (in the Case where Deposition of Conductive Carbon is not Involved)>

The conditions under which the calcination precursor is calcined (in particular, calcination temperature and calcination period) should be set carefully.

The higher the calcination temperature, the better to complete and stabilize the reaction of the ingredients of the composite cathode material. However, when deposition of conductive carbon is not involved, too high a calcination temperature may cause too much sintering and growth of crystals, which leads to a significant deterioration of the charge/discharge rate characteristics. Thus, the calcination temperature is in the range of about 600 to 700° C., preferably in the range of about 650 to 700° C., and the calcination is carried out in an inert gas such as $N_2$ or Ar. When hydrogen (including water from which hydrogen is produced by thermolysis) is added at this time as described before, the performance of the resulting cathode material can sometimes be improved.

The calcination period is from a few hours to about three days. When the calcination temperature is about 650 to 700° C., if the calcination period is about 10 hours or less, the uniformity of the foreign metal element solid solution in the resulting cathode material may be insufficient. If so, abnormal charging/discharging sometimes occurs and the performance is rapidly deteriorated after about a dozen cycles of charging and discharging. Thus, the calcination period is preferably one to two days (24 to 48 hours). The abnormal charging/discharging, which has been confirmed to occur when, for example, the foreign metal element is Mo, is an abnormal behavior in which the internal resistance of the battery increases with the progress of the cycles and the relation between the charge/discharge capacity and the voltage exhibits a discontinuous two-stage curve in the middle of discharge, and the cause of it has not yet been discovered. At present, it is considered to be because cohesion or phase separation/segregation of localized chemical species of the foreign metal element is induced by the movement of $Li^+$ ions during charge and discharge and the movement of $Li^+$ ions is inhibited.

Even when Mo is used as the foreign metal element, such abnormal behavior is not observed when the calcination temperature is 700° C. or higher. However, sintering of the cathode material and growth of crystals are accelerated and good battery performance cannot be achieved. Thus, an appropriate period shorter than 10 hours should be selected as the calcination period. A coin-type battery with a metal Li anode using an $LiFePO_4$ cathode material composited with a foreign metal element produced under good conditions exhibits a large charge/discharge capacity close to the theoretical capacity (about 170 mAh/g) at room temperature at a charge/discharge current density of 0.5 mA/cm² and good charge/discharge cycle performances as shown in Examples described later.

In order to achieve good uniformity of the cathode material, it is preferred to fully pulverize and stir the product of the preliminary calcination between the first and second stages of calcination (preliminary calcination and final calcination) and carry out the second stage of calcination (final calcination) at a prescribed temperature described before.

<Calcination Conditions (in the Case where Deposition of Conductive Carbon is Involved)>

The final calcination temperature is very important also when deposition of conductive carbon is involved. The final calcination temperature is preferably higher (750 to 850° C., for example) than that in the case where deposition of conductive carbon is not involved. When the calcination temperature is high, the uniformity of distribution of the foreign metal element in the cathode material is less likely to be insufficient. Thus, a calcination period of 10 hours or less is selected. When a carbon deposited composite cathode material is produced by depositing conductive pyrolytic carbon derived from a bitumen such as coal pitch or a saccharide such as dextrin on the $LiFePO_4$ cathode material composited with a foreign metal element, if the final calcination temperature is not higher than 750° C., the resulting cathode material exhibits the same abnormal behavior as the cathode material composited with a foreign metal element without carbon deposits does during charge/discharge cycles. That is, the internal resistance of the battery increases with the progress of the cycles, and the relation between the charge/discharge capacity and the voltage exhibits a discontinuous two-stage curve, which may deteriorate the performance.

However, a carbon deposited composite cathode material subjected to final calcination at a temperature higher than about 750° C., such as 775° C., in an inert gas does not exhibit the abnormal behavior. This is assumed to be because the distribution of the foreign metal element is uniformed and stabilized by employing a relatively high final calcination temperature. As shown in Examples described later, it has been found that a battery with a metal Li anode using the thus obtained foreign metal element/carbon/$LiFePO_4$ composite cathode material exhibits a charge/discharge capacity of about 160 mAh/g, which is close to the theoretical capacity 170 mAh/g, at room temperature at a charge/discharge current density of 0.5 mA/cm², and has an extremely long cycle life and dramatically improved rate characteristics.

In the case of a carbon deposited composite cathode material, unlike a deposited carbon-free cathode material, deterioration of performance such as a decrease in the capacity rarely occurs even when calcination is carried out at a high temperature of 775° C., for example. This is considered to be because the conductivity of the cathode material is improved by both the compositing of the foreign metal element and deposition of the conductive carbon and because Li ions can move easily in the cathode material particles since the deposited conductive carbon inhibits the sintering and growth of crystals to prevent increase in the size of cathode material particles. Thus, the carbon deposited composite cathode material produced under the above conditions has very high performance and very high stability at the same time. The final calcination is preferably carried out at a temperature in the range of about 775 to 800° C. since when the final calcination is carried out at a temperature not lower than about 850° C., the active material $LiFePO_4$ may be pyrolyzed to cause a change in composition and sintering.

The amount of conductive carbon deposits is preferably in the range of about 0.5 to 5% by weight based on the total weight of the cathode material composited with the foreign metal element and the conductive carbon, depending on the size of crystalline particles of the cathode material composited with the foreign metal element. Preferably, the amount of conductive carbon deposits is about 1 to 2% by weight when the crystalline particle size is about 50 to 100 nm and about 2.5 to 5% by weight when the crystalline particle size is about 150 to 300 nm. When the amount of carbon deposits is smaller than the above range, the conductivity imparting effect is low. When the amount of carbon deposits is too large, the deposited carbon inhibits the movement of $Li^+$ ions on the surfaces of the crystalline particles of the cathode material. In both cases, the charge/discharge performance tends to be lowered. To deposit a suitable amount of carbon, it is preferred to determine the amount of bitumen such as coal pitch and/or saccharide such as dextrin as a carbon precursor to be added based on the weight loss rate of the carbon precursor at pyrolytic carbonization obtained in advance.

(C) Secondary Battery

Examples of the secondary battery using the cathode material of the present invention obtained as described above include metal lithium battery, lithium ion battery and lithium polymer battery.

Taking a lithium ion battery as an example, description will be hereinafter made of a fundamental construction of a secondary battery. A lithium ion battery is a secondary battery characterized in that $Li^+$ ions move back and forth between an anode active material and a cathode active material in charging and discharging (see FIG. 1), as commonly called "rocking chair type" or "badminton shuttlecock type." In FIG. 1, designated as 10 is an anode, as 20 is an electrolyte, as 30 is a cathode, as 40 is an external circuit (power source/load), as C is the state during charge, and as D is the state during discharge.

During charge, $Li^+$ ions are inserted into the anode (carbon such as graphite is used in currently-available batteries) to form an intercalation compound (at this time, the anode carbon is reduced while the $Li^+$-extracted cathode is oxidized). During discharge, $Li^+$ ions are inserted into the cathode to form an iron compound-lithium complex (at this time, the iron in the cathode is reduced while the $Li^+$-extracted anode is oxidized to return to graphite or the like). During charge and discharge, $Li^+$ ions move back and force through the electrolyte to transport electrical charges. As the electrolyte, a liquid electrolyte prepared by dissolving an electrolyte salt such as $LiPF_6$, $LiCF_3SO_3$, or $LiClO_4$ in a mixed solution of a cyclic organic solvent such as ethylene carbonate, propylene carbonate, or γ-butyrolactone and a chain organic solvent such as dimethyl carbonate, or ethyl methyl carbonate; a gel electrolyte prepared by impregnating a liquid electrolyte as above into a polymer gel substance; or a solid polymer electrolyte prepared by impregnating an electrolyte as above into a partially crosslinked polyethylene oxide is used. When a liquid electrolyte is used, the cathode and the anode have to be insulated from each other by interposing therebetween a porous separating membrane (separator) made of a polyolefin or the like to prevent them from short-circuiting. The cathode and anode are respectively produced by adding a predetermined amount of a conductivity-imparting material such as carbon black and a binder, for example, a synthetic resin such as polytetrafluoroethylene, polyvinylidene fluoride or fluororesin or a synthetic rubber such as ethylene propylene rubber to the cathode or anode material, kneading the mixture with or without a polar organic solvent and forming the kneaded mixture into a thin film. Then, current collection is conducted using a metal foil or metal screen to construct a battery. When metal lithium is used for the anode, transitions between Li(O) and $Li^+$ take place at the anode in charging and discharging and a battery is thereby formed.

As the configuration of the secondary battery, a coin-type lithium secondary battery formed by incorporating a pellet-type cathode in a coin-type secondary battery case and sealing the case and a lithium secondary battery in which a film coated sheet cathode is incorporated can be employed as shown in Examples described later.

EFFECTS

Although the mechanism of the effect of the compositing of the foreign metal element on the cathode material has not yet been known at the moment, there is a possibility that the foreign metal element acts as a doping reagent on the cathode material and improves the conductivities of both the reduced form $LiFePO_4$ and the oxidized form $FePO_4$.

The leading hypothesis on the relation between the conductivities of olivine-type lithium iron (II) phosphate and Li-extracted oxidized form iron (III) phosphate, and the electrode oxidation-reduction and the movement behavior of $Li^+$ ions will be described.

As described before, the volume ratio of the reduced form lithium iron phosphate and the Li-extracted oxidized form iron phosphate coexisting on both sides of an interface in a single crystalline changes during charge and discharge. When completely charged, the conversion to the Li-extracted oxidized form is completed. When completely discharged, the conversion to Li-inserted reduced form is completed.

Figure 2:
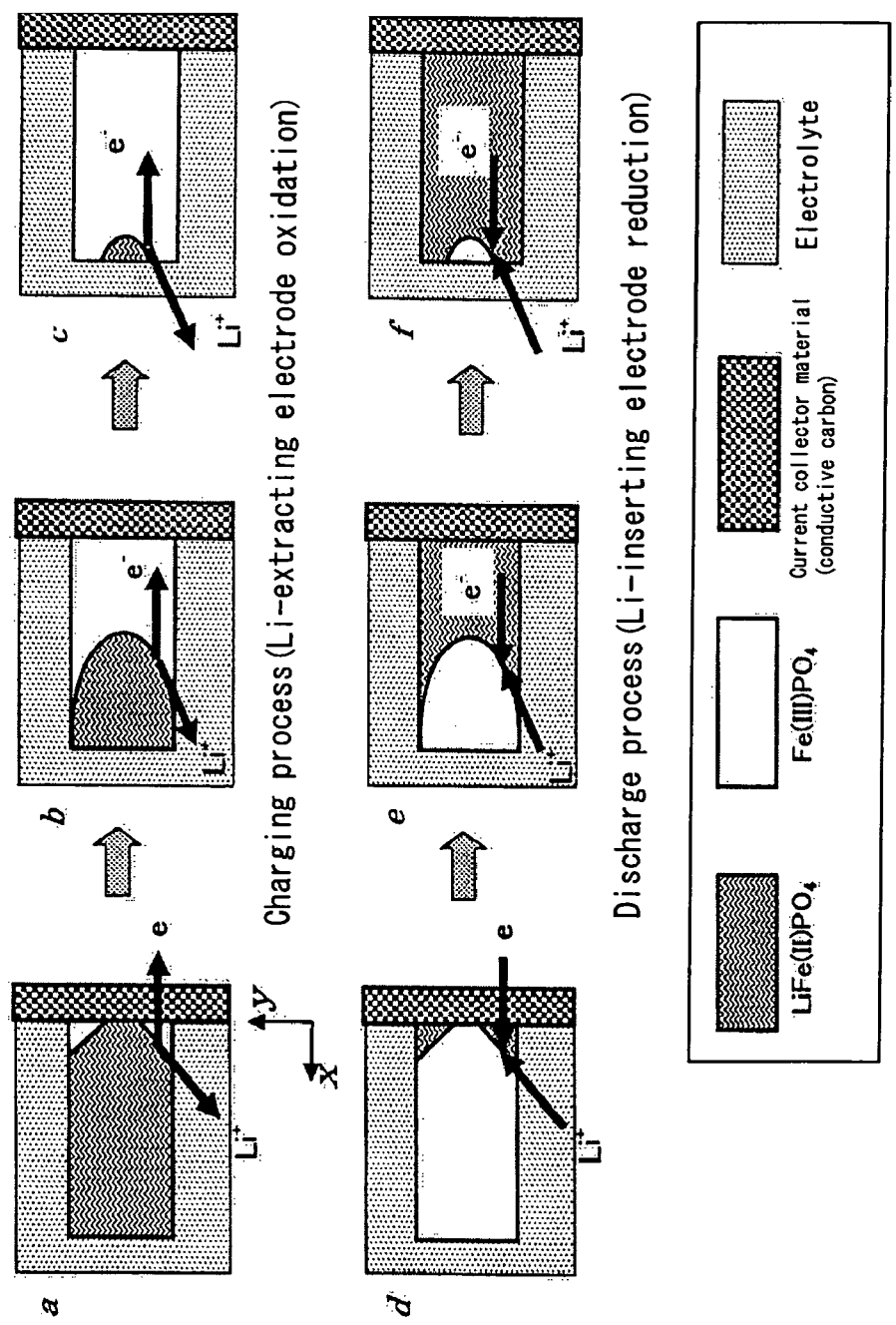
FIG. 2 is a diagram illustrating a two-dimensional hypothesis model of the vicinity of cathode material particles.

To simplify the phenomenon, a two-dimensional model of the vicinity of the cathode material particles as shown in FIG. 2 is useful. FIGS. 2a to 2c illustrate initial, intermediate and final stages of a charging process (Li-extracting electrode oxidation), respectively, and FIGS. 2d to 2f illustrate initial, intermediate and final stages of a discharging process (Li-inserting electrode reduction), respectively. A block of cathode material particles is located along the x-axis with its one side in contact with one side of a current collector material (which corresponds to a conductive auxiliary including conductive carbon deposited on the cathode material) positioned on the y-axis. The other three sides of the cathode material block are in contact with electrolyte, and an electric field is applied in the x-direction. When the cathode material has a low conductivity as in this cathode system, it is considered that, in the initial stage of charge shown in FIG. 2a, the electrode reduction begins at the corners where the three phases of the current collector material, cathode material and electrolyte meet, and the interface between the reduced form $LiFePO_4$ as a first phase into which Li has been fully inserted and the oxidized form $FePO_4$ as a second phase from which Li has been completely extracted moves in the x-direction as the charge progresses. At this time, it is difficult for the $Li^+$ ions to pass through the Li-extracted $FePO_4$ and Li-inserted $LiFePO_4$. Thus, it is most likely that the $Li^+$ ions move along the interface between the two phases into the electrolyte as shown in the drawing (however when there are Li-lost sites in the $LiFePO_4$ and Li-remaining sites in the $FePO_4$, some of the $Li^+$ ions may pass through them causing the rearrangement of the sites). On the other hand, electrons necessarily go out to the external circuit through the oxidized form $FePO_4$ and the current collector material. In steady state during charge under constant current, reduction takes place at one point on the interface to satisfy the electric neutrality. When one $Li^+$ ion moves along the interface, the velocity components in the x- and y-directions of the $Li^+$ ion are equal but opposite to the velocity components in the x- and y-directions, respectively, of an electron generated at the same time and passing through the $FePO_4$ (the velocity vectors are shown by arrows in FIG. 2). Thus, when the local moving velocity vectors of the $Li^+$ ion and electron are integrated on the entire interface, the $Li^+$ ion and electron move in the opposite directions along x-axis as a whole. At this time, if the conductivity of the Li-extracted oxidized form $FePO_4$ is low, both the electrode oxidation and the movement of $Li^+$ ions are both inhibited. In particular, it is considered that since electrons in the Li-extracted oxidized form $FePO_4$ have to move long distances in the intermediate and final stages of charge shown in FIGS. 2b and 2c, large polarization evolves to increase the charge voltage. If the Li-extracted oxidized form $FePO_4$ is highly insulative, the final stage shown in FIG. 2c cannot be reached and the charge has to be completed when the utilization ratio of the active material is still very low.

During discharge, exactly the opposite process takes place as shown in FIGS. 2d to 2f. That is, the Li-inserting electrode reduction begins at the corners where the three phases of the current collector material, cathode material and electrolyte meet and the interface moves in the x-direction as the discharge progresses. Then, in the intermediate and final stages of the discharge shown in FIGS. 2e and 2f, since electrons have to move long distances in the Li-inserted reduced form $LiFePO_4$, large polarization evolves to decrease the discharge voltage. These represent the real changes in the voltage of a secondary battery using this cathode system during charge and discharge under constant current.

For the reasons as above, in this cathode system, it is considered to be significantly advantageous to increase the conductivities of both the Li-inserted reduced form $LiFePO_4$ and Li-extracted oxidized form $FePO_4$ in order to promote the electrode oxidation-reduction and the extraction/insertion of $Li^+$ ions, improve the utilization rate (charge/discharge capacity) of the active material and reduce polarization to realize good rate characteristics.

The compositing of the foreign metal element in the present invention has an extremely large effect on this and inhibits an increase of polarization in the intermediate and final stages of charge shown in FIGS. 2b and 2c and in the intermediate and final stages of discharge shown in FIGS. 2e and 2f. Thus, the charge/discharge voltage curve can be flat over a large charge/discharge depth range, and a high utilization rate of the active material can be realized. The appropriate deposition of conductive carbon combined with the compositing of the foreign metal element in the present invention corresponds to contacting the other three sides of the cathode material particle block with the current collector material shown in FIG. 2. Then, it is considered that since the interface where three phases of the current collector material, cathode material and electrolyte meet is thereby increased, the effect of the compositing of the foreign metal element is synergistically enhanced. As described above, it is assumed that when compositing of the foreign metal element and deposition of conductive carbon are combined, a higher utilization ratio of active material can be realized, and the battery capacity-voltage characteristic curve shows a steep rise or fall of voltage after sufficient current corresponding to the charge/discharge capacity close to the theoretical capacity has been supplied.

The following Examples and Comparative Examples further describe the present invention in more detail. The present invention shall not be limited by these Examples and Comparative Examples, however. In the following Examples and Comparative Examples, the final calcination period was set to 10 hours but the abnormal charging/discharging as described before did not occur.

Example 1

An $LiFePO_4$ cathode material composited with vanadium (V) as a foreign metal element was synthesized by the following procedure.

A mixture of 4.4975 g of $FeC_2O_4 \cdot 2H_2O$ (product of Wako Pure Chemical Industries, Ltd.), 3.3015 g of $(NH_4)_2HPO_4$ (special grade; product of Wako Pure Chemical Industries, Ltd.), and 1.0423 g of $LiOH \cdot H_2O$ (special grade) was mixed with a volume of ethanol about 1.5 times that of the mixture. The resulting mixture was pulverized and stirred in a planetary ball mill with 2 mm zirconia beads and a zirconia pot for 1.5 hours and dried at 50° C. under reduced pressure. The dried mixture was mixed with 0.0393 g (which corresponds to 1 mol %, in terms of element ratio, based on Fe in $FeC_2O_4 \cdot 2H_2O$) of vanadium trichloride $VCl_3$ (product of Wako Pure Chemical Industries, Ltd.), and the resulting mixture was ground and stirred in an automatic agate mortar for 1.5 hours to obtain a calcination precursor. The calcination precursor was subjected to preliminary calcination in an alumina crucible at 400° C. for five hours while feeding pure $N_2$ gas at a flow rate of 200 ml/min. The product of the preliminary calcination was pulverized in an agate mortar for 15 minutes and subjected to final calcination at 675° C. for 10 hours in the same atmosphere (with the gas being fed from the start of heating and kept supplied during the calcination process until after the calcination product was cooled).

Figure 3:
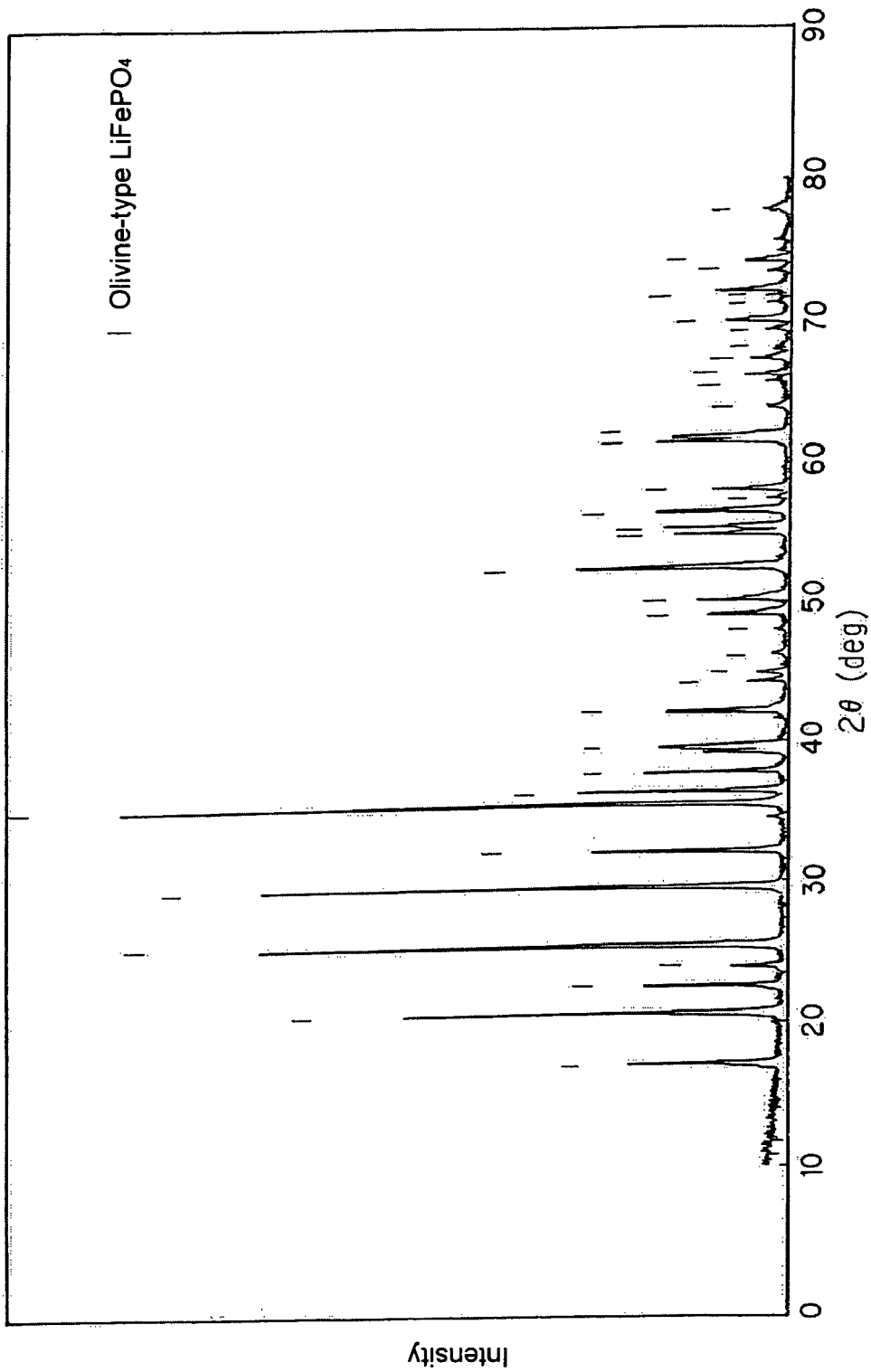
FIG. 3 is a graph showing the result of X-ray diffraction analysis of a vanadium composite cathode material obtained in Example 1.

The cathode material synthesized as described above was identified as $LiFePO_4$ having an olivine-type crystal structure by powder X-ray diffraction analysis and no other diffraction peaks ascribable to impurities were observed (The result of X-ray diffraction analysis is shown in FIG. 3). Elemental analysis of the cathode material by ICP emission spectrometry indicated that it had a composition of (Li:Fe:V:P)=(1.01:0.97:0.0089:1) (element molar ratio with respect to phosphorus (P)). The amount of added foreign metal element such as vanadium is hereinafter represented not by the real content but by mole percentage based on Fe for convenience sake.

The cathode material, Denka Black (registered trademark, 50% pressed product), product of Denki Kagaku Kogyo K.K. as a conductivity-imparting material and unsintered PTFE (polytetrafluoroethylene) powder as a binder were mixed at a ratio by weight of 70:25:5 and kneaded. The kneaded mixture was rolled into a sheet with a thickness of about 0.6 mm, and the sheet was punched out into discs with a diameter of 1.0 cm to form a pellet as a cathode.

A metal titanium screen and a metal nickel screen were welded as cathode and anode current collectors, respectively, to a coin-type battery case made of stainless steel (Model No. CR2032) by spot welding. The cathode and an anode made of a metal lithium foil were assembled in the battery case with a porous polyethylene separating membrane (E-25, a product of Tonen Chemical Corp.) interposed between the cathode and the anode. The battery case was filled with a 1 M solution of $LiPF_6$ in a 1:1 mixed solvent of dimethyl carbonate and ethylene carbonate (product of Toyama Pure Chemical Industries, Ltd.) as an electrolyte solution, and then sealed to fabricate a coin-type lithium secondary battery. The entire process of assembling the cathode and anode, separating membrane, and electrolyte into a battery was performed in an argon-purged glove box.

Figure 4:
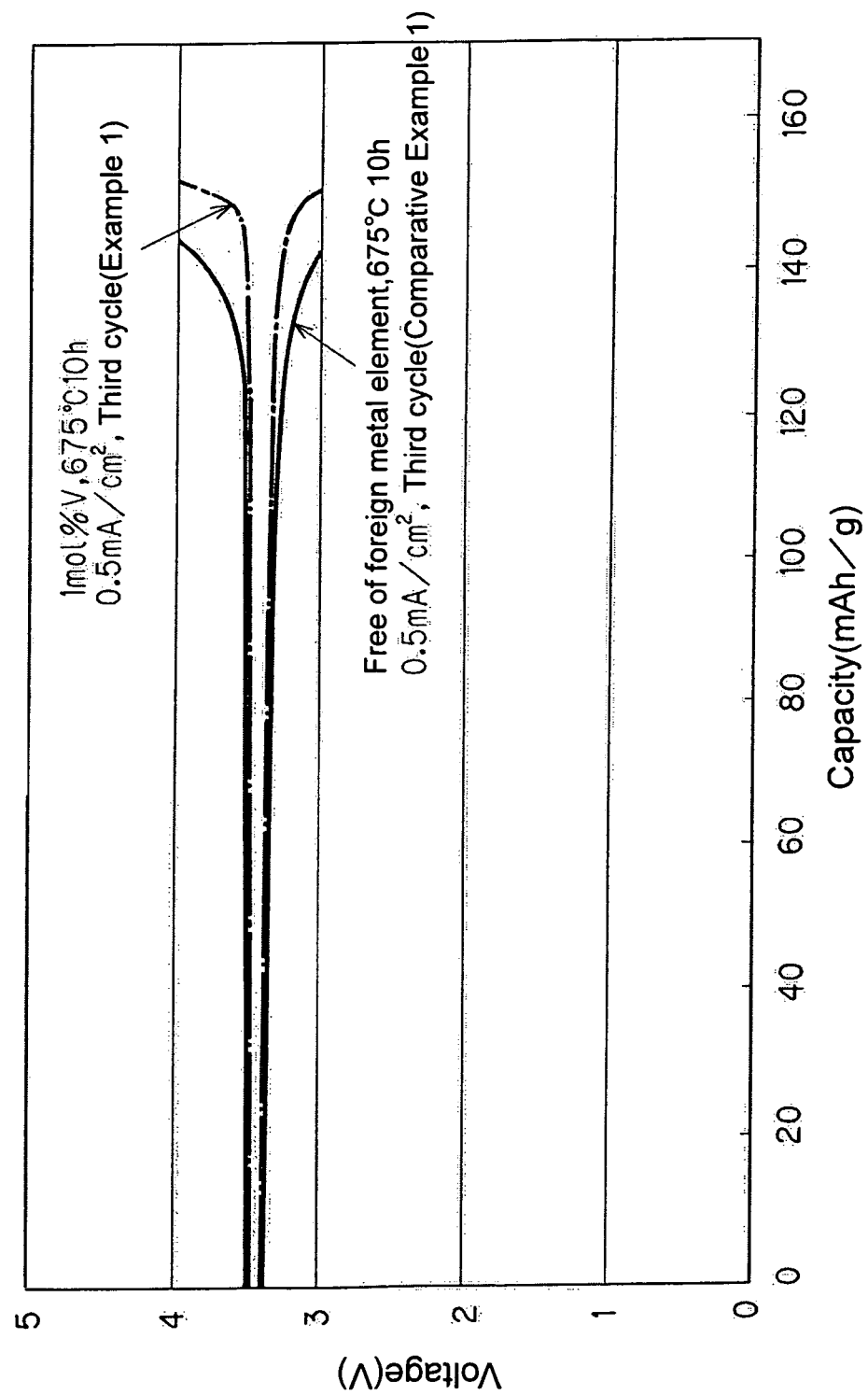
FIG. 4 is a graph showing the charge/discharge curves in the third cycle of secondary batteries obtained in Example 1 and Comparative Example 1.
Figure 5:
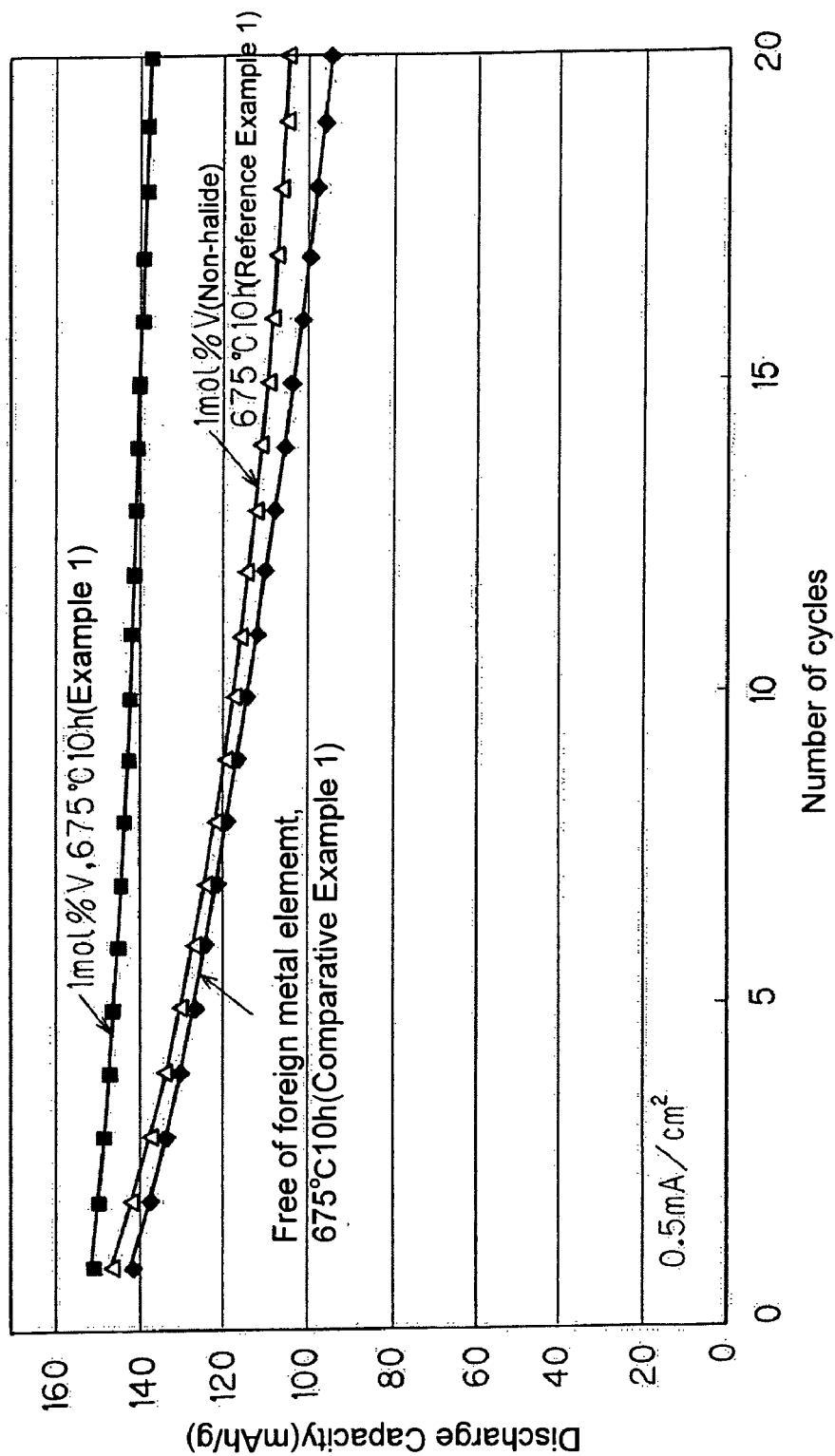
FIG. 5 is a graph showing the cycle discharge characteristics of secondary batteries obtained in Example 1, Comparative Example 1 and Reference Example 1.

The coin-type secondary battery with the cathode material produced according to the production method of the present invention was repeatedly charged and discharged under constant current at charge/discharge current densities of 0.5 mA/cm², 1.0 mA/cm² and 1.6 mA/cm² per apparent area of the cathode pellet in an operating voltage range of 3.0 to 4.0 V at 25° C. The maximum discharge capacities in the initial cycle (first cycle) were as shown in Table 1. The charge/discharge curves of this battery in the third cycle are shown in FIG. 4, and the discharge cycle characteristics of this battery at a charge/discharge current density of 0.5 mA/cm² are shown in FIG. 5. The capacity values are hereinafter standardized with the net weight of the cathode active material including the foreign metal element such as vanadium except carbon (the weight of the conductive carbon deposits is corrected, though).

As shown in Table 1 and FIG. 5, the vanadium composite lithium iron phosphate cathode material of the present invention prepared by adding $VCl_3$ had an extremely large initial capacity for a cathode system of this type up to 151 mAh/g at a charge/discharge current density of 0.5 mA/cm². Also, the vanadium composite lithium iron phosphate cathode material exhibited relatively stable cycle characteristics although a slight decrease in capacity was observed.

Example 2

An $LiFePO_4$ cathode material composited with chromium (Cr) as a foreign metal element was synthesized by the following procedure.

The same procedure as in Example 1 was repeated, except that 0.0396 g of $CrCl_3$ (purity: 98%; product of Research Chemicals Ltd.) was added instead of $VCl_3$ used in the production of the 1 mol % vanadium composite cathode material in Example 1 to the dried and ground mixture of the ingredients and the resulting mixture was ground and stirred, to obtain an $LiFePO_4$ cathode material composited with 1 mol % of Cr.

A coin-type secondary battery was fabricated using the cathode material in the same manner as in Example 1, and the characteristics of the battery were evaluated. Elemental analysis of the cathode material by ICP emission spectrometry indicated that it had a composition of (Li:Fe:Cr:P)= (1.03:1.00:0.0093:1) (element molar ratio with respect to phosphorus (P)). X-ray diffraction analysis of the chromium composite cathode material showed only diffraction peaks almost the same as those of $LiFePO_4$ having an olivine-type crystal structure shown in FIG. 3, and no other diffraction peaks ascribable to impurities were observed.

Figure 6:
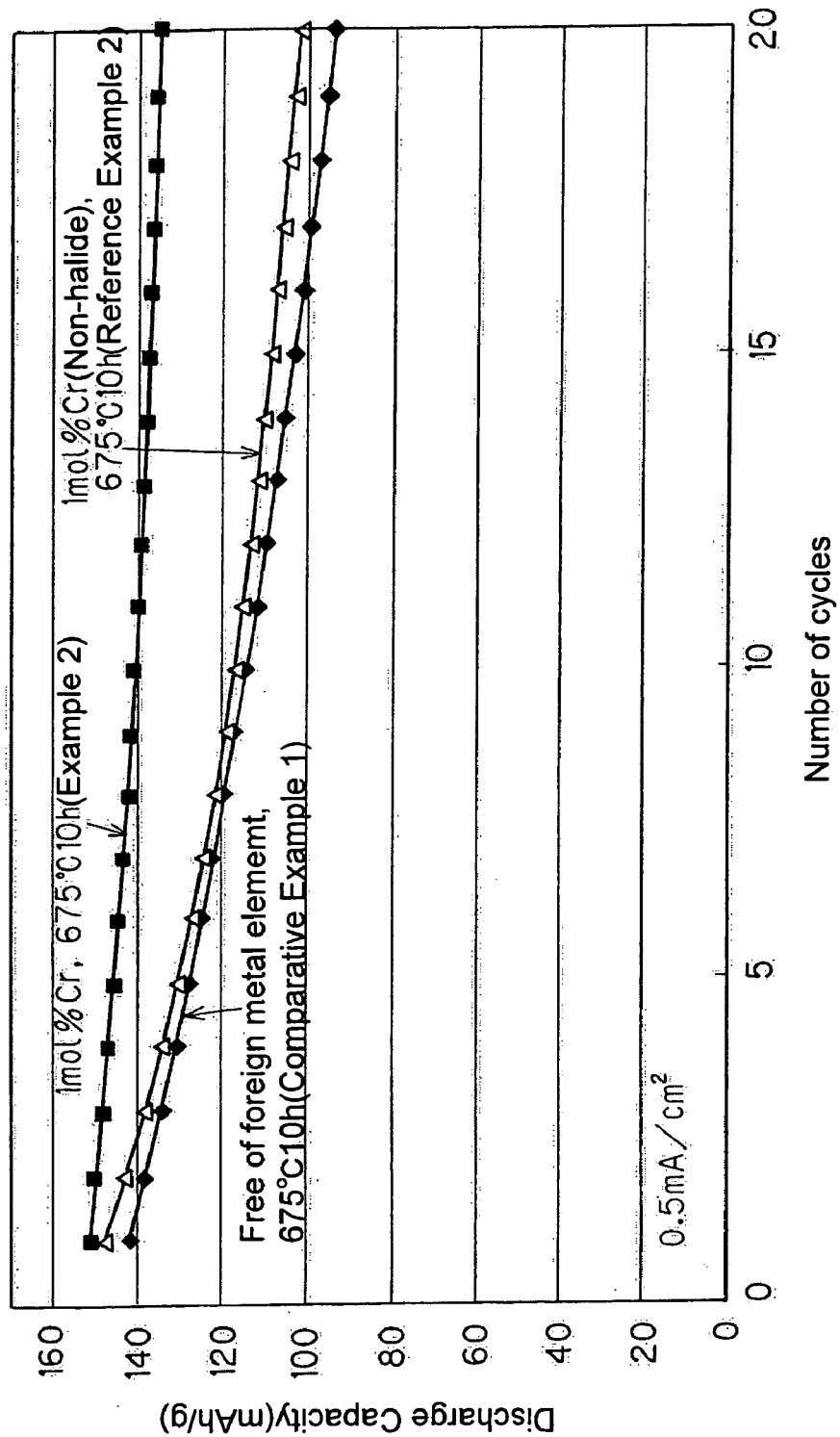
FIG. 6 is a graph showing the cycle discharge characteristics of secondary batteries obtained in Example 2, Comparative Example 1 and Reference Example 2.

The maximum discharge capacities of the coin-type secondary battery in the initial cycle (first cycle) are shown in Table 1, and the discharge cycle characteristics of the coin-type secondary battery at a charge/discharge current density of 0.5 mA/cm² are shown in FIG. 6.

Example 3

An $LiFePO_4$ cathode material composited with chromium (Cr) as a foreign metal element was synthesized by the following procedure.

The same procedure as in Example 1 was repeated, except that 0.0666 g of $CrCl_3.6H_2O$ (purity: 99.5%; product of Wako Pure Chemical Industries, Ltd.) was added instead of $VCl_3$ used in the production of the 1 mol % vanadium composite cathode material in Example 1 to the dried and ground mixture of the ingredients and the resulting mixture was ground and stirred, to obtain an $LiFePO_4$ cathode material composited with 1 mol % of Cr.

A coin-type secondary battery was fabricated using the cathode material in the same manner as in Example 1, and the characteristics of the battery were evaluated. Elemental analysis of the cathode material by ICP emission spectrometry indicated that it had a composition of (Li:Fe:Cr:P)= (0.99:1.02:0.0087:1) (element molar ratio with respect to phosphorus (P)). X-ray diffraction analysis of the chromium composite cathode material also showed only diffraction peaks almost the same as those of $LiFePO_4$ having an olivine-type crystal structure shown in FIG. 3, and no other diffraction peaks ascribable to impurities were observed.

Figure 7:
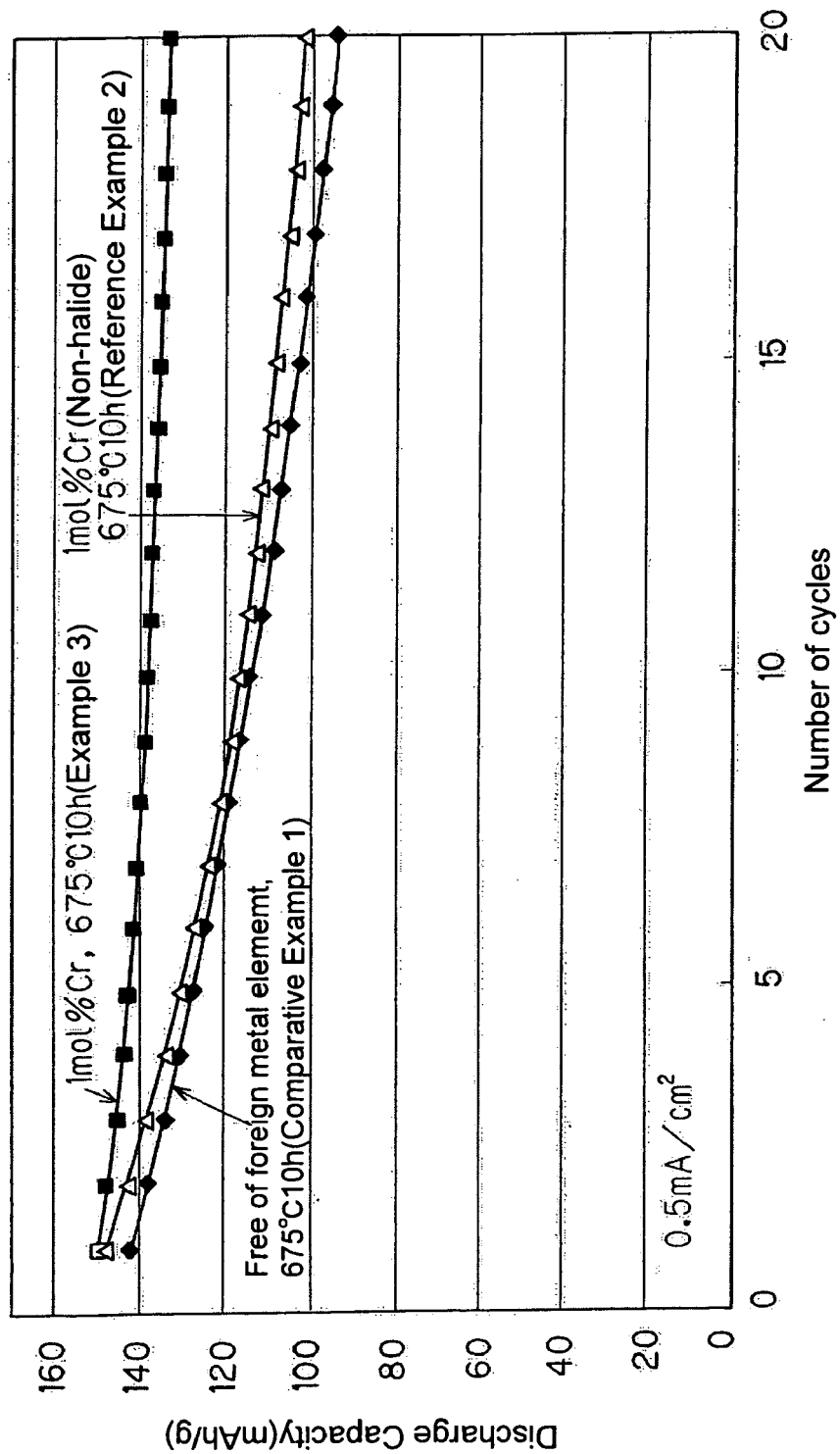
FIG. 7 is a graph showing the cycle discharge characteristics of secondary batteries obtained in Example 3, Comparative Example 1 and Reference Example 3.

The maximum discharge capacities of the coin-type secondary battery in the initial cycle (first cycle) are shown in Table 1, and the discharge cycle characteristics of the coin-type secondary battery at a charge/discharge current density of 0.5 mA/cm² are shown in FIG. 7.

As shown in Table 1 and FIGS. 6 and 7, the chromium composite lithium iron phosphate cathode materials of Examples 2 and 3 of the present invention prepared by adding $CrCl_3$ and $CrCl_3.6H_2O$, respectively, exhibited very similar charge/discharge characteristics and had an extremely large initial capacity for cathode systems of this type up to 150 to 151 mAh/g at a charge/discharge current density of 0.5 mA/cm². Also, the chromium composite lithium iron phosphate cathode materials exhibited relatively stable cycle characteristics although a slight decrease in capacity was observed. The charge/discharge curves of the coin-type secondary batteries (not shown) were very similar in shape to the charge/discharge curves of the coin-type secondary battery using the vanadium composite lithium iron phosphate cathode material prepared by adding $VCl_3$ shown in FIG. 4.

Example 4

An $LiFePO_4$ cathode material composited with copper (Cu) as a foreign metal element was synthesized by the following procedure.

The same procedure as in Example 1 was repeated, except that 0.0336 g of $CuCl_2$ (purity: 95%; product of Wako Pure Chemical Industries, Ltd.) was added instead of $VCl_3$ used in the production of the 1 mol % vanadium composite cathode material in Example 1 to the dried and ground mixture of the ingredients and the resulting mixture was ground and stirred, to obtain an $LiFePO_4$ cathode material composited with 1 mol % of Cu.

A coin-type secondary battery was fabricated using the cathode material in the same manner as in Example 1, and the characteristics of the battery were evaluated. Elemental analysis of the cathode material by ICP emission spectrometry indicated that it had a composition of (Li:Fe:Cu:P)= (1.00:0.96:0.0091:1) (element molar ratio with respect to phosphorus (P)). X-ray diffraction analysis of the copper composite cathode material also showed only diffraction peaks almost the same as those of $LiFePO_4$ having an olivine-type crystal structure shown in FIG. 3, and no other diffraction peaks ascribable to impurities were observed.

Figure 8:
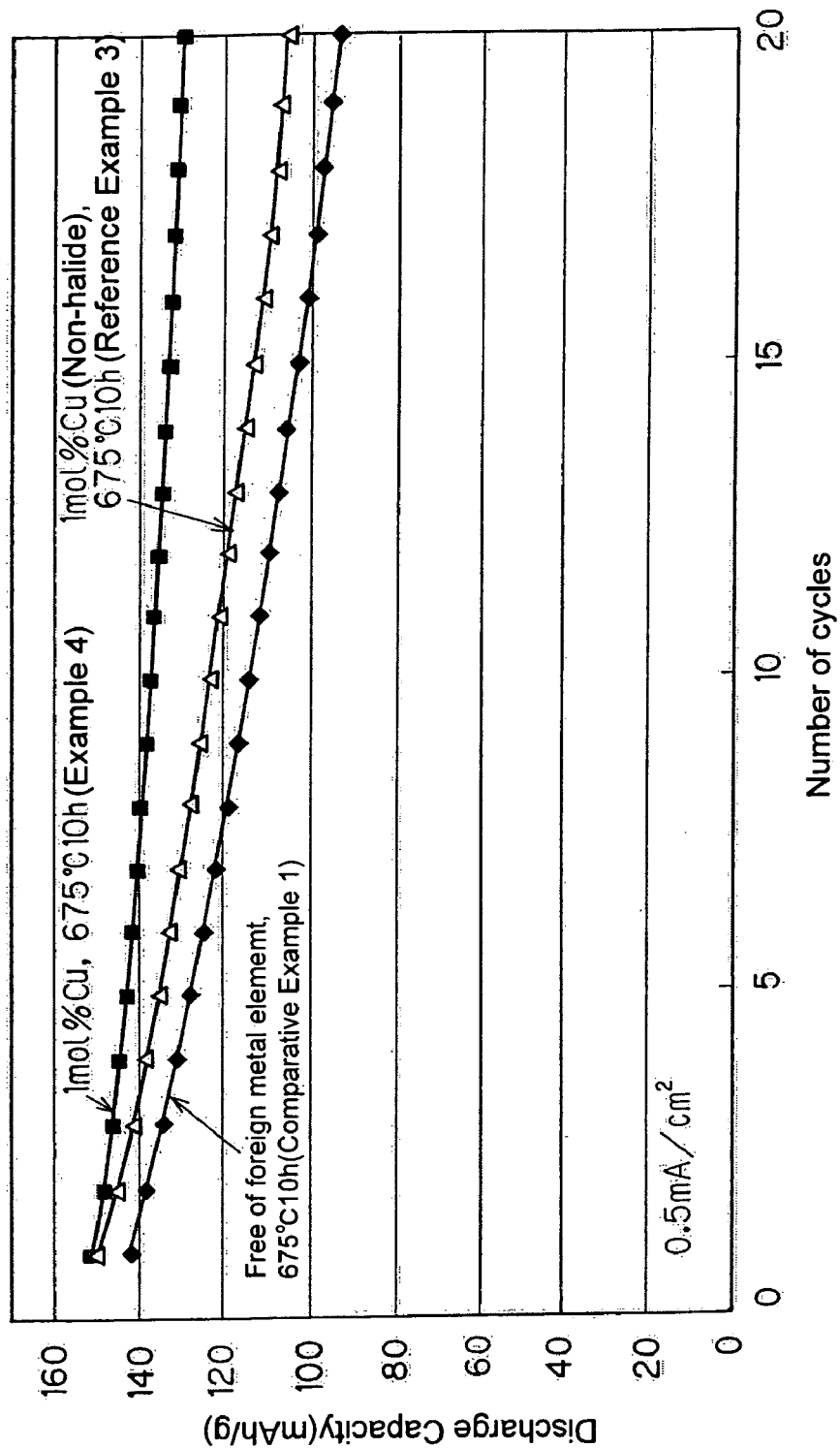
FIG. 8 is a graph showing the cycle discharge characteristics of secondary batteries obtained in Example 4, Comparative Example 1 and Reference Example 3.

The maximum discharge capacities of the coin-type secondary battery in the initial cycle (first cycle) are shown in Table 1, and the discharge cycle characteristics of the coin-type secondary battery at a charge/discharge current density of 0.5 mA/cm² are shown in FIG. 8.

As shown in Table 1 and FIG. 8, the copper composite lithium iron phosphate cathode material of the present invention prepared by adding $CuCl_2$ had an extremely large initial capacity for a cathode system of this type up to 151 mAh/g at a charge/discharge current density of 0.5 mA/cm². Also, the copper composite lithium iron phosphate cathode material exhibited relatively stable cycle characteristics although a slight decrease in capacity was observed. The charge/discharge curves of the battery (not shown) were very similar in shape to the charge/discharge curves of the battery using the vanadium composite lithium iron phosphate cathode material prepared by adding $VCl_3$ shown in FIG. 4.

Example 5

An $LiFePO_4$ cathode material composited with zinc (Zn) as a foreign metal element was synthesized by the following procedure.

The same procedure as in Example 1 was repeated, except that 0.0341 g of $ZnCl_2$ (purity: 98%; product of Wako Pure Chemical Industries, Ltd.) was added instead of $VCl_3$ used in the production of the 1 mol % vanadium composite cathode material in Example 1 to the dried and ground mixture of the ingredients and the resulting mixture was ground and stirred, to obtain an $LiFePO_4$ cathode material composited with 1 mol % of Zn.

A coin-type secondary battery was fabricated using the cathode material in the same manner as in Example 1, and the characteristics of the battery were evaluated. Elemental analysis of the cathode material by ICP emission spectrometry indicated that it had a composition of (Li:Fe:Zn:P)=(1.04:0.98:0.0089:1) (element molar ratio with respect to phosphorus (P)). X-ray diffraction analysis of the zinc composite cathode material also showed only diffraction peaks almost the same as those of $LiFePO_4$ having an olivine-type crystal structure shown in FIG. 3, and no other diffraction peaks ascribable to impurities were observed.

Figure 9:
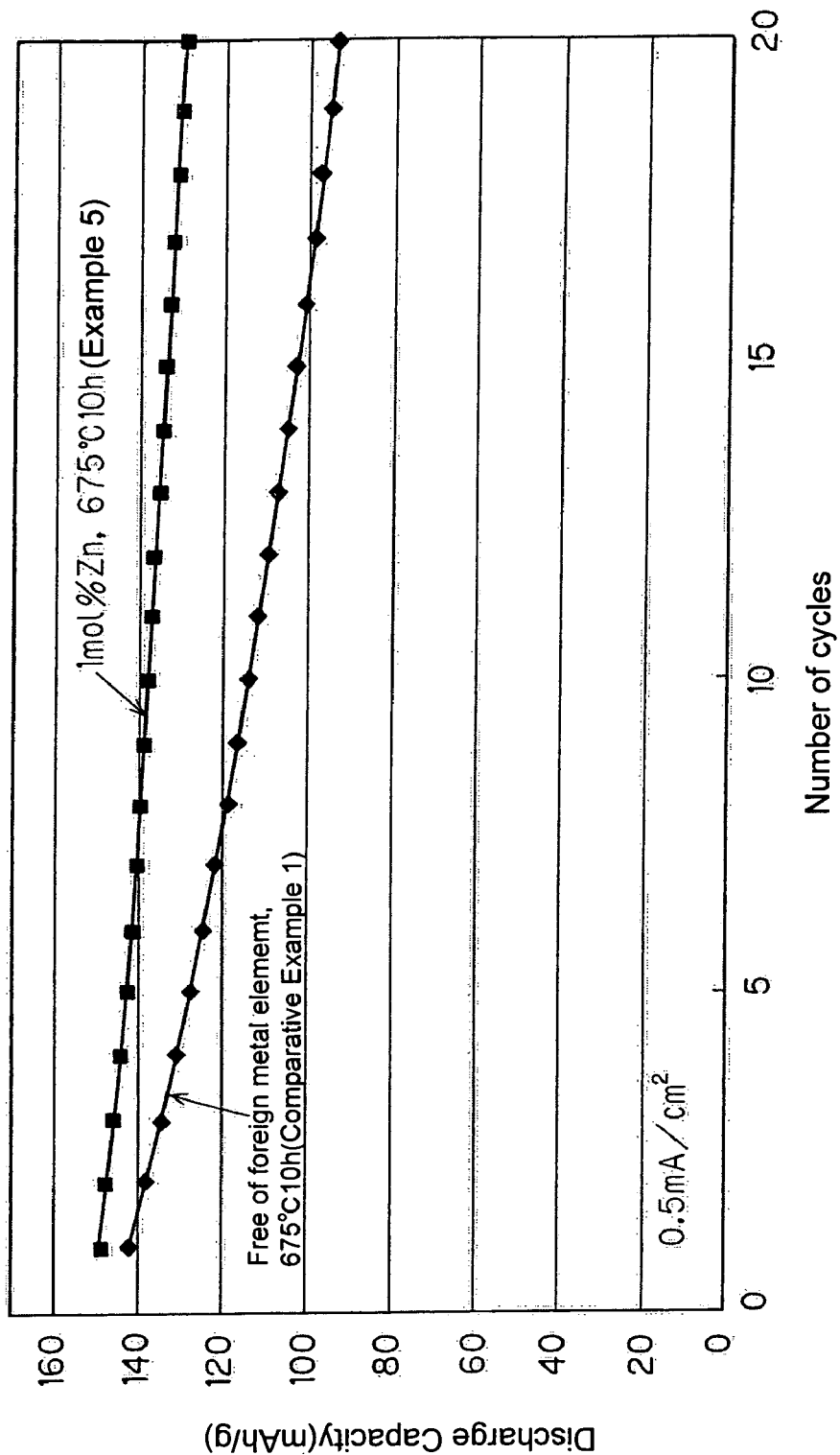
FIG. 9 is a graph showing the cycle discharge characteristics of secondary batteries obtained in Example 5 and Comparative Example 1.

The maximum discharge capacities of the coin-type secondary battery in the initial cycle (first cycle) are shown in Table 1, and the discharge cycle characteristics of the coin-type secondary battery at a charge/discharge current density of 0.5 mA/cm² are shown in FIG. 9.

As shown in Table 1 and FIG. 9, the zinc composite lithium iron phosphate cathode material of the present invention prepared by adding $ZnCl_2$ had an extremely large initial capacity for a cathode system of this type up to 149 mAh/g at a charge/discharge current density of 0.5 mA/cm². Also, the zinc composite lithium iron phosphate cathode material exhibited relatively stable cycle characteristics although a slight decrease in capacity was observed. The charge/discharge curves of the battery (not shown) were very similar in shape to the charge/discharge curves of the battery using the vanadium composite lithium iron phosphate cathode material prepared by adding $VCl_3$ shown in FIG. 4.

Example 6

An $LiFePO_4$ cathode material composited with indium (In) as a foreign metal element was synthesized by the following procedure.

The same procedure as in Example 1 was repeated, except that 0.0733 g of $InCl_3.4H_2O$ (content in terms of anhydride: 74 to 77%; product of Wako Pure Chemical Industries, Ltd.) was added instead of $VCl_3$ used in the production of the 1 mol % vanadium composite cathode material in Example 1 to the dried and ground mixture of the ingredients and the resulting mixture was ground and stirred, to obtain an $LiFePO_4$ cathode material composited with 1 mol % of In.

A coin-type secondary battery was fabricated using the cathode material in the same manner as in Example 1, and the characteristics of the battery were evaluated. Elemental analysis of the cathode material by ICP emission spectrometry indicated that it had a composition of (Li:Fe:In:P)=(1.01:0.98:0.0085:1) (element molar ratio with respect to phosphorus (P)). X-ray diffraction analysis of the indium composite cathode material also showed only diffraction peaks almost the same as those of $LiFePO_4$ having an olivine-type crystal structure shown in FIG. 3, and no other diffraction peaks ascribable to impurities were observed.

Figure 10:
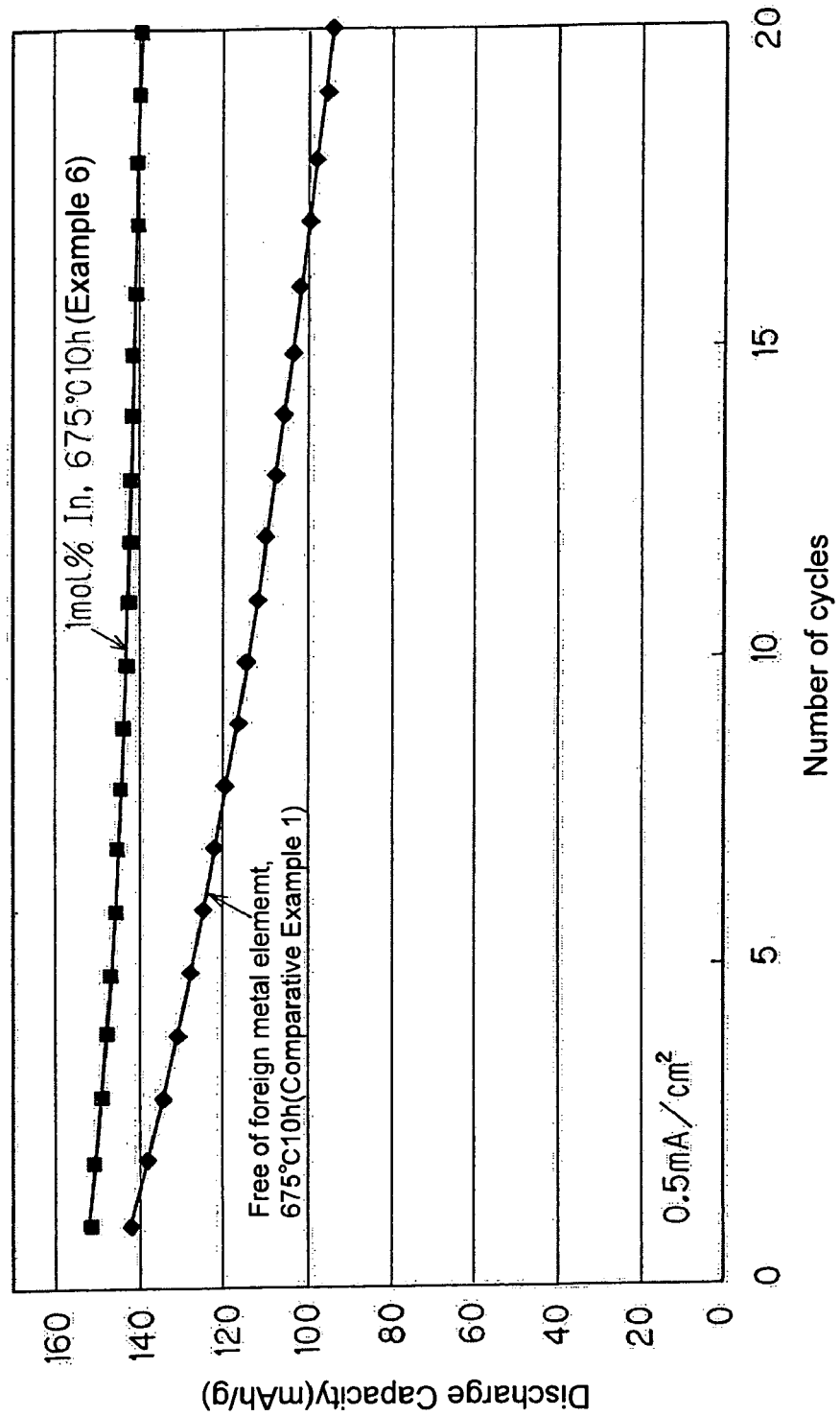
FIG. 10 is a graph showing the cycle discharge characteristics of secondary batteries obtained in Example 6 and Comparative Example 1.

The maximum discharge capacities of the coin-type secondary battery in the initial cycle (first cycle) are shown in Table 1, and the discharge cycle characteristics of the coin-type secondary battery at a charge/discharge current density of 0.5 mA/cm² are shown in FIG. 10.

As shown in Table 1 and FIG. 10, the indium composite lithium iron phosphate cathode material of the present invention prepared by adding $InCl_3.4H_2O$ had an extremely large initial capacity for a cathode system of this type up to 152 mAh/g at a charge/discharge current density of 0.5 mA/cm². Also, the indium composite lithium iron phosphate cathode material exhibited relatively stable cycle characteristics although a slight decrease in capacity was observed. The charge/discharge curves of the battery (not shown) were very similar in shape to the charge/discharge curves of the battery using the vanadium composite lithium iron phosphate cathode material prepared by adding $VCl_3$ shown in FIG. 4.

Example 7

An $LiFePO_4$ cathode material composited with tin (Sn) as a foreign metal element was synthesized by the following procedure.

The same procedure as in Example 1 was repeated, except that 0.0474 g of $SnCl_2$ (purity: 99.9%; product of Wako Pure Chemical Industries, Ltd.) was added instead of $VCl_3$ used in the production of the 1 mol % vanadium composite cathode material in Example 1 to the dried and ground mixture of the ingredients and the resulting mixture was ground and stirred, to obtain an $LiFePO_4$ cathode material composited with 1 mol % of Sn.

A coin-type secondary battery was fabricated using the cathode material in the same manner as in Example 1, and the characteristics of the battery were evaluated. Elemental analysis of the cathode material by ICP emission spectrometry indicated that it had a composition of (Li:Fe:Sn:P)=(0.97:0.99:0.0091:1) (element molar ratio with respect to phosphorus (P)). X-ray diffraction analysis of the tin composite cathode material also showed only diffraction peaks almost the same as those of $LiFePO_4$ having an olivine-type crystal structure shown in FIG. 3, and no other diffraction peaks ascribable to impurities were observed.

Figure 11:
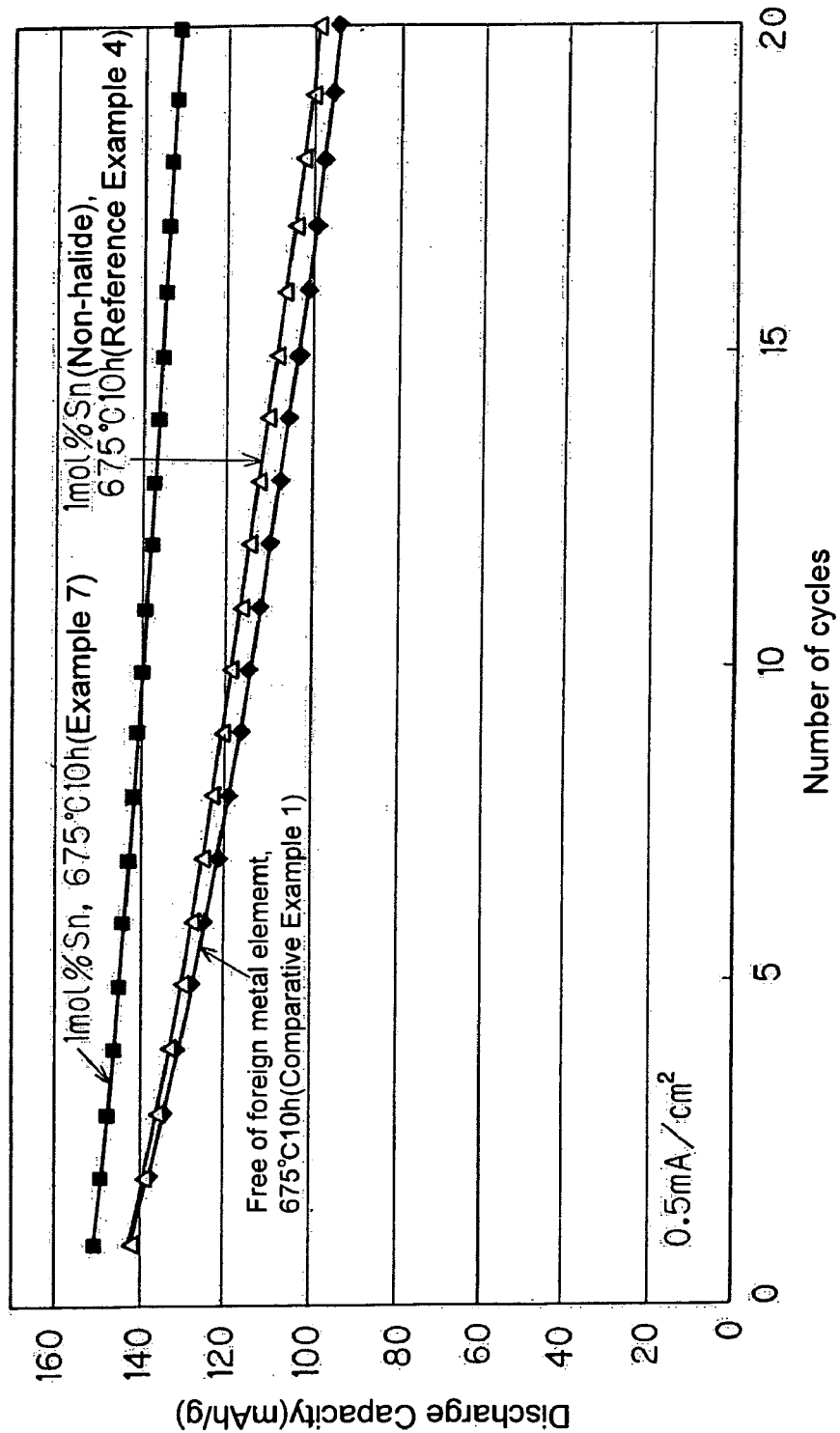
FIG. 11 is a graph showing the cycle discharge characteristics of secondary batteries obtained in Example 7, Comparative Example 1 and Reference Example 4.

The maximum discharge capacities of the coin-type secondary battery in the initial cycle (first cycle) are shown in Table 1, and the discharge cycle characteristics of the coin-type secondary battery at a charge/discharge current density of 0.5 mA/cm² are shown in FIG. 11.

As shown in Table 1 and FIG. 11, the tin composite lithium iron phosphate cathode material of the present invention prepared by adding $SnCl_2$ had an extremely large initial capacity for a cathode system of this type up to 151 mAh/g at a charge/discharge current density of 0.5 mA/cm². Also, the tin composite lithium iron phosphate cathode material exhibited relatively stable cycle characteristics although a slight decrease in capacity was observed. The charge/discharge curves of the battery (not shown) were very similar in shape to the charge/discharge curves of the battery using the vanadium composite lithium iron phosphate cathode material prepared by adding $VCl_3$ shown in FIG. 4.

Example 8

An $LiFePO_4$ cathode material composited with tin (Sn) as a foreign metal element was synthesized by the following procedure.

The same procedure as in Example 1 was repeated, except that 0.0651 g of $SnCl_4$ (purity: 97%; product of Wako Pure Chemical Industries, Ltd.) was added instead of $VCl_3$ used in the production of the 1 mol % vanadium composite cathode material in Example 1 to the dried and ground mixture of the ingredients and the resulting mixture was ground and stirred, to obtain an $LiFePO_4$ cathode material composited with 1 mol % of Sn. A coin-type secondary battery was fabricated using the cathode material in the same manner as in Example 1, and the characteristics of the battery were evaluated. Elemental analysis of the cathode material by ICP emission spectrometry indicated that it had a composition of (Li:Fe:Sn:P)= (1.03:1.01:0.0089:1) (element molar ratio with respect to phosphorus (P)).

X-ray diffraction analysis of the tin composite cathode material also showed only diffraction peaks almost the same as those of $LiFePO_4$ having an olivine-type crystal structure shown in FIG. 3, and no other diffraction peaks ascribable to impurities were observed.

Figure 12:
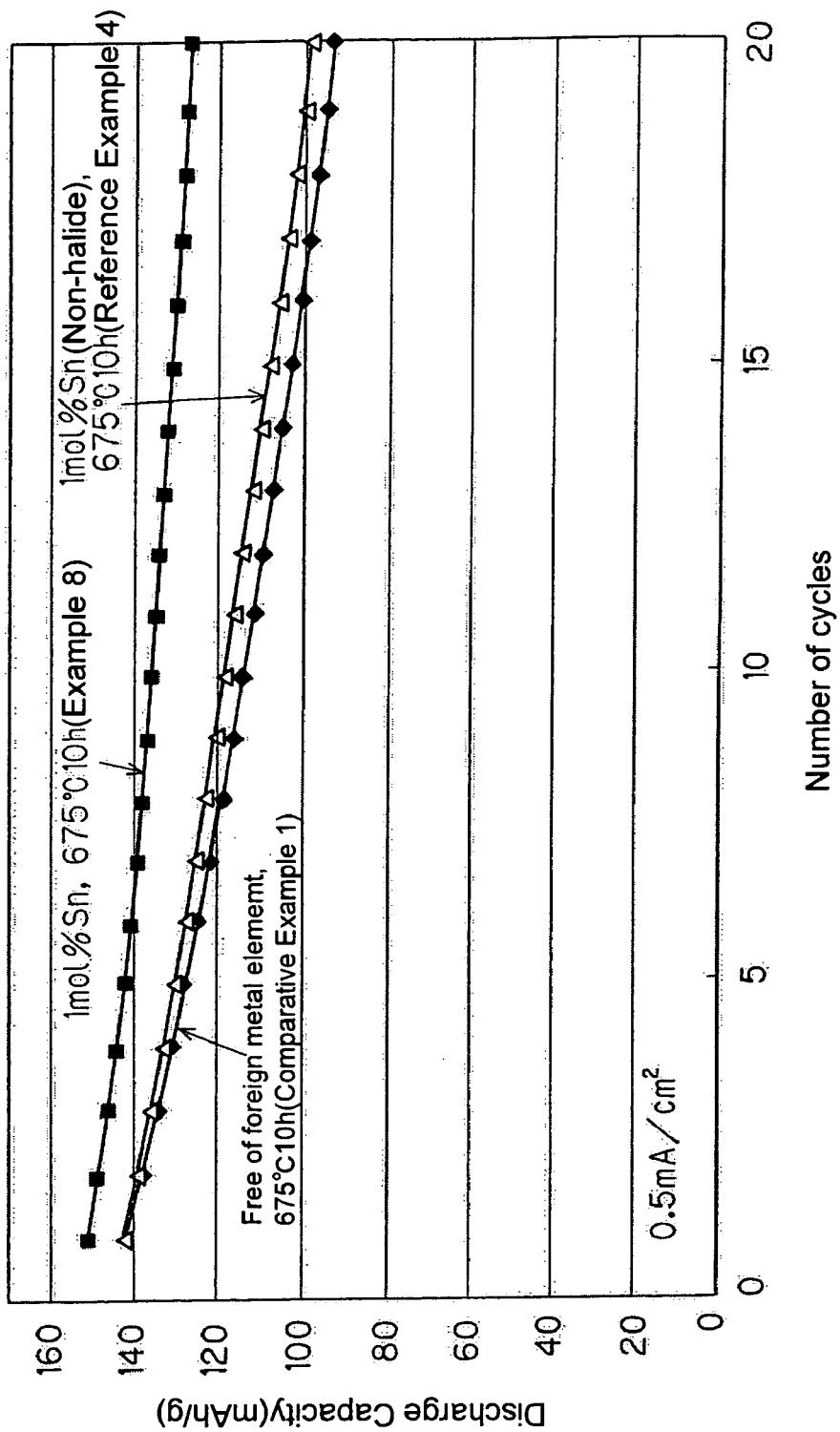
FIG. 12 is a graph showing the cycle discharge characteristics of secondary batteries obtained in Example 8, Comparative Example 1 and Reference Example 4.

The maximum discharge capacities of the coin-type secondary battery in the initial cycle (first cycle) are shown in Table 1, and the discharge cycle characteristics of the coin-type secondary battery at a charge/discharge current density of 0.5 mA/cm² are shown in FIG. 12.

As shown in Table 1 and FIGS. 11 and 12, the tin composite lithium iron phosphate cathode materials of Examples 7 and 8 of the present invention prepared by adding $SnCl_2$ and $SnCl_4$, respectively, exhibited very similar charge/discharge characteristics and had an extremely large initial capacity for cathode systems of this type up to 151 mAh/g at a charge/discharge current density of 0.5 mA/cm². Also, the chromium composite lithium iron phosphate cathode materials exhibited relatively stable cycle characteristics although a slight decrease in capacity was observed. The charge/discharge curves of the batteries (not shown) were very similar in shape to the charge/discharge curves of the battery using the vanadium composite lithium iron phosphate cathode material prepared by adding $VCl_3$ shown in FIG. 4.

Example 9

An $LiFePO_4$ cathode material composited with molybdenum (Mo) as a foreign metal element was synthesized by the following procedure.

The same procedure as in Example 1 was repeated, except that 0.0683 g of $MoCl_5$ (product of Wako Pure Chemical Industries, Ltd.) was added instead of $VCl_3$ used in the production of the 1 mol % vanadium composite cathode material in Example 1 to the dried and ground mixture of the ingredients and the resulting mixture was ground and stirred, to obtain an $LiFePO_4$ cathode material composited with 1 mol % of Mo.

A coin-type secondary battery was fabricated using the cathode material in the same manner as in Example 1, and the characteristics of the battery were evaluated. Elemental analysis of the cathode material by ICP emission spectrometry indicated that it had a composition of (Li:Fe:Mo:P)= (1.01:1.01:0.0089:1) (element molar ratio with respect to phosphorus (P)). X-ray diffraction analysis of the molybdenum composite cathode material also showed only diffraction peaks almost the same as those of $LiFePO_4$ having an olivine-type crystal structure shown in FIG. 3, and no other diffraction peaks ascribable to impurities were observed.

Figure 13:
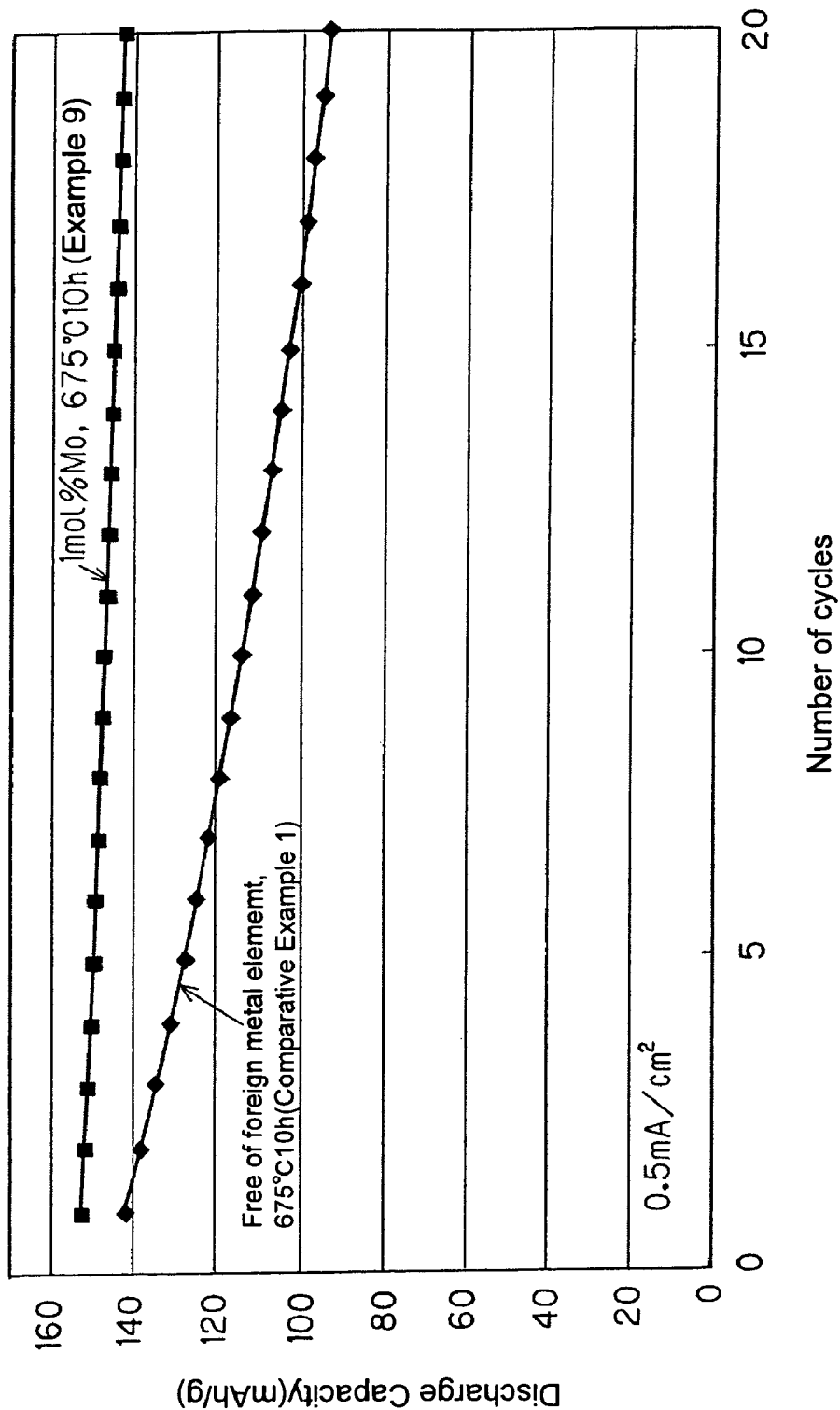
FIG. 13 is a graph showing the cycle discharge characteristics of secondary batteries obtained in Example 9 and Comparative Example 1.

The maximum discharge capacities of the coin-type secondary battery in the initial cycle (first cycle) are shown in Table 1, and the discharge cycle characteristics of the coin-type secondary battery at a charge/discharge current density of 0.5 mA/cm² are shown in FIG. 13.

As shown in Table 1 and FIG. 13, the molybdenum composite lithium iron phosphate cathode material of the present invention prepared by adding $MoCl_5$ had an extremely large initial capacity for a cathode system of this type up to 153 mAh/g at a charge/discharge current density of 0.5 mA/cm². Also, the molybdenum composite lithium iron phosphate cathode material exhibited relatively stable cycle characteristics although a slight decrease in capacity was observed. The charge/discharge curves of the battery (not shown) were very similar in shape to the charge/discharge curves of the battery using the vanadium composite lithium iron phosphate cathode material prepared by adding $VCl_3$ shown in FIG. 4.

Example 10

An $LiFePO_4$ cathode material composited with titanium (Ti) as a foreign metal element was synthesized by the following procedure.

The same procedure as in Example 1 was repeated, except that 0.0474 g of $TiCl_4$ (product of Wako Pure Chemical Industries, Ltd.) was added instead of $VCl_3$ used in the production of the 1 mol % vanadium composite cathode material in Example 1 to the dried and ground mixture of the ingredients and the resulting mixture was ground and stirred, to obtain an $LiFePO_4$ cathode material composited with 1 mol % of Ti.

A coin-type secondary battery was fabricated using the cathode material in the same manner as in Example 1, and the characteristics of the battery were evaluated. Elemental analysis of the cathode material by ICP emission spectrometry indicated that it had a composition of (Li:Fe:Ti:P)=(1.00: 0.97:0.0087:1) (element molar ratio with respect to phosphorus (P)). X-ray diffraction analysis of the titanium composite cathode material also showed only diffraction peaks almost the same as those of $LiFePO_4$ having an olivine-type crystal structure shown in FIG. 3, and no other diffraction peaks ascribable to impurities were observed.

Figure 14:
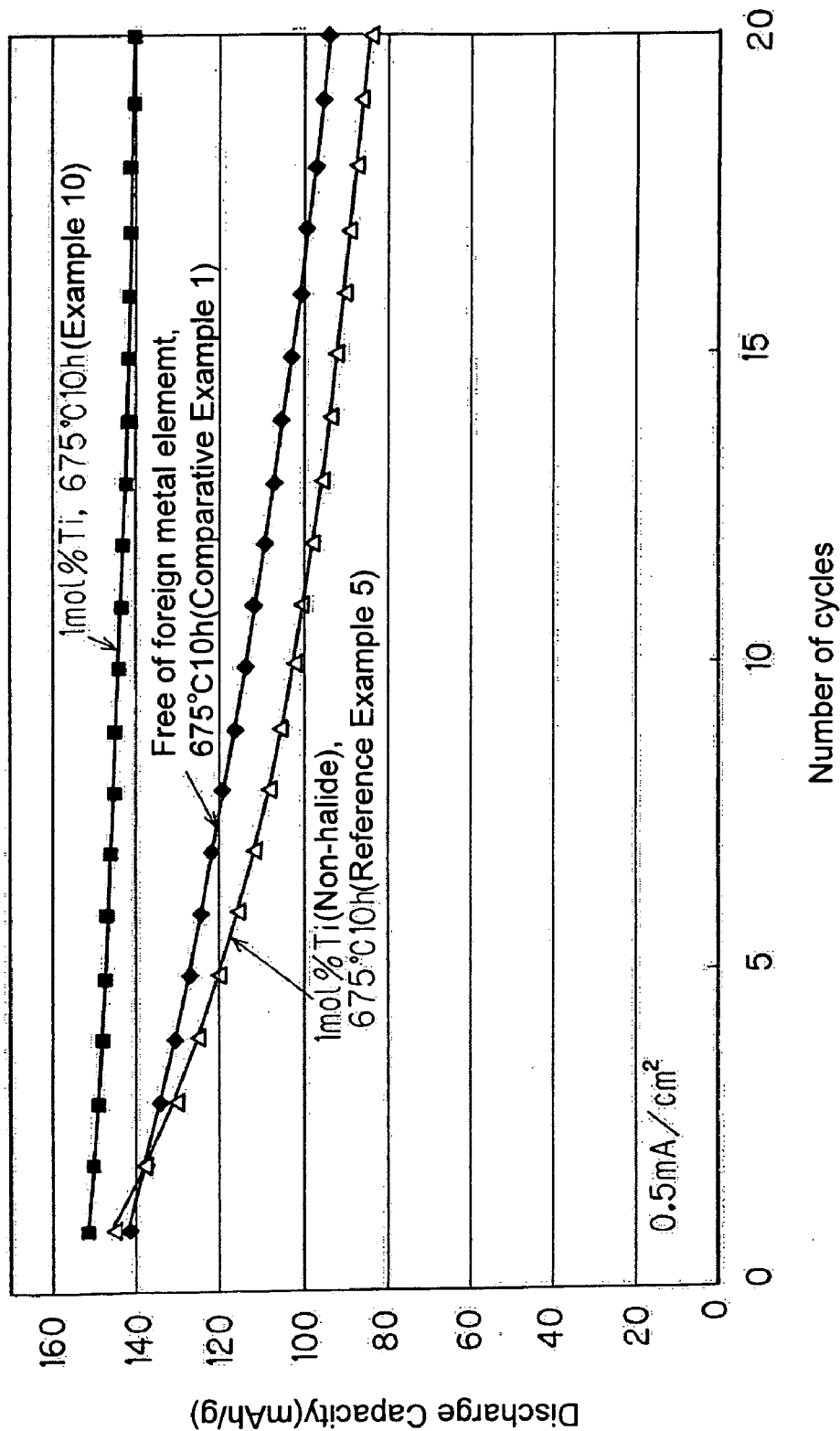
FIG. 14 is a graph showing the cycle discharge characteristics of secondary batteries obtained in Example 10, Comparative Example 1 and Reference Example 5.

The maximum discharge capacities of the coin-type secondary battery in the initial cycle (first cycle) are shown in Table 1, and the discharge cycle characteristics of the coin-type secondary battery at a charge/discharge current density of 0.5 mA/cm² are shown in FIG. 14.

As shown in Table 1 and FIG. 14, the titanium composite lithium iron phosphate cathode material of the present invention prepared by adding $TiCl_4$ had an extremely large initial capacity for a cathode system of this type up to 151 mAh/g at a charge/discharge current density of 0.5 mA/cm². Also, the titanium composite lithium iron phosphate cathode material exhibited relatively stable cycle characteristics although a slight decrease in capacity was observed. The charge/discharge curves of the battery (not shown) were very similar in shape to the charge/discharge curves of the battery using the vanadium composite lithium iron phosphate cathode material prepared by adding $VCl_3$ shown in FIG. 4.

Comparative Example 1

An $LiFePO_4$ cathode material free of a foreign metal element was synthesized by the following procedure.

The same procedure as in Example 1 was repeated, except that nothing was added to the dried and ground mixture of the ingredients, as opposed to the 1 mol % vanadium composite cathode material of Example 1, to obtain an LiFePO$_4$ cathode material.

A coin-type secondary battery was fabricated using the cathode material in the same manner as in Example 1, and the characteristics of the battery were evaluated. Elemental analysis of the cathode material by ICP emission spectrometry indicated that it had a composition of (Li:Fe:P)=(1.00: 0.98:1) (element molar ratio with respect to phosphorus (P)). X-ray diffraction analysis of the additive-free composite cathode material also showed only diffraction peaks almost the same as those of LiFePO$_4$ having an olivine-type crystal structure shown in FIG. 3, and no other diffraction peaks ascribable to impurities were observed.

The maximum discharge capacities of the coin-type secondary battery in the initial cycle (first cycle) are shown in Table 1, the charge/discharge curves of the coin-type secondary battery in the third cycle are shown in FIG. 4, and the discharge cycle characteristics of the coin-type secondary battery at a charge/discharge current density of 0.5 mA/cm$^2$ are shown in FIGS. 5 to 14.

As can be understood from comparison of Table 1 and FIGS. 4 to 14, the coin-type secondary batteries using the cathode material composited with a foreign metal element of Examples 1 to 10 had a smaller potential drop and a larger initial discharge capacity and obviously exhibited less cycle deterioration than the coin-type secondary battery using the additive-free cathode material of Comparative Example 1.

TABLE 1

| | Foreign metal element | Metal halide (about 1 mol % added) | Initial maximum discharge capacity (mAh/g) | | |
|---|---|---|---|---|---|
| | | | At 0.5 mA/cm$^2$ | At 1.0 mA/cm$^2$ | At 1.6 mA/cm$^2$ |
| Ex. 1 | V | VCl$_3$ | 151 | 145 | 139 |
| Ex. 2 | Cr | CrCl$_3$ | 151 | 146 | 139 |
| Ex. 3 | | CrCl$_3$•6H$_2$O | 150 | 145 | 140 |
| Ex. 4 | Cu | CuCl$_2$ | 151 | 144 | 139 |
| Ex. 5 | Zn | ZnCl$_2$ | 149 | 143 | 138 |
| Ex. 6 | In | InCl$_3$•4H$_2$O | 152 | 147 | 141 |
| Ex. 7 | Sn | SnCl$_2$ | 151 | 145 | 138 |
| Ex. 8 | | SnCl$_4$ | 151 | 145 | 138 |
| Ex. 9 | Mo | MoCl$_5$ | 153 | 148 | 143 |
| Ex. 10 | Ti | TiCl$_4$ | 151 | 146 | 140 |
| Comp. Ex. 1 | N/A | Not added | 142 | 135 | 128 |

Reference Example 1

An LiFePO$_4$ cathode material composited with vanadium (V) as a foreign metal element was synthesized by the following procedure.

The same procedure as in Example 1 was repeated, except that 0.0328 g of vanadyl oxalate n-hydrate VOC$_2$O$_4$.nH$_2$O (product of Wako Pure Chemical Industries, Ltd.) was added (herein on the assumption that the hydration number n is 2) instead of VCl$_3$, as opposed to the production of the 1 mol % vanadium composite cathode material in Example 1, to obtain an LiFePO$_4$ cathode material composited with 1 mol % of vanadium.

A coin-type secondary battery was fabricated using the cathode material in the same manner as in Example 1, and the characteristics of the battery were evaluated. Elemental analysis of the cathode material by ICP emission spectrometry indicated that it had a composition of (Li:Fe:V:P)=(1.03: 0.98:0.0092:1) (element molar ratio with respect to phosphorus (P)). X-ray diffraction analysis of the vanadium composite cathode material also showed only diffraction peaks almost the same as those of LiFePO$_4$ having an olivine-type crystal structure shown in FIG. 3, and no other diffraction peaks ascribable to impurities were observed.

The maximum discharge capacities of the coin-type secondary battery in the initial cycle (first cycle) are shown in Table 2, and the discharge cycle characteristics of the coin-type secondary battery at a charge/discharge current density of 0.5 mA/cm$^2$ are shown in FIG. 5.

As can be understood from comparison of Tables 1 and 2 and FIG. 5, the coin-type secondary battery using the vanadium composite cathode material of Example 1 prepared by adding VCl$_3$ had a larger initial discharge capacity and obviously exhibited less cycle deterioration than the coin-type secondary battery using the vanadium composite cathode material of Reference Example 1 prepared by adding VOC$_2$O$_4$.nH$_2$O.

Reference Example 2

An LiFePO$_4$ cathode material composited with chromium (Cr) as a foreign metal element was synthesized by the following procedure.

The same procedure as in Example 1 was repeated, except that 0.0278 g of chromium acetate Cr(CH$_3$COO)$_3$ (product of Wako Pure Chemical Industries, Ltd.) was added instead of CrCl$_3$ and CrCl$_3$.6H$_2$O, as opposed to the production of the 1 mol % chromium composite cathode materials in Examples 2 and 3, to obtain an LiFePO$_4$ cathode material composited with 1 mol % of chromium.

A coin-type secondary battery was fabricated using the cathode material in the same manner as in Example 1, and the characteristics of the battery were evaluated. Elemental analysis of the cathode material by ICP emission spectrometry indicated that it had a composition of (Li:Fe:Cr:P)= (0.99:0.97:0.0094:1) (element molar ratio with respect to phosphorus (P)). X-ray diffraction analysis of the chromium composite cathode material also showed only diffraction peaks almost the same as those of LiFePO$_4$ having an olivine-type crystal structure shown in FIG. 3, and no other diffraction peaks ascribable to impurities were observed.

The maximum discharge capacities of the coin-type secondary battery in the initial cycle (first cycle) are shown in Table 2, and the discharge cycle characteristics of the coin-type secondary battery at a charge/discharge current density of 0.5 mA/cm$^2$ are shown in FIGS. 6 and 7.

As can be understood from comparison of Tables 1 and 2 and FIGS. 6 and 7, the coin-type secondary batteries using the chromium composite cathode materials of Examples 2 and 3 prepared by adding CrCl$_3$ and CrCl$_3$.6H$_2$O, respectively, had a larger initial discharge capacity and obviously exhibited less cycle deterioration than the coin-type secondary battery using the chromium composite cathode material of Reference Example 2 prepared by adding Cr(CH$_3$COO)$_3$.

Reference Example 3

An LiFePO$_4$ cathode material composited with copper (Cu) as a foreign metal element was synthesized by the following procedure.

The same procedure as in Example 1 was repeated, except that 0.0499 g of copper acetate monohydrate Cu(CH$_3$COO)$_2$ H$_2$O (product of Wako Pure Chemical Industries, Ltd.) was added instead of CuCl$_2$, as opposed to the production of the 1 mol % copper composite cathode material in Example 4, to obtain an LiFePO$_4$ cathode material composited with 1 mol % of copper. A coin-type secondary battery was fabricated using the cathode material in the same manner as in Example 1, and the characteristics of the battery were evaluated. Elemental analysis of the cathode material by ICP emission spectrometry indicated that it had a composition of (Li:Fe:Cu:P)= (1.03:0.98:0.0093:1) (element molar ratio with respect to phosphorus (P)).

X-ray diffraction analysis of the copper composite cathode material also showed only diffraction peaks almost the same as those of LiFePO$_4$ having an olivine-type crystal structure shown in FIG. 3, and no other diffraction peaks ascribable to impurities were observed.

The maximum discharge capacities of the coin-type secondary battery in the initial cycle (first cycle) are shown in Table 2, and the discharge cycle characteristics of the coin-type secondary battery at a charge/discharge current density of 0.5 mA/cm$^2$ are shown in FIG. 8.

As can be understood from comparison of Tables 1 and 2 and FIG. 8, the coin-type secondary battery using the copper composite cathode material of Example 4 prepared by adding CuCl$_2$ had a larger initial discharge capacity and obviously exhibited less cycle deterioration than the coin-type secondary battery using the cooper composite cathode material of Reference Example 3 prepared by adding Cu(CH$_3$COO)$_2$·H$_2$O.

Reference Example 4

An LiFePO$_4$ cathode material composited with tin (Sn) as a foreign metal element was synthesized by the following procedure.

The same procedure as in Example 1 was repeated, except that 0.0517 g of tin oxalate SnC$_2$O$_4$ (product of Wako Pure Chemical Industries, Ltd.) was added instead of SnCl$_2$ and SnCl$_4$, as opposed to the production of the 1 mol % Sn composite cathode materials of Examples 7 and 8, to obtain an LiFePO$_4$ cathode material composited with 1 mol % of Sn. A coin-type secondary battery was fabricated using the cathode material in the same manner as in Example 1, and the characteristics of the battery were evaluated. Elemental analysis of the cathode material by ICP emission spectrometry indicated that it had a composition of (Li:Fe:Sn:P)= (0.97:0.98:0.0096:1) (element molar ratio with respect to phosphorus (P)).

X-ray diffraction analysis of the tin composite cathode material also showed only diffraction peaks almost the same as those of LiFePO$_4$ having an olivine-type crystal structure shown in FIG. 3, and no other diffraction peaks ascribable to impurities were observed.

The maximum discharge capacities of the coin-type secondary battery in the initial cycle (first cycle) are shown in Table 2, and the discharge cycle characteristics of the coin-type secondary battery at a charge/discharge current density of 0.5 mA/cm$^2$ are shown in FIGS. 11 and 12.

As can be understood from comparison of Tables 1 and 2 and FIGS. 11 and 12, the coin-type secondary batteries using the Sn composite cathode materials of Examples 7 and 8 prepared by adding SnCl$_2$ and SnCl$_4$, respectively, had a larger initial discharge capacity and obviously exhibited less cycle deterioration than the coin-type secondary battery using the tin composite cathode material of Reference Example 4 prepared by adding SnC$_2$O$_4$.

Reference Example 5

An LiFePO$_4$ cathode material composited with titanium (Ti) as a foreign metal element was synthesized by the following procedure.

The same procedure as in Example 1 was repeated, except that 0.0851 g of titanium butoxide monomer Ti[O(CH$_2$)$_3$CH$_3$]$_4$ (product of Wako Pure Chemical Industries, Ltd.) was added instead of TiCl$_4$, as opposed to the production of the 1 mol % Ti composite cathode material in Example 10, to obtain an LiFePO$_4$ cathode material composited with 1 mol % of Ti. A coin-type secondary battery was fabricated using the cathode material in the same manner as in Example 1, and the characteristics of the battery were evaluated. Elemental analysis of the cathode material by ICP emission spectrometry indicated that it had a composition of (Li:Fe:Ti:P)=(1.02: 1.03:0.0090:1) (element molar ratio with respect to phosphorus (P)).

X-ray diffraction analysis of the Ti composite cathode material also showed only diffraction peaks almost the same as those of LiFePO$_4$ having an olivine-type crystal structure shown in FIG. 3, and no other diffraction peaks ascribable to impurities were observed.

The maximum discharge capacities of the coin-type secondary battery in the initial cycle (first cycle) are shown in Table 2, and the discharge cycle characteristics of the coin-type secondary battery at a charge/discharge current density of 0.5 mA/cm$^2$ are shown in FIG. 14.

As can be understood from comparison of Tables 1 and 2 and FIG. 14, the coin-type secondary battery using the titanium composite cathode material of Example 10 prepared by adding TiCl$_4$ had a larger initial discharge capacity and obviously exhibited less cycle deterioration than the coin-type secondary battery using the titanium composite cathode material of Reference Example 5 prepared by adding Ti[O(CH$_2$)$_3$CH$_3$].

TABLE 2

| | Foreign metal element | Metal compound (not halide) (about 1 mol % added) | Initial maximum discharge capacity (mAh/g) | | |
|---|---|---|---|---|---|
| | | | At 0.5 mA/cm$^2$ | At 1.0 mA/cm$^2$ | At 1.6 mA/cm$^2$ |
| Ref. Ex. 1 | V | VOC$_2$O$_4$·$n$H$_2$O | 147 | 140 | 133 |
| Ref. Ex. 2 | Cr | Cr(CH$_3$COO)$_3$ | 148 | 142 | 134 |
| Ref. Ex. 3 | Cu | Cu(CH$_3$COO)$_2$·H$_2$O | 150 | 141 | 132 |
| Ref. Ex. 4 | Sn | SnC$_2$O$_4$ | 142 | 136 | 128 |
| Ref. Ex. 5 | Ti | Ti[O(CH$_2$)$_3$CH$_3$]$_4$ | 146 | 138 | 132 |

Foreign metal element composite cathode materials on which conductive carbon is deposited are hereinafter described based on some Examples.

Example 11

A conductive carbon deposited vanadium (V) composite LiFePO$_4$ cathode material was synthesized by the following procedure.

A calcination precursor was prepared from 4.4975 g of FeC$_2$O$_4$·2H$_2$O (product of Wako Pure Chemical Industries, Ltd.), 3.3015 g of (NH$_4$)$_2$HPO$_4$ (special grade; product of Wako Pure Chemical Industries, Ltd.), 1.0423 g of LiOH·H$_2$O (special grade) and 0.0393 g (which corresponds to 1 mol %, in terms of element ratio, based on Fe in FeC$_2$O$_4$·2H$_2$O) of vanadium trichloride VCl$_3$ (product of Wako Pure Chemical Industries, Ltd.), and the calcination precursor was subjected to preliminary calcination in an atmosphere of pure N$_2$ to obtain a preliminarily calcination product. 0.0975 g of refined coal pitch (MCP-250; product of Adchemco Corp.) with a softening point of 250° C. was added to 1.9000 g of the preliminary calcination product. The mixture was ground in an agate mortar and subjected to final calcination at 775° C. for 10 hours in the same atmosphere (with the gas being fed from the start of heating and kept supplied during the calcination process until after the calcination product was cooled).

Figure 15:
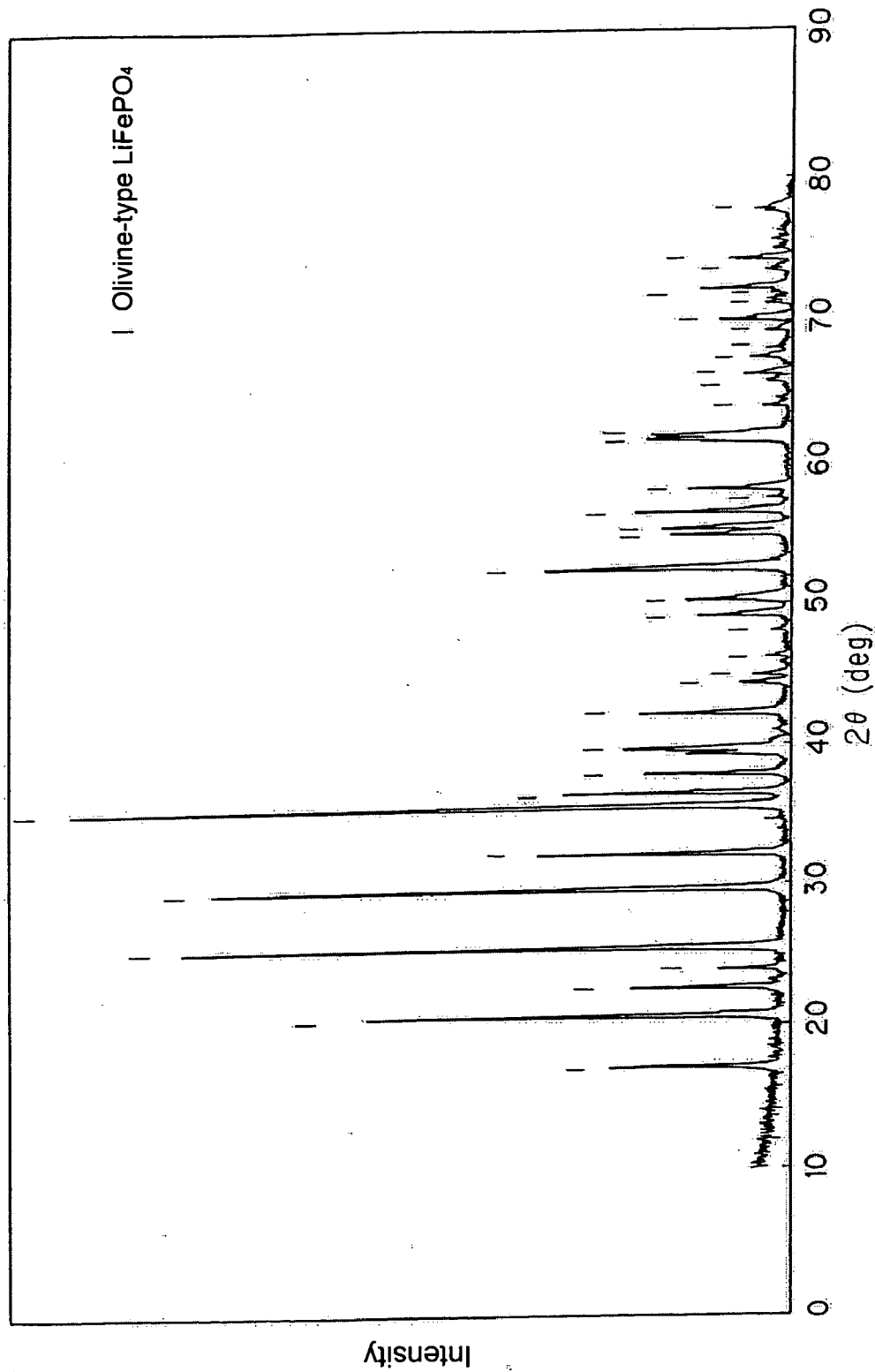
FIG. 15 is a graph showing the result of X-ray diffraction analysis of a conductive carbon deposited-vanadium composite cathode material obtained in Example 11.

The synthesized conductive carbon deposited composite cathode material was identified as $LiFePO_4$ having an olivine-type crystal structure by powder X-ray diffraction analysis, and no other diffraction peaks ascribable to impurities were observed. The result of X-ray diffraction analysis is shown in FIG. 15. Since the result of elemental analysis indicated that 3.86% by weight of carbon generated by pyrolysis of the refined coal pitch was contained but diffraction peaks corresponding to graphite crystal were not observed by X-ray diffraction analysis, it was assumed that a composite with amorphous carbon was formed. Elemental analysis of the cathode material by ICP emission spectrometry indicated that it had a composition of (Li:Fe:V:P)=(1.02:1.03:0.0088:1) (element molar ratio with respect to phosphorus (P)).

Figure 16:
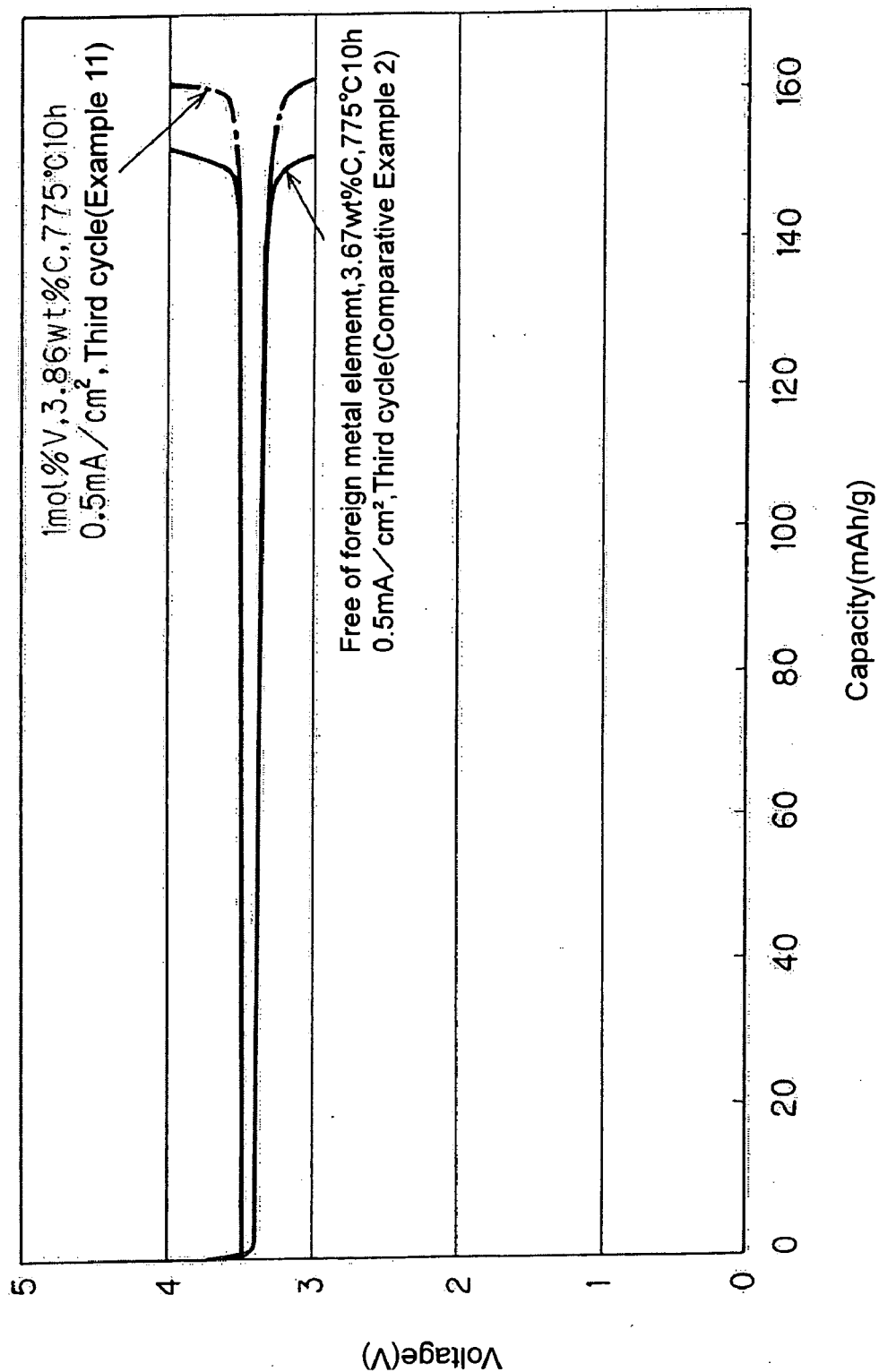
FIG. 16 is a graph showing the charge/discharge curves in the third cycle of secondary batteries obtained in Example 11 and Comparative Example 2.

A coin-type secondary battery was fabricated using the cathode material in the same manner as in Example 1, and the coin-type secondary battery was repeatedly charged and discharged under constant current at a charge/discharge current density of 0.5 $mA/cm^2$ per apparent area of the cathode pellet in an operating voltage range of 3.0 to 4.0 V at 25° C. The maximum discharge capacities of the battery in the initial cycle (around the tenth cycle) were as shown in Table 3. The charge/discharge capacity-voltage characteristics of the battery in the third cycle are shown in FIG. 16. The discharge cycle characteristics of the battery are shown in FIG. 17.

Figure 17:
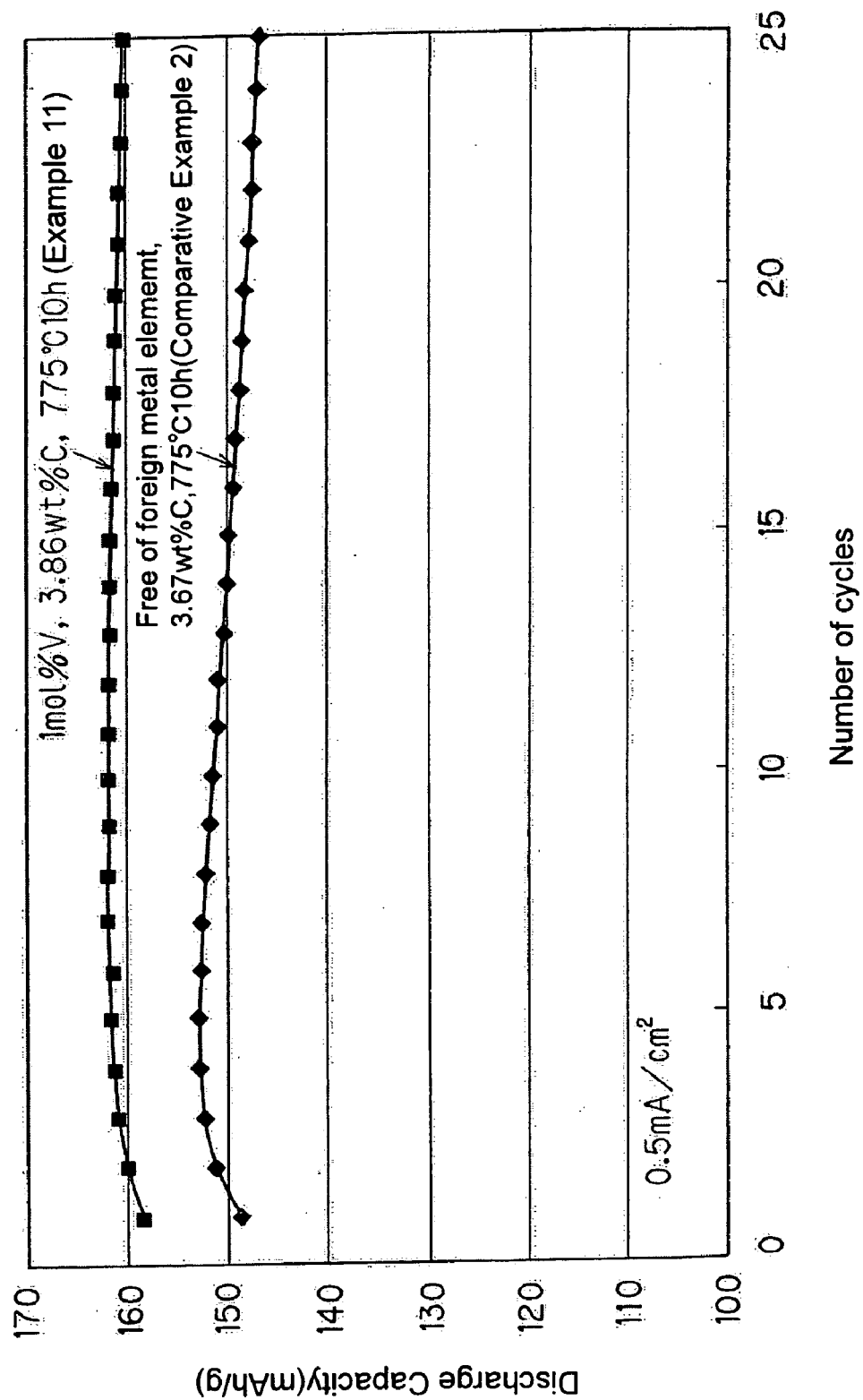
FIG. 17 is a graph showing the cycle discharge characteristics of secondary batteries obtained in Example 11 and Comparative Example 2.

As shown in Table 3 and FIGS. 16 and 17, the conductive carbon deposited-vanadium composite lithium iron phosphate cathode material of the present invention prepared by adding $VCl_3$ had a large capacity of 162 mAh/g, which is close to the theoretical capacity 170 mAh/g of a cathode system of this type, at a charge/discharge current density of 0.5 $mA/cm^2$ and exhibited very stable cycle characteristics. As shown in FIGS. 16 and 17, the voltage is very flat almost through the charging and discharging processes and exhibits an ideal voltage profile for a cathode of a battery in which steep rise and fall appear at the ends of the charging and discharging processes. As can be understood from FIGS. 16 and 17, the discharge capacity slightly increases from the start of the cycle charge/discharge to about the tenth cycle. This is a phenomenon peculiar to a cathode material on which conductive carbon is deposited.

Example 12

A conductive carbon deposited chromium (Cr) composite $LiFePO_4$ cathode material was synthesized by the following procedure.

The same procedure as in Example 11 was repeated, except that 0.0396 g of $CrCl_3$ (purity: 98%; product of Research Chemicals Ltd.) was added instead of $VCl_3$ used in the production of the conductive carbon deposited-1 mol % vanadium composite cathode material in Example 11 to the dried and ground mixture of the ingredients and the resulting mixture was ground and stirred, to obtain a conductive carbon deposited-$LiFePO_4$ cathode material composited with 1 mol % of Cr.

A coin-type secondary battery was fabricated using the cathode material in the same manner as in Example 1, and the characteristics of the battery were evaluated. Elemental analysis of the cathode material by ICP emission spectrometry indicated that it had a composition of (Li:Fe:Cr:P)= (1.03:1.02:0.0090:1) (element molar ratio with respect to phosphorus (P)). The result of elemental analysis indicated that 3.74% by weight of carbon generated by pyrolysis of the refined coal pitch was contained. X-ray diffraction analysis of the chromium composite cathode material showed only diffraction peaks almost the same as those of $LiFePO_4$ having an olivine-type crystal structure shown in FIG. 15, and no other diffraction peaks ascribable to impurities were observed.

Figure 18:
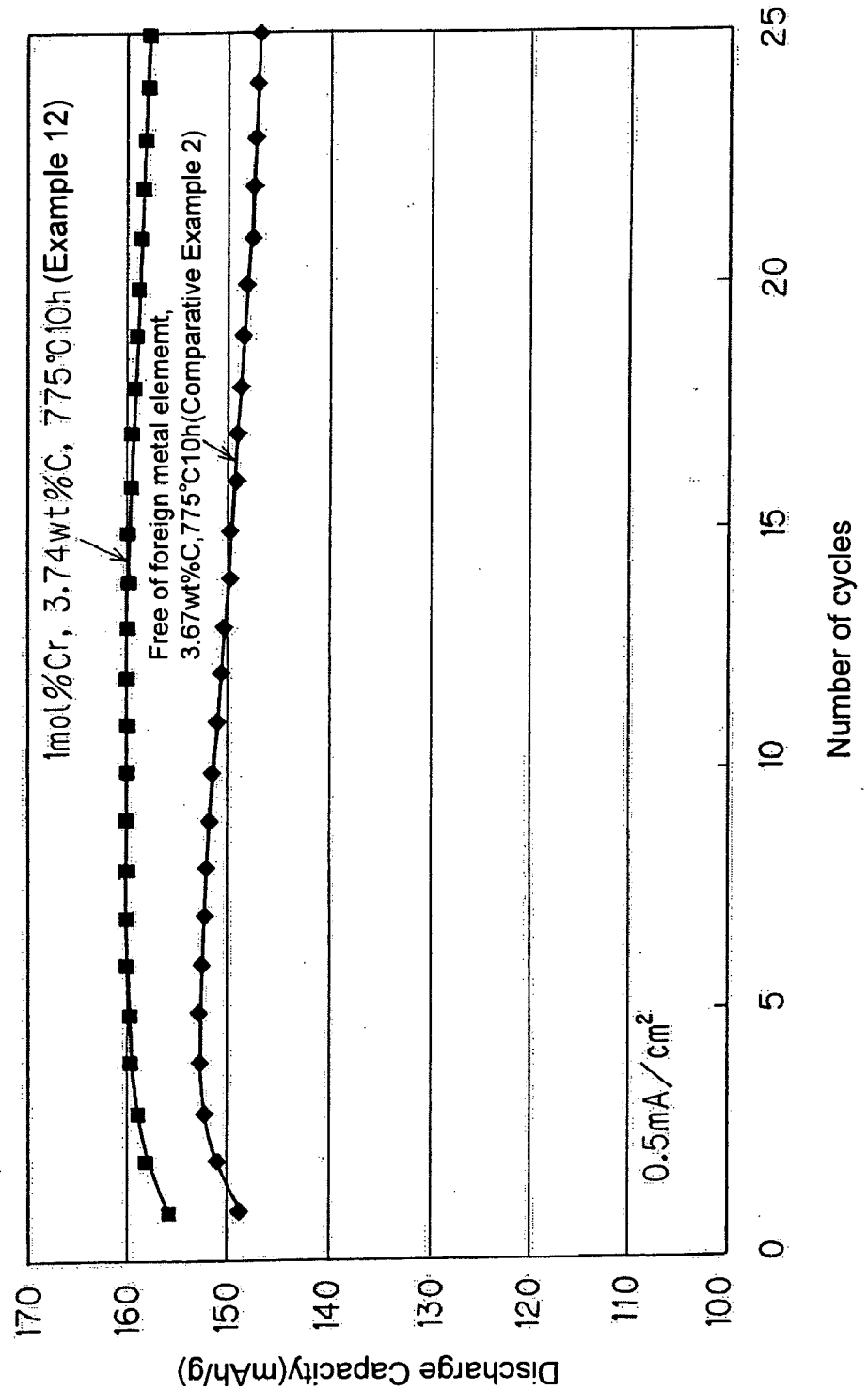
FIG. 18 is a graph showing the cycle discharge characteristics of secondary batteries obtained in Example 12 and Comparative Example 2.

The maximum discharge capacities of the coin-type secondary battery in the initial cycle (around the tenth cycle) are shown in Table 3, and the discharge cycle characteristics of the coin-type secondary battery at a charge/discharge current density of 0.5 $mA/cm^2$ are shown in FIG. 18. The charge/discharge curves of the battery (not shown) were very similar in shape to the charge/discharge curves of the battery using the conductive carbon deposited-vanadium composite lithium iron phosphate cathode material prepared by adding $VCl_3$ shown in FIG. 16.

Example 13

A conductive carbon deposited chromium (Cr) composite $LiFePO_4$ cathode material was synthesized by the following procedure.

The same procedure as in Example 11 was repeated, except that 0.0666 g of $CrCl_3.6H_2O$ (purity: 99.5%; product of Wako Pure Chemical Industries, Ltd.) was added instead of $VCl_3$ used in the production of the conductive carbon deposited-1 mol % vanadium composite cathode material in Example 11 to the dried and ground mixture of the ingredients and the resulting mixture was ground and stirred, to obtain a conductive carbon deposited-$LiFePO_4$ cathode material composited with 1 mol % of Cr.

A coin-type secondary battery was fabricated using the cathode material in the same manner as in Example 1, and the characteristics of the battery were evaluated. Elemental analysis of the cathode material by ICP emission spectrometry indicated that it had a composition of (Li:Fe:V:P)=(1.01: 0.97:0.0088:1) (element molar ratio with respect to phosphorus (P)). The result of elemental analysis indicated that 3.69% by weight of carbon generated by pyrolysis of the refined coal pitch was contained. X-ray diffraction analysis of the chromium composite cathode material showed only diffraction peaks almost the same as those of $LiFePO_4$ having an olivine-type crystal structure shown in FIG. 15, and no other diffraction peaks ascribable to impurities were observed.

Figure 19:
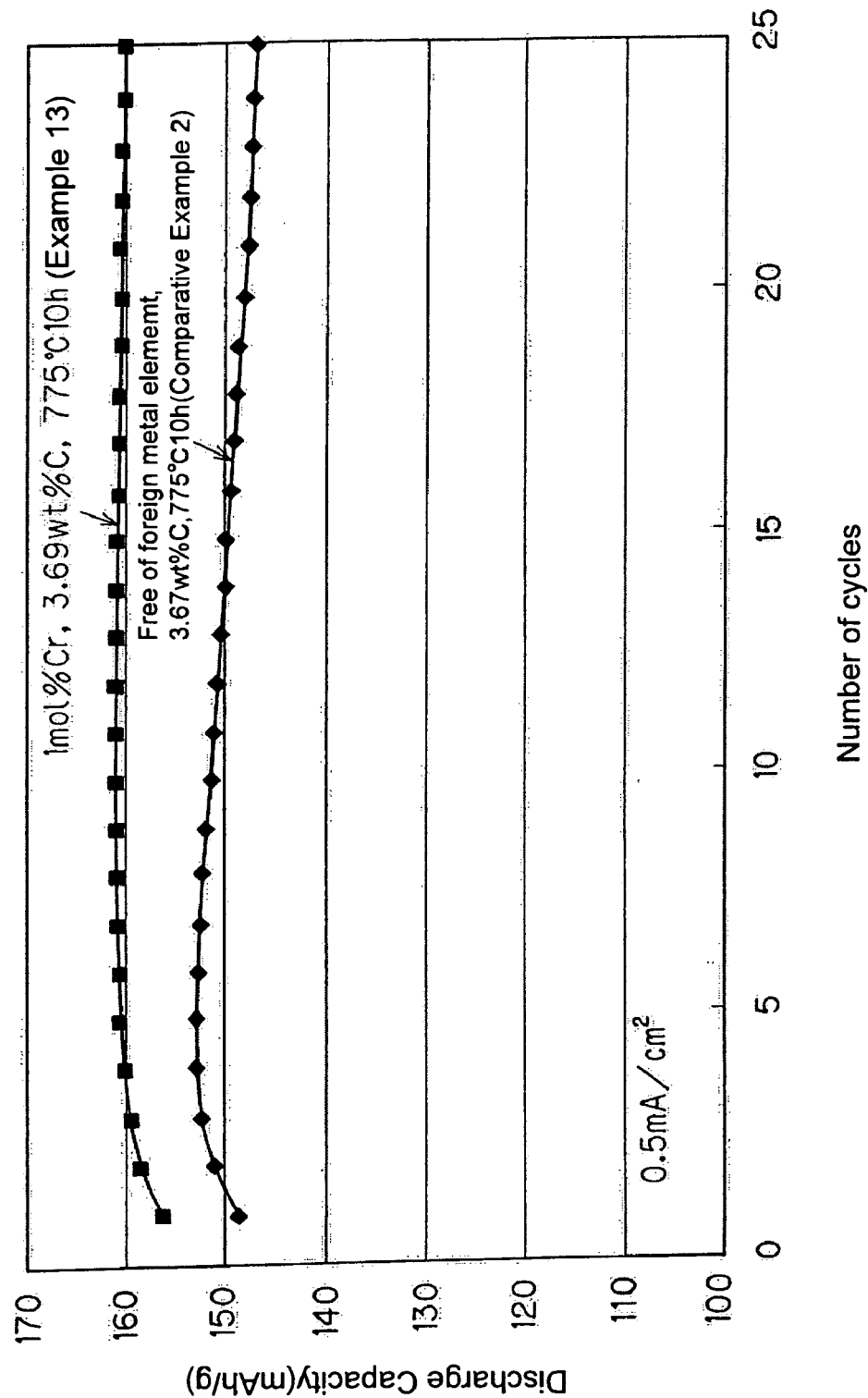
FIG. 19 is a graph showing the cycle discharge characteristics of secondary batteries obtained in Example 13 and Comparative Example 2.

The maximum discharge capacities of the coin-type secondary battery in the initial cycle (around the tenth cycle) are shown in Table 3, and the discharge cycle characteristics of the coin-type secondary battery at a charge/discharge current density of 0.5 $mA/cm^2$ are shown in FIG. 19. The charge/discharge curves of the battery (not shown) were very similar in shape to the charge/discharge curves of the battery using the conductive carbon deposited-vanadium composite lithium iron phosphate cathode material prepared by adding $VCl_3$ shown in FIG. 16.

Example 14

A conductive carbon deposited copper (Cu) composite $LiFePO_4$ cathode material was synthesized by the following procedure.

The same procedure as in Example 11 was repeated, except that 0.0336 g of $CuCl_2$ (purity: 95%; product of Wako Pure Chemical Industries, Ltd.) was added instead of $VCl_3$ used in the production of the conductive carbon deposited-1 mol % vanadium composite cathode material in Example 11 to the dried and ground mixture of the ingredients and the resulting mixture was ground and stirred, to obtain a conductive carbon deposited-LiFePO$_4$ cathode material composited with 1 mol % of Cu.

A coin-type secondary battery was fabricated using the cathode material in the same manner as in Example 1, and the characteristics of the battery were evaluated. Elemental analysis of the cathode material by ICP emission spectrometry indicated that it had a composition of (Li:Fe:Cu:P)= (1.00:0.97:0.0091:1) (element molar ratio with respect to phosphorus (P)). The result of elemental analysis indicated that 3.69% by weight of carbon generated by pyrolysis of the refined coal pitch was contained. X-ray diffraction analysis of the copper composite cathode material showed only diffraction peaks almost the same as those of LiFePO$_4$ having an olivine-type crystal structure shown in FIG. 15, and no other diffraction peaks ascribable to impurities were observed.

Figure 20:
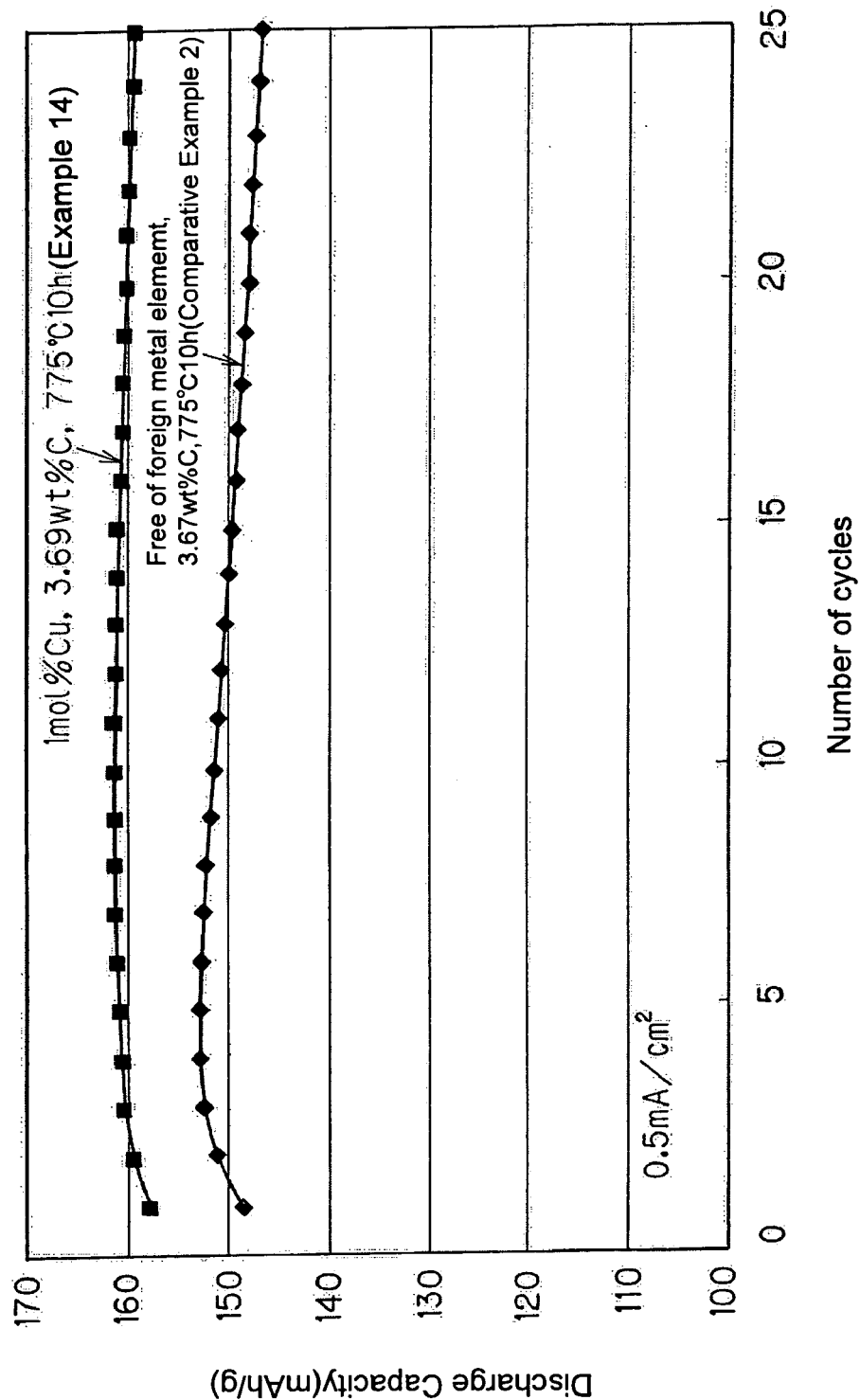
FIG. 20 is a graph showing the cycle discharge characteristics of secondary batteries obtained in Example 14 and Comparative Example 2.

The maximum discharge capacities of the coin-type secondary battery in the initial cycle (around the tenth cycle) are shown in Table 3, and the discharge cycle characteristics of the coin-type secondary battery at a charge/discharge current density of 0.5 mA/cm$^2$ are shown in FIG. 20. The charge/discharge curves of the battery (not shown) were very similar in shape to the charge/discharge curves of the battery using the conductive carbon deposited-vanadium composite lithium iron phosphate cathode material prepared by adding VCl$_3$ shown in FIG. 16.

Example 15

A conductive carbon deposited zinc (Zn) composite LiFePO$_4$ cathode material was synthesized by the following procedure.

The same procedure as in Example 11 was repeated, except that 0.0341 g of ZnCl$_2$ (purity: 98%; product of Wako Pure Chemical Industries, Ltd.) was added instead of VCl$_3$ used in the production of the conductive carbon deposited-1 mol % vanadium composite cathode material in Example 11 to the dried and ground mixture of the ingredients and the resulting mixture was ground and stirred, to obtain a conductive carbon deposited-LiFePO$_4$ cathode material composited with 1 mol % of Zn.

A coin-type secondary battery was fabricated using the cathode material in the same manner as in Example 1, and the characteristics of the battery were evaluated. Elemental analysis of the cathode material by ICP emission spectrometry indicated that it had a composition of (Li:Fe:Zn:P)= (1.04:1.01:0.0087:1) (element molar ratio with respect to phosphorus (P)). The result of elemental analysis indicated that 3.58% by weight of carbon generated by pyrolysis of the refined coal pitch was contained.

X-ray diffraction analysis of the zinc composite cathode material showed only diffraction peaks almost the same as those of LiFePO$_4$ having an olivine-type crystal structure shown in FIG. 15, and no other diffraction peaks ascribable to impurities were observed.

Figure 21:
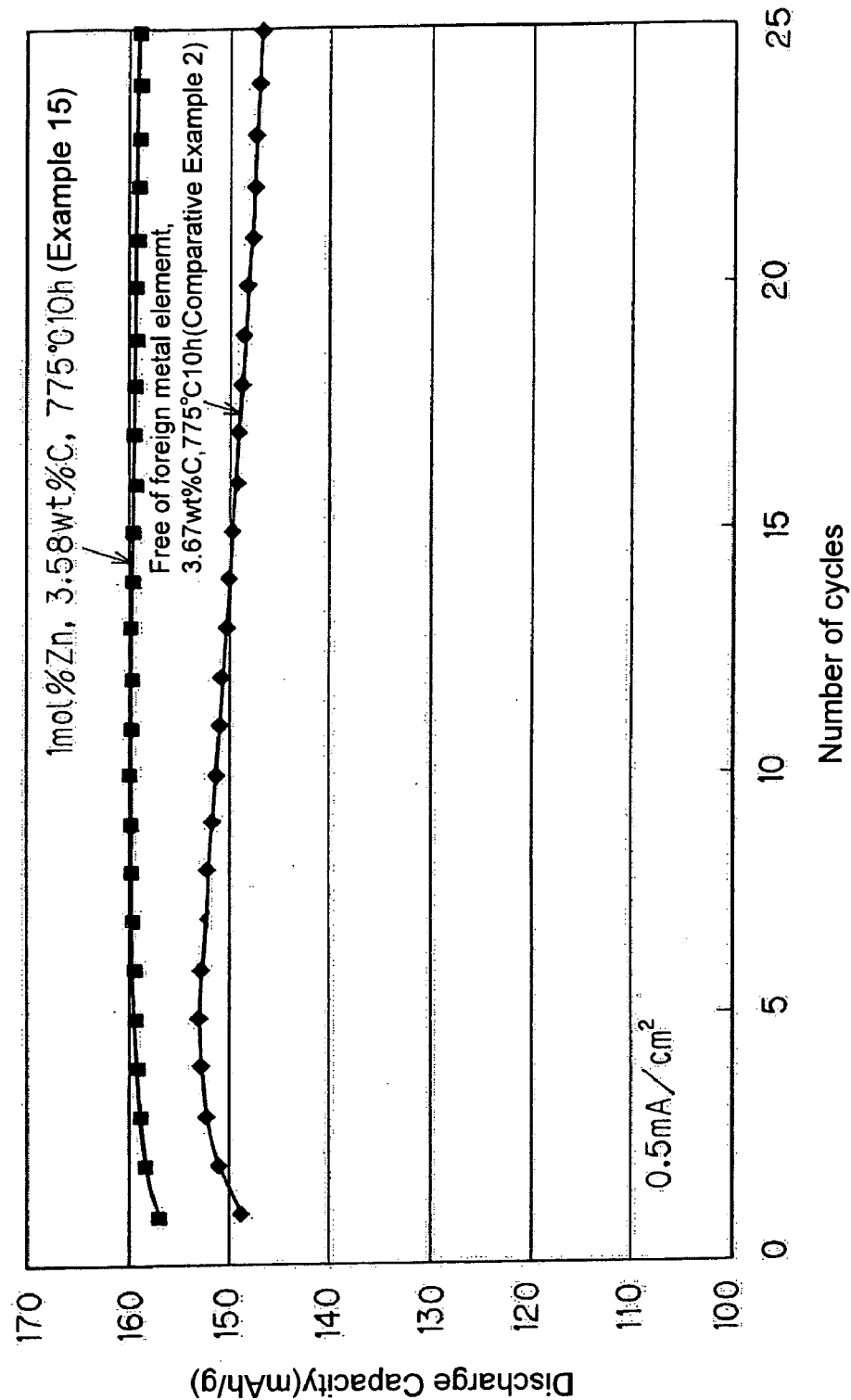
FIG. 21 is a graph showing the cycle discharge characteristics of secondary batteries obtained in Example 15 and Comparative Example 2.

The maximum discharge capacities of the coin-type secondary battery in the initial cycle (around the tenth cycle) are shown in Table 3, and the discharge cycle characteristics of the coin-type secondary battery at a charge/discharge current density of 0.5 mA/cm$^2$ are shown in FIG. 21. The charge/discharge curves of the battery (not shown) were very similar in shape to the charge/discharge curves of the battery using the conductive carbon deposited-vanadium composite lithium iron phosphate cathode material prepared by adding VCl$_3$ shown in FIG. 16.

Example 16

A conductive carbon deposited indium (In) composite LiFePO$_4$ cathode material was synthesized by the following procedure.

The same procedure as in Example 11 was repeated, except that 0.0733 g of InCl$_3$.4H$_2$O (content in terms of anhydride: 74 to 77%; product of Wako Pure Chemical Industries, Ltd.) was added instead of VCl$_3$ used in the production of the conductive carbon deposited-1 mol % vanadium composite cathode material in Example 11 to the dried and ground mixture of the ingredients and the resulting mixture was ground and stirred, to obtain a conductive carbon deposited-LiFePO$_4$ cathode material composited with 1 mol % of In.

A coin-type secondary battery was fabricated using the cathode material in the same manner as in Example 1, and the characteristics of the battery were evaluated. Elemental analysis of the cathode material by ICP emission spectrometry indicated that it had a composition of (Li:Fe:In:P)=(1.02: 0.99:0.0089:1) (element molar ratio with respect to phosphorus (P)). The result of elemental analysis indicated that 3.81% by weight of carbon generated by pyrolysis of the refined coal pitch was contained. X-ray diffraction analysis of the indium composite cathode material showed only diffraction peaks almost the same as those of LiFePO$_4$ having an olivine-type crystal structure shown in FIG. 15, and no other diffraction peaks ascribable to impurities were observed.

Figure 22:
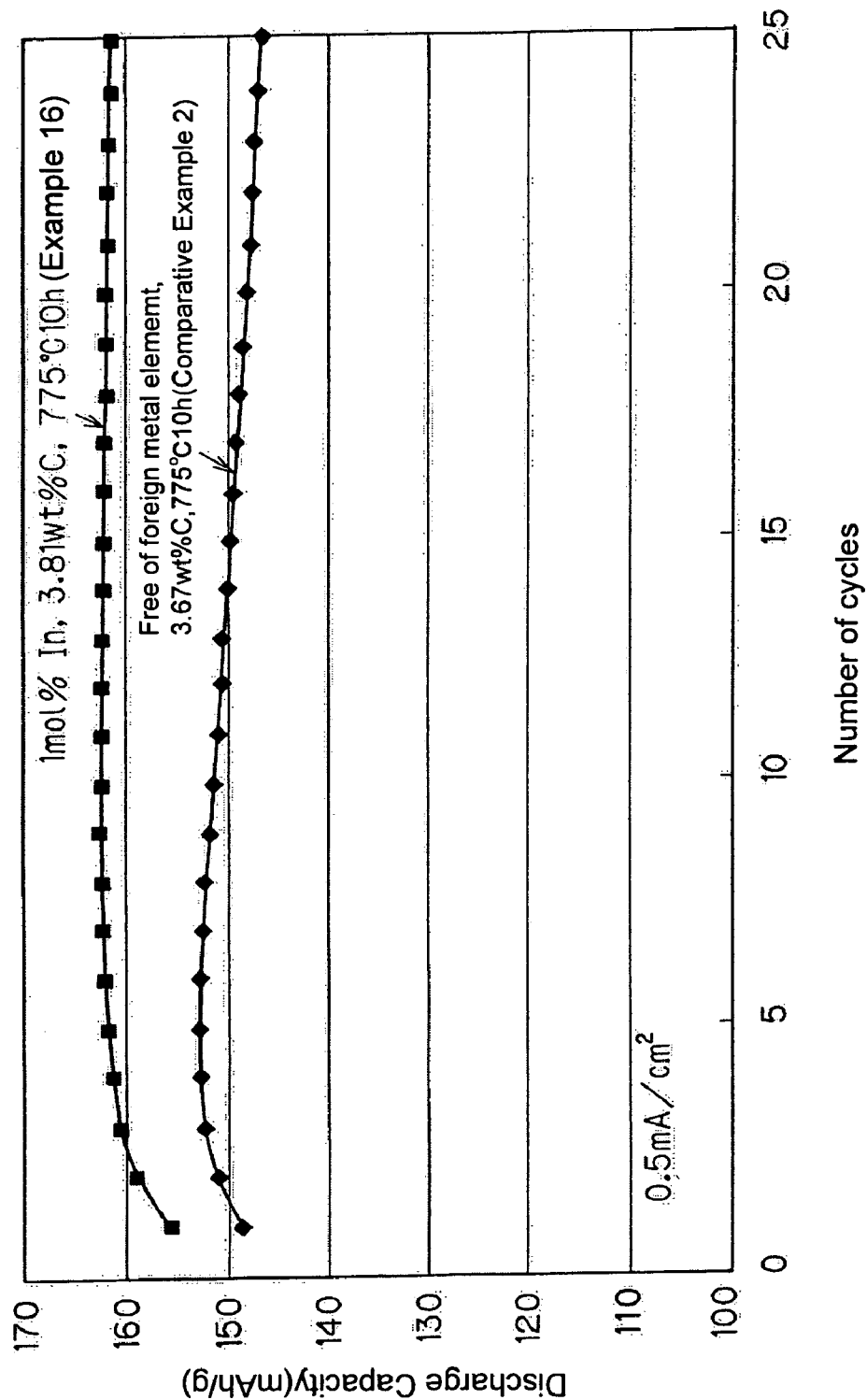
FIG. 22 is a graph showing the cycle discharge characteristics of secondary batteries obtained in Example 16 and Comparative Example 2.

The maximum discharge capacities of the coin-type secondary battery in the initial cycle (around the tenth cycle) are shown in Table 3, and the discharge cycle characteristics of the coin-type secondary battery at a charge/discharge current density of 0.5 mA/cm$^2$ are shown in FIG. 22. The charge/discharge curves of the battery (not shown) were very similar in shape to the charge/discharge curves of the battery using the conductive carbon deposited-vanadium composite lithium iron phosphate cathode material prepared by adding VCl$_3$ shown in FIG. 16.

Example 17

A conductive carbon deposited tin (Sn) composite LiFePO$_4$ cathode material was synthesized by the following procedure.

The same procedure as in Example 11 was repeated, except that 0.0474 g of SnCl$_2$ (purity: 99.9%; product of Wako Pure Chemical Industries, Ltd.) was added instead of VCl$_3$ used in the production of the conductive carbon deposited-1 mol % vanadium composite cathode material in Example 11 to the dried and ground mixture of the ingredients and the resulting mixture was ground and stirred, to obtain a conductive carbon deposited-LiFePO$_4$ cathode material composited with 1 mol % of Sn.

A coin-type secondary battery was fabricated using the cathode material in the same manner as in Example 1, and the characteristics of the battery were evaluated. Elemental analysis of the cathode material by ICP emission spectrometry indicated that it had a composition of (Li:Fe:Sn:P)= (1.05:1.01:0.0089:1) (element molar ratio with respect to phosphorus (P)). The result of elemental analysis indicated that 3.63% by weight of carbon generated by pyrolysis of the refined coal pitch was contained. X-ray diffraction analysis of the tin composite cathode material showed only diffraction peaks almost the same as those of LiFePO$_4$ having an olivine-type crystal structure shown in FIG. 15, and no other diffraction peaks ascribable to impurities were observed.

Figure 23:
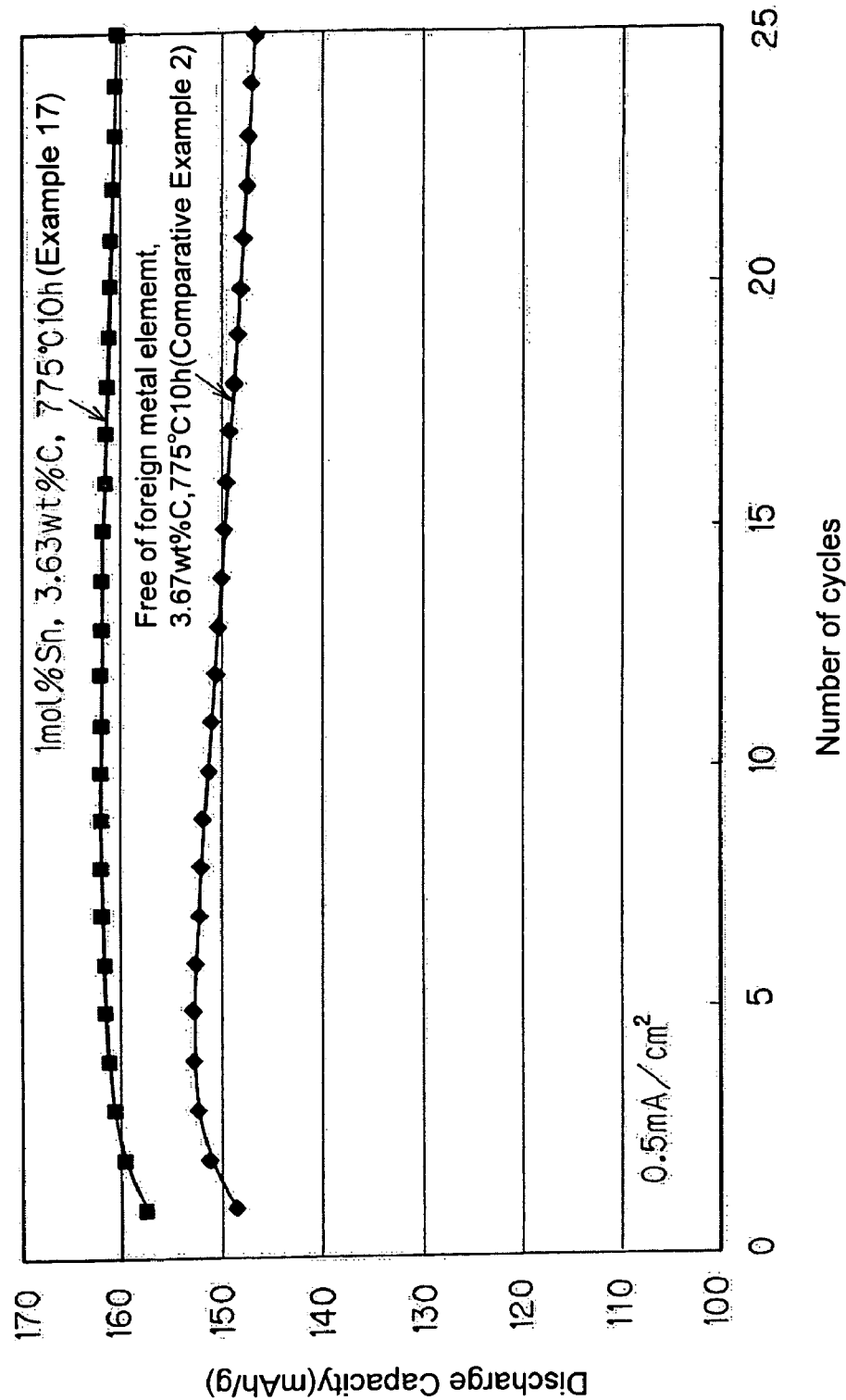
FIG. 23 is a graph showing the cycle discharge characteristics of secondary batteries obtained in Example 17 and Comparative Example 2.

The maximum discharge capacities of the coin-type secondary battery in the initial cycle (around the tenth cycle) are shown in Table 3, and the discharge cycle characteristics of the coin-type secondary battery at a charge/discharge current density of 0.5 mA/cm$^2$ are shown in FIG. 23. The charge/discharge curves of the battery (not shown) were very similar in shape to the charge/discharge curves of the battery using the conductive carbon deposited-vanadium composite lithium iron phosphate cathode material prepared by adding VCl$_3$ shown in FIG. 16.

Example 18

A conductive carbon deposited tin (Sn) composite LiFePO$_4$ cathode material was synthesized by the following procedure.

The same procedure as in Example 11 was repeated, except that 0.0651 g of SnCl$_4$ (purity: 97%; product of Wako Pure Chemical Industries, Ltd.) was added instead of VCl$_3$ used in the production of the conductive carbon deposited-1 mol % vanadium composite cathode material in Example 11 to the dried and ground mixture of the ingredients and the resulting mixture was ground and stirred, to obtain a conductive carbon deposited-LiFePO$_4$ cathode material composited with 1 mol % of Sn.

A coin-type secondary battery was fabricated using the cathode material in the same manner as in Example 1, and the characteristics of the battery were evaluated. Elemental analysis of the cathode material by ICP emission spectrometry indicated that it had a composition of (Li:Fe:Sn:P)=(1.04:1.01:0.0093:1) (element molar ratio with respect to phosphorus (P)). The result of elemental analysis indicated that 3.59% by weight of carbon generated by pyrolysis of the refined coal pitch was contained. X-ray diffraction analysis of the Sn composite cathode material showed only diffraction peaks almost the same as those of LiFePO$_4$ having an olivine-type crystal structure shown in FIG. 15, and no other diffraction peaks ascribable to impurities were observed.

Figure 24:
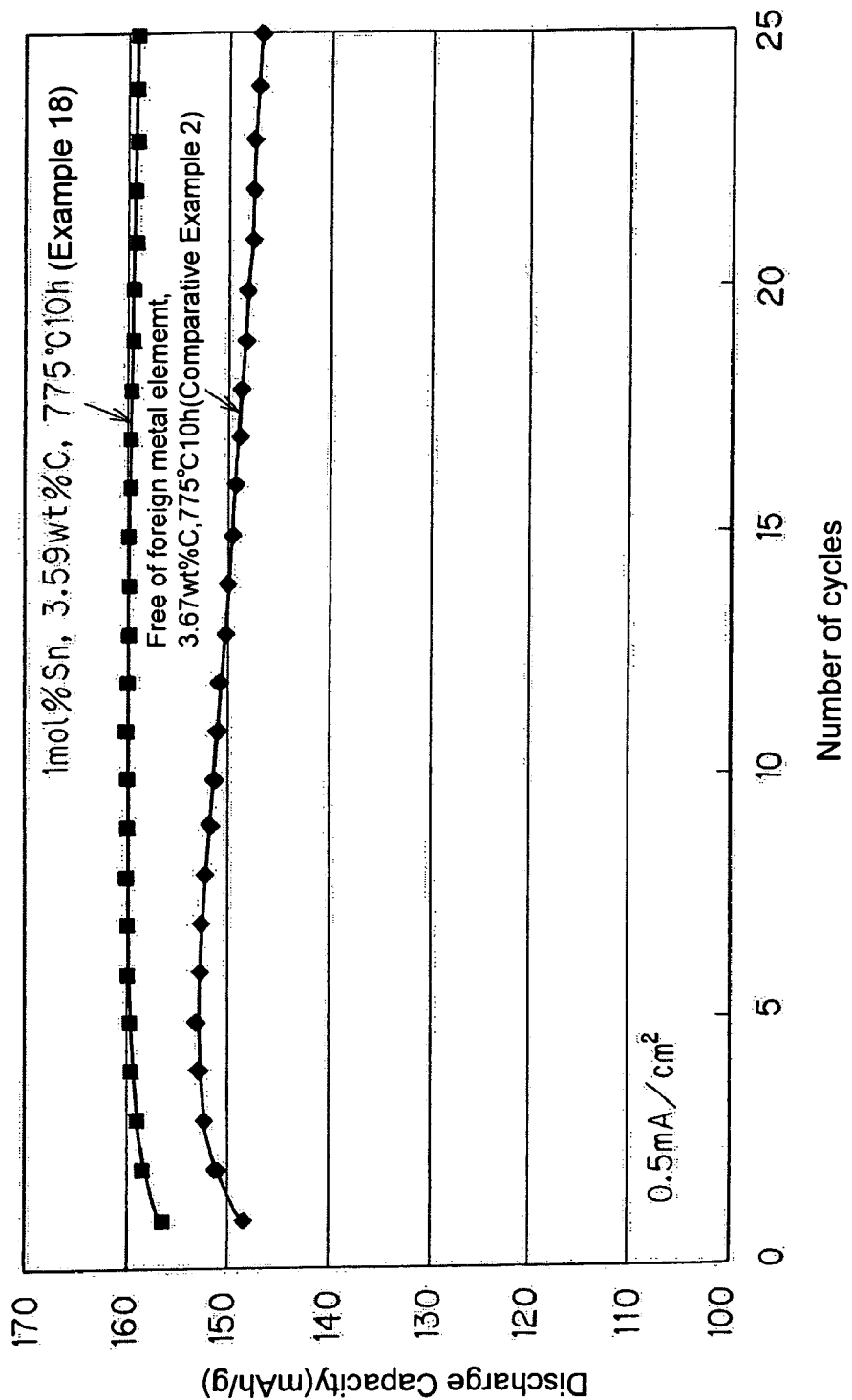
FIG. 24 is a graph showing the cycle discharge characteristics of secondary batteries obtained in Example 18 and Comparative Example 2.

The maximum discharge capacities of the coin-type secondary battery in the initial cycle (around the tenth cycle) are shown in Table 3, and the discharge cycle characteristics of the coin-type secondary battery at a charge/discharge current density of 0.5 mA/cm$^2$ are shown in FIG. 24. The charge/discharge curves of the battery (not shown) were very similar in shape to the charge/discharge curves of the battery using the conductive carbon deposited-vanadium composite lithium iron phosphate cathode material prepared by adding VCl$_3$ shown in FIG. 16.

Example 19

A conductive carbon deposited molybdenum (Mo) composite LiFePO$_4$ cathode material was synthesized by the following procedure.

The same procedure as in Example 11 was repeated, except that 0.0683 g of MoCl$_5$ (product of Wako Pure Chemical Industries, Ltd.) was added instead of VCl$_3$ used in the production of the conductive carbon deposited-1 mol % vanadium composite cathode material in Example 11 to the dried and ground mixture of the ingredients and the resulting mixture was ground and stirred, to obtain a conductive carbon deposited-LiFePO$_4$ cathode material composited with 1 mol % of Mo.

A coin-type secondary battery was fabricated using the cathode material in the same manner as in Example 1, and the characteristics of the battery were evaluated. Elemental analysis of the cathode material by ICP emission spectrometry indicated that it had a composition of (Li:Fe:Mo:P)=(1.03:1.08:0.0089:1) (element molar ratio with respect to phosphorus (P)). The result of elemental analysis indicated that 3.92% by weight of carbon generated by pyrolysis of the refined coal pitch was contained. X-ray diffraction analysis of the molybdenum composite cathode material showed only diffraction peaks almost the same as those of LiFePO$_4$ having an olivine-type crystal structure shown in FIG. 15, and no other diffraction peaks ascribable to impurities were observed.

Figure 25:
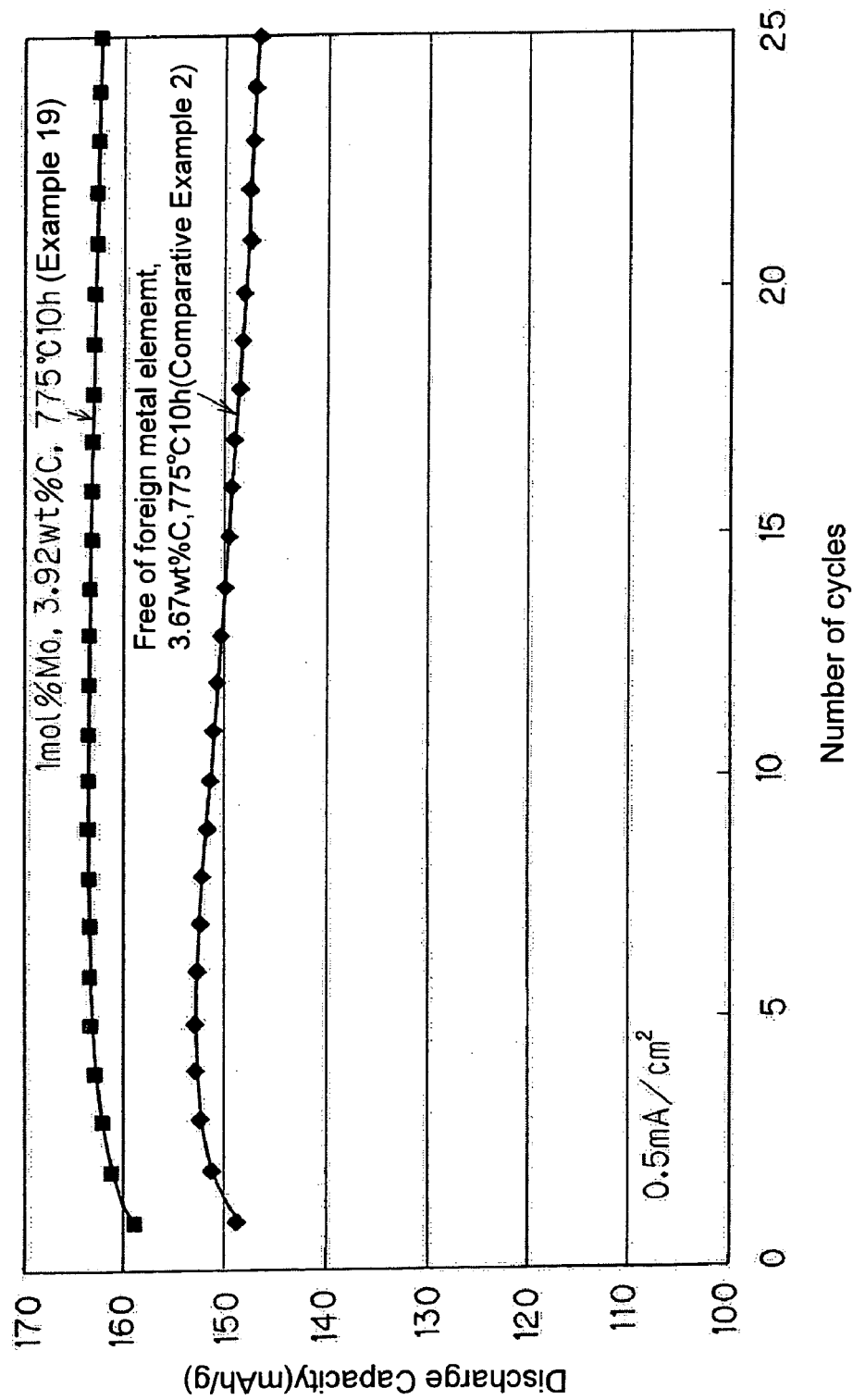
FIG. 25 is a graph showing the cycle discharge characteristics of secondary batteries obtained in Example 19 and Comparative Example 2.

The maximum discharge capacities of the coin-type secondary battery in the initial cycle (around the tenth cycle) are shown in Table 3, and the discharge cycle characteristics of the coin-type secondary battery at a charge/discharge current density of 0.5 mA/cm$^2$ are shown in FIG. 25. The charge/discharge curves of the battery (not shown) were very similar in shape to the charge/discharge curves of the battery using the conductive carbon deposited-vanadium composite lithium iron phosphate cathode material prepared by adding VCl$_3$ shown in FIG. 16.

Example 20

A conductive carbon deposited titanium (Ti) composite LiFePO$_4$ cathode material was synthesized by the following procedure.

The same procedure as in Example 11 was repeated, except that 0.0474 g of TiCl$_4$ (product of Wako Pure Chemical Industries, Ltd.) was added instead of VCl$_3$ used in the production of the conductive carbon deposited-1 mol % vanadium composite cathode material in Example 11 to the dried and ground mixture of the ingredients and the resulting mixture was ground and stirred, to obtain a conductive carbon deposited-LiFePO$_4$ cathode material composited with 1 mol % of Ti.

A coin-type secondary battery was fabricated using the cathode material in the same manner as in Example 1, and the characteristics of the battery were evaluated. Elemental analysis of the cathode material by ICP emission spectrometry indicated that it had a composition of (Li:Fe:Ti:P)=(1.04:1.04:0.0088:1) (element molar ratio with respect to phosphorus (P)). The result of elemental analysis indicated that 3.82% by weight of carbon generated by pyrolysis of the refined coal pitch was contained. X-ray diffraction analysis of the titanium composite cathode material showed only diffraction peaks almost the same as those of LiFePO$_4$ having an olivine-type crystal structure shown in FIG. 15, and no other diffraction peaks ascribable to impurities were observed.

Figure 26:
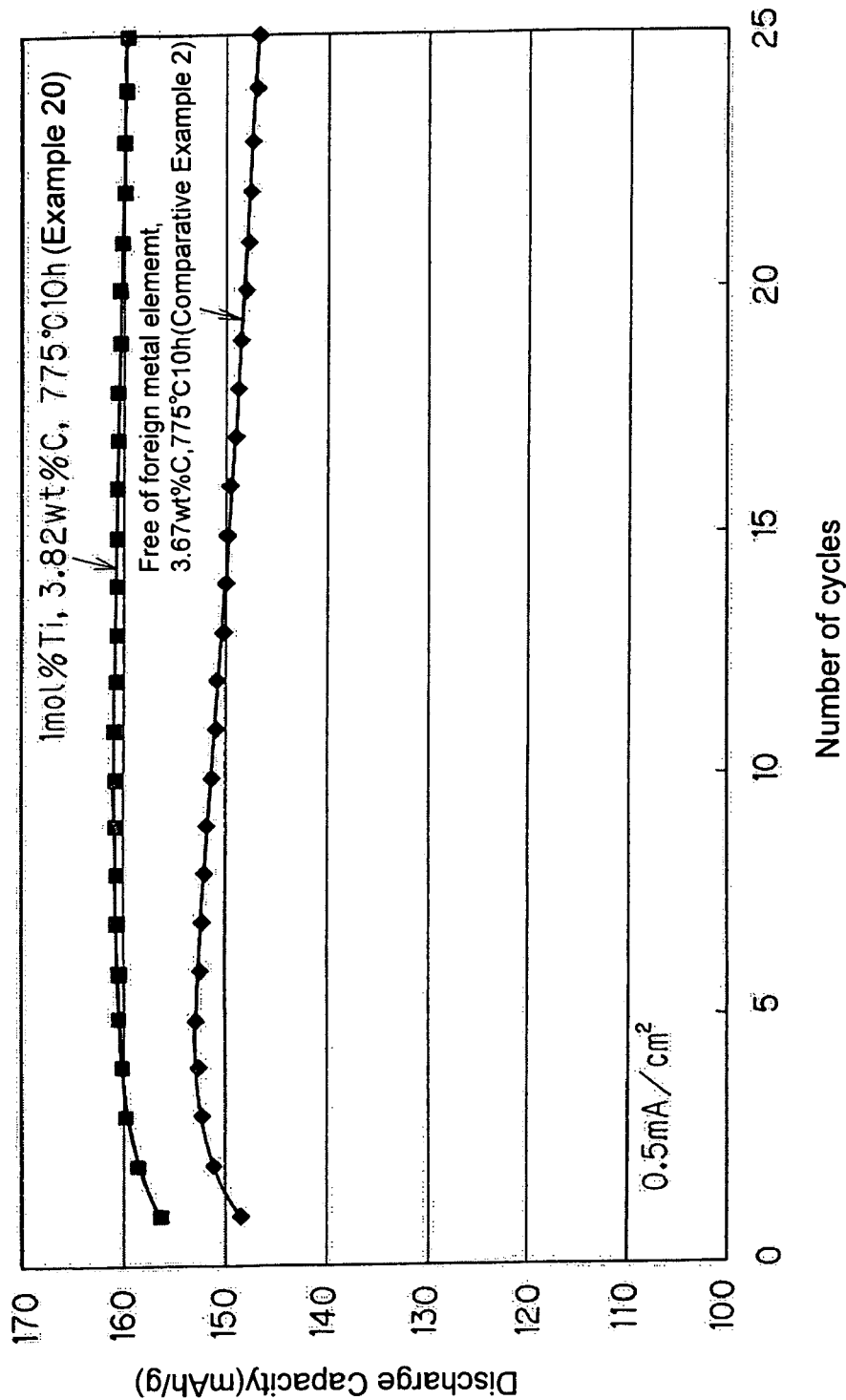
FIG. 26 is a graph showing the cycle discharge characteristics of secondary batteries obtained in Example 20 and Comparative Example 2.

The maximum discharge capacities of the coin-type secondary battery in the initial cycle (around the tenth cycle) are shown in Table 3, and the discharge cycle characteristics of the coin-type secondary battery at a charge/discharge current density of 0.5 mA/cm$^2$ are shown in FIG. 26. The charge/discharge curves of the battery (not shown) were very similar in shape to the charge/discharge curves of the battery using the conductive carbon deposited-vanadium composite lithium iron phosphate cathode material prepared by adding VCl$_3$ shown in FIG. 16.

Comparative Example 2

A conductive carbon deposited-LiFePO$_4$ cathode material free of a foreign metal element was synthesized by the following procedure.

The same procedure as in Example 11 was repeated, except that VCl$_3$ was not added to the dried and ground mixture of the ingredients, as opposed to the conductive carbon deposited-1 mol % vanadium composite cathode material of Example 11, to obtain a conductive carbon deposited-LiFePO$_4$ cathode material.

A coin-type secondary battery was fabricated using the cathode material in the same manner as in Example 1, and the characteristics of the battery were evaluated. Elemental analysis of the cathode material by ICP emission spectrometry indicated that it had a composition of (Li:Fe:P)=(1.03: 1.04:1) (element molar ratio with respect to phosphorus (P)). The carbon content in the cathode material was 3.67% by weight.

The maximum discharge capacities of the coin-type secondary battery in the initial cycle (around the fifth cycle) are shown in Table 3, the charge/discharge curves of the coin-type secondary battery in the third cycle are shown in FIG. 16, and the cycle charge/discharge characteristics of the coin-type secondary battery are shown in FIGS. 17 to 26.

As can be understood from comparison of Examples 11 to 20 and Comparative Example 2 in Table 3 and FIGS. 16 to 26, the coin-type secondary batteries using the conductive carbon deposited cathode materials composited with a foreign metal element of Examples 11 to 20 had a much smaller potential drop and a much larger initial discharge capacity, which is close to the theoretical capacity of $LiFePO_4$ of 170 mAh/g, and exhibited better cycle performances as compared with the conductive carbon deposited cathode material free of a foreign metal element of Comparative Example 2, which can be regarded as being of high performance relative to the general standard. This is assumed to be because the interface of the active material, electrolyte and current collector material where the cathode oxidation-reduction begins is dramatically increased by the deposition of conductive carbon and the utilization rate of the active material is improved, and because the characteristics of the cathode material are synergistically improved by the improvement of the conductivity of the metal composite cathode material itself.

TABLE 3

| | Foreign metal element | Metal halide (about 1 mol % added) | Initial maximum discharge capacity (mAh/g) | | |
|---|---|---|---|---|---|
| | | | At 0.5 mA/cm² | At 1.0 mA/cm² | At 1.6 mA/cm² |
| Ex. 11 | V | $VCl_3$ | 162 | 155 | 150 |
| Ex. 12 | Cr | $CrCl_3$ | 160 | 156 | 147 |
| Ex. 13 | | $CrCl_3 \cdot 6H_2O$ | 161 | 155 | 149 |
| Ex. 14 | Cu | $CuCl_2$ | 161 | 155 | 145 |
| Ex. 15 | Zn | $ZnCl_2$ | 160 | 155 | 147 |
| Ex. 16 | In | $InCl_3 \cdot 4H_2O$ | 162 | 157 | 149 |
| Ex. 17 | Sn | $SnCl_2$ | 162 | 156 | 145 |
| Ex. 18 | | $SnCl_4$ | 160 | 156 | 145 |
| Ex. 19 | Mo | $MoCl_5$ | 164 | 159 | 153 |
| Ex. 20 | Ti | $TiCl_4$ | 161 | 157 | 153 |
| Comp. Ex. 2 | N/A | Not added* | 152 | 148 | 138 |

*Carbon deposited.

The analytical values of the chlorine contents in all the samples obtained in Examples 1 to 20 are shown in Table 4. The analytical values are shown as element molar ratios based on phosphorus P being 1. M represents the foreign metal element. The chlorine analysis was carried out by an alkali fusion/ion chromatography method. Although the data of samples containing 0.63 to 1.45 mol % of a halogen element based on P are shown in Table 4, the present inventors have confirmed that cathode materials containing 0.1 mol % or more of a halogen element exhibit better charge/discharge characteristics than cathode materials containing a halogen element in an amount below the detection limit at the moment and cathode materials containing a halogen element in an amount of 0.01 mol % or less based on P (cathode materials of Reference Examples 1 to 5 shown in Table 2). As for the upper limit of the halogen element content, it has been confirmed that cathode materials containing up to about twice the content of the foreign metal element exhibit similar characteristics.

It is considered that the chlorine (Cl) is phase-separated in the form of a chloride such as LiCl or at least some of it has been taken, in the form of a single phase, into the $LiFePO_4$ crystal together with the added foreign metal element M (as a double salt). It is assumed that the charge/discharge characteristics of the resulting cathode materials are improved since the chlorine (Cl) exists in the cathode materials together with the foreign metal element M or the chlorine (Cl) assisted the compositing of the foreign metal element M into the cathode active material crystal during the calcination of the cathode material.

TABLE 4

| Example (Chloride $MCl_x$ for compositing) | Molar ratio of elements in sample (Li:Fe:M:P:Cl) |
|---|---|
| Ex. 1 ($VCl_3$) | 1.01:0.97:0.0089:1:0.0092 |
| Ex. 2 ($CrCl_3$) | 1.03:1.00:0.0093:1:0.0121 |
| Ex. 3 ($CrCl_3 \cdot 6H_2O$) | 0.99:1.02:0.0087:1:0.0116 |
| Ex. 4 ($CuCl_2$) | 1.00:0.96:0.0091:1:0.0103 |
| Ex. 5 ($ZnCl_2$) | 1.04:0.98:0.0089:1:0.0081 |
| Ex. 6 ($InCl_3 \cdot 4H_2O$) | 1.01:0.98:0.0085:1:0.0075 |
| Ex. 7 ($SnCl_2$) | 0.97:0.99:0.0091:1:0.0102 |
| Ex. 8 ($SnCl_4$) | 1.03:1.01:0.0089:1:0.0127 |
| Ex. 9 ($MoCl_5$) | 1.01:1.01:0.0089:1:0.0090 |
| Ex. 10 ($TiCl_4$) | 1.00:0.97:0.0087:1:0.0064 |
| Ex. 11 ($VCl_3$) Carbon deposited | 1.02:1.03:0.0088:1:0.0110 |
| Ex. 12 ($CrCl_3$) Carbon deposited | 1.03:1.02:0.0090:1:0.0126 |
| Ex. 13 ($CrCl_3 \cdot 6H_2O$) Carbon deposited | 1.01:0.97:0.0088:1:0.0136 |
| Ex. 14 ($CuCl_2$) Carbon deposited | 1.00:0.97:0.0091:1:0.0098 |
| Ex. 15 ($ZnCl_2$) Carbon deposited | 1.04:1.01:0.0087:1:0.0145 |
| Ex. 16 ($InCl_3 \cdot 4H_2O$) Carbon deposited | 1.02:0.99:0.0089:1:0.0086 |
| Ex. 17 ($SnCl_2$) Carbon deposited | 1.05:1.01:0.0089:1:0.0107 |
| Ex. 18 ($SnCl_4$) Carbon deposited | 1.04:1.01:0.0093:1:0.0128 |
| Ex. 19 ($MoCl_5$) Carbon deposited | 1.03:1.08:0.0089:1:0.0095 |
| Ex. 20 ($TiCl_4$) Carbon deposited | 1.04:1.04:0.0088:1:0.0063 |

While the present invention has been described in terms of the preferred embodiments, it is to be understood that the present invention is not limited to the above embodiments but applicable to other embodiments within the scope of the invention described in the scope of patent claims.

For example, in addition to the reduced form lithium iron phosphate $LiFePO_4$ cathode material composited with a foreign metal element and the reduced form cathode material which is composited with a foreign metal element and on which conductive carbon is deposited, oxidized form iron phosphate [$FePO_4$] generated from the reduced form by a battery charge reaction or a chemical oxidation is included in the scope of the present invention as a foreign metal element composite cathode material or a carbon deposited-foreign metal element composite cathode material.

The invention claimed is:

1. A cathode material for a secondary battery containing a cathode active material represented by a general formula $Li_nFePO_4$ (wherein $0<n\leq1$) as a primary component, one or more metal elements selected from the group consisting of vanadium (V), chromium (Cr), copper (Cu), zinc (Zn), indium (In), tin (Sn), molybdenum (Mo), and titanium (Ti), the total content of which metal element is in the range of 0.1 to 5 mol %, in terms of elemental ratio, based on iron in the cathode active material, and a halogen element in an amount of 0.1 mol % or more based on P, wherein the upper limit of molar content of the halogen element is a molar concentration of twice that of the metal element or elements.

2. A cathode material for a secondary battery, synthesized so as to contain a cathode active material represented by a general formula $Li_nFePO_4$ (wherein $0<n\leq 1$) as a primary component, one or more metal elements selected from the group consisting of vanadium (V), chromium (Cr), copper (Cu), zinc (Zn), indium (In), tin (Sn), molybdenum (Mo), and titanium (Ti), and a halogen element, by mixing a halide or halides of the metal element or elements with the ingredients of the cathode active material represented by the general formula $Li_nFePO_4$, and then calcining the mixture, wherein the total content of the metal element or elements is in the range of 0.1 to 5 mol %, in terms of elemental ratio, based on iron in the cathode active material, and the halogen element is contained in an amount of 0.1 mol % or more based on P, wherein the upper limit of molar content of the halogen element is a molar concentration of twice that of the metal element or elements.

3. The cathode material for a secondary battery according to claim 1 or 2, further comprising conductive carbon deposited on the surface thereof.

4. A secondary battery containing the cathode material according to claim 1 or 2.

5. A secondary battery containing the cathode material according to claim 3.

6. A method for producing a cathode material for a secondary battery, synthesized so as to contain a cathode active material represented by a general formula $Li_nFePO_4$ (wherein $0<n\leq 1$) as a primary component, one or more metal elements selected from the group consisting of vanadium (V), chromium (Cr), copper (Cu), zinc (Zn), indium (In), tin (Sn), molybdenum (Mo), and titanium (Ti), and a halogen element, the method comprising:

mixing the ingredients of the cathode active material $Li_n$-$FePO_4$ with a halide of at least one of the metal elements to obtain a calcination precursor, and then calcining the calcination precursor to composite the cathode active material with the metal element or elements, wherein the total content of the metal element or elements is in the range of 0.1 to 5 mol %, in terms of elemental ratio, based on iron in the cathode active material, and the halogen element is contained in an amount of 0.1 mol % or more based on P, wherein the upper limit of molar content of the halogen element is a molar concentration of twice that of the metal element or elements.

7. The method for producing a cathode material for a secondary battery according to claim 6, wherein the calcination step has a first stage in a temperature range that is risen from room temperature to a temperature between 300° C. and 450° C., and a second stage in a temperature range of room temperature to the calcination completion temperature, and wherein the second stage of the calcination step is carried out after addition of a substance from which conductive carbon is formed by pyrolysis to the product of the first stage of the calcination step.

8. The method for producing a cathode material for a secondary battery according to claim 7, wherein the substance from which conductive carbon is foamed by pyrolysis is a bitumen or a saccharide.

9. A cathode material for a secondary battery containing a cathode active material represented by a general formula $Li_nFePO_4$ (wherein $0<n\leq 1$) as a primary component, one or more metal elements selected from the group consisting of vanadium (V), chromium (Cr), copper (Cu), zinc (Zn), indium (In), tin (Sn), molybdenum (Mo), and titanium (Ti), the total content of which metal element is in the range of 0.1 to 5 mol %, in terms of elemental ratio, based on iron in the cathode active material, and a halogen element in an amount of 0.1 mol % to 1.45 mol % based on P.

10. A cathode material for a secondary battery, synthesized so as to contain a cathode active material represented by a general formula $Li_nFePO_4$ (wherein $0<n\leq 1$) as a primary component, one or more metal elements selected from the group consisting of vanadium (V), chromium (Cr), copper (Cu), zinc (Zn), indium (In), tin (Sn), molybdenum (Mo), and titanium (Ti), and a halogen element, by mixing a halide or halides of the metal element or elements with the ingredients of the cathode active material represented by the general formula $Li_nFePO_4$, and then calcining the mixture, wherein the total content of the metal element or elements is in the range of 0.1 to 5 mol %, in terms of elemental ratio, based on iron in the cathode active material, and the halogen element is contained in an amount of 0.1 mol % to 1.45 mol % based on P.

11. The cathode material according to any one of claims 1, 2, 9, and 10, wherein the halogen element is chlorine.

12. A method for producing a cathode material for a secondary battery, synthesized so as to contain a cathode active material represented by a general formula $Li_nFePO_4$ (wherein $0<n\leq 1$) as a primary component, one or more metal elements selected from the group consisting of vanadium (V), chromium (Cr), copper (Cu), zinc (Zn), indium (In), tin (Sn), molybdenum (Mo), and titanium (Ti), and a halogen element, the method comprising:

mixing the ingredients of the cathode active material $Li_n$-$FePO_4$ with a halide of at least one of the metal elements to obtain a calcination precursor, and then calcining the calcination precursor to composite the cathode active material with the metal element or elements, wherein the total content of the metal element or elements is in the range of 0.1 to 5 mol %, in terms of elemental ratio, based on iron in the cathode active material, and the halogen element is contained in an amount of 0.1 mol % to 1.45 mol % based on P.

13. The method according to claim 6 or 12, wherein the halogen element is chlorine.

* * * * *